US012737021B2

(12) United States Patent
Hassan et al.

(10) Patent No.: US 12,737,021 B2
(45) Date of Patent: Sep. 15, 2026

(54) CALIBRATION OF RESOURCE SERVER POWER ALLOCATIONS WITHIN A DATA STORAGE DEVICE USING CONFORMAL PREDICTIONS

(71) Applicant: Western Digital Technologies, Inc., San Jose, CA (US)

(72) Inventors: Yoseph Hassan, Nechusha (IL); Ariel Navon, Revava (IL); Eran Sharon, Rishon Lezion (IL); Shay Benisty, Beer Sheva (IL)

(73) Assignee: Western Digital Technologies, Inc., San Jose, CA (US)

(*) Notice: Subject to any disclaimer, the term of this patent is extended or adjusted under 35 U.S.C. 154(b) by 24 days.

(21) Appl. No.: 18/941,572

(22) Filed: Nov. 8, 2024

(65) Prior Publication Data

US 2025/0068220 A1 Feb. 27, 2025

Related U.S. Application Data

(63) Continuation-in-part of application No. 18/132,230, filed on Apr. 7, 2023, now Pat. No. 12,541,308, (Continued)

(51) Int. Cl.
*G06F 1/26* (2006.01)

(52) U.S. Cl.
CPC .................................... *G06F 1/26* (2013.01)

(58) Field of Classification Search
CPC .................................... G06F 1/26; G06F 1/32
See application file for complete search history.

(56) References Cited

U.S. PATENT DOCUMENTS 8,718,798 B2 5/2014 Bultman et al.
8,732,635 B2 5/2014 Lewis et al.
(Continued)

FOREIGN PATENT DOCUMENTS

CN 112084089 A 9/2020
CN 111914000 A 11/2020
CN 114238060 A 3/2022

OTHER PUBLICATIONS

Hsu et al., "Self-Aware Workload Forecasting in Data Center Power Prediction"; 2018, 18th IEEE/ACM International Symposium on Cluster, Cloud and Grid Computing (CCGrid), May 1, pp. 321-330. IEEE (10 pages).

*Primary Examiner* — Phil K Nguyen
(74) *Attorney, Agent, or Firm* — LOZA & LOZA, LLP; Gabriel Fitch

(57) ABSTRACT

Methods and apparatus for power management in data storage devices are provided wherein conformal prediction is employed to determine correction terms for applying to power-per-processing event (P/PE) values. One such data storage device includes a non-volatile memory (NVM), a set of hardware processing engines, and a power sensor to detect a total power consumption of the set of hardware processing engines. A processor is configured to determine a P/PE value for each of the set of processing engines based on total power consumption measurements using a least squares procedure. A conformalization procedure is applied to sequences of P/PE values to calibrate the P/PE values by determining correction terms for applying to the P/PE values to provide guaranteed power prediction intervals. Delivery of power to the processing engines is then controlled based on the corrected P/PE event values in accordance with a power budget. On-line and off-line examples are provided.

20 Claims, 35 Drawing Sheets

Related U.S. Application Data which is a continuation-in-part of application No. 17/959,037, filed on Oct. 3, 2022, now Pat. No. 12,287,690.

(56) References Cited

U.S. PATENT DOCUMENTS

| | | | |
|---|---|---|---|
| 8,904,209 | B2 | 12/2014 | Davis et al. |
| 8,938,630 | B2 * | 1/2015 | Jeddeloh ............... G06F 1/3234 710/24 |
| 8,949,637 | B2 | 2/2015 | Knight |
| 8,966,293 | B1 | 2/2015 | Dutch et al. |
| 9,977,487 | B2 | 5/2018 | Choi et al. |
| 10,996,733 | B2 | 5/2021 | Lee et al. |
| 11,016,545 | B2 | 5/2021 | Yang et al. |
| 11,048,448 | B2 | 6/2021 | Suzuki et al. |
| 11,244,242 | B2 | 2/2022 | Prakash et al. |
| 11,307,778 | B2 | 4/2022 | Klein |
| 11,847,327 | B2 | 12/2023 | Palmer |
| 12,019,413 | B2 | 6/2024 | Brophy et al. |
| 2007/0266269 | A1 | 11/2007 | Fuchikami et al. |
| 2009/0016137 | A1 | 1/2009 | Hur et al. |
| 2010/0275047 | A1 | 10/2010 | Kaneko et al. |
| 2014/0149760 | A1 | 5/2014 | Drake et al. |
| 2015/0185813 | A1 | 7/2015 | Ping et al. |
| 2016/0012555 | A1 | 1/2016 | Harada et al. |
| 2016/0041762 | A1 | 2/2016 | Kanno et al. |
| 2016/0139589 | A1 * | 5/2016 | Chandra ................. G06F 1/206 700/300 |
| 2017/0075611 | A1 | 3/2017 | Choi et al. |
| 2017/0269669 | A1 * | 9/2017 | Choi ..................... G06F 3/0688 |
| 2018/0182452 | A1 | 6/2018 | Lee |
| 2018/0196490 | A1 * | 7/2018 | Ail ....................... H02H 11/005 |
| 2019/0065086 | A1 | 2/2019 | Margetts et al. |
| 2019/0384513 | A1 | 12/2019 | Matsubara |
| 2020/0044887 | A1 * | 2/2020 | Jayanath Wewalaarachchi .......... G06F 30/00 |
| 2020/0314022 | A1 * | 10/2020 | Vasseur ............... G06F 18/2185 |
| 2020/0327435 | A1 * | 10/2020 | Wang ...................... G06F 30/18 |
| 2021/0055776 | A1 | 2/2021 | Parry et al. |
| 2021/0303184 | A1 | 9/2021 | Palmer |
| 2021/0359514 | A1 | 11/2021 | Suzuki |
| 2022/0215273 | A1 | 7/2022 | Sethi et al. |
| 2022/0398035 | A1 | 12/2022 | Thokala et al. |
| 2023/0058022 | A1 | 2/2023 | Chung |
| 2023/0104672 | A1 | 4/2023 | Nakamura et al. |
| 2024/0111438 | A1 | 4/2024 | Navon et al. |

* cited by examiner

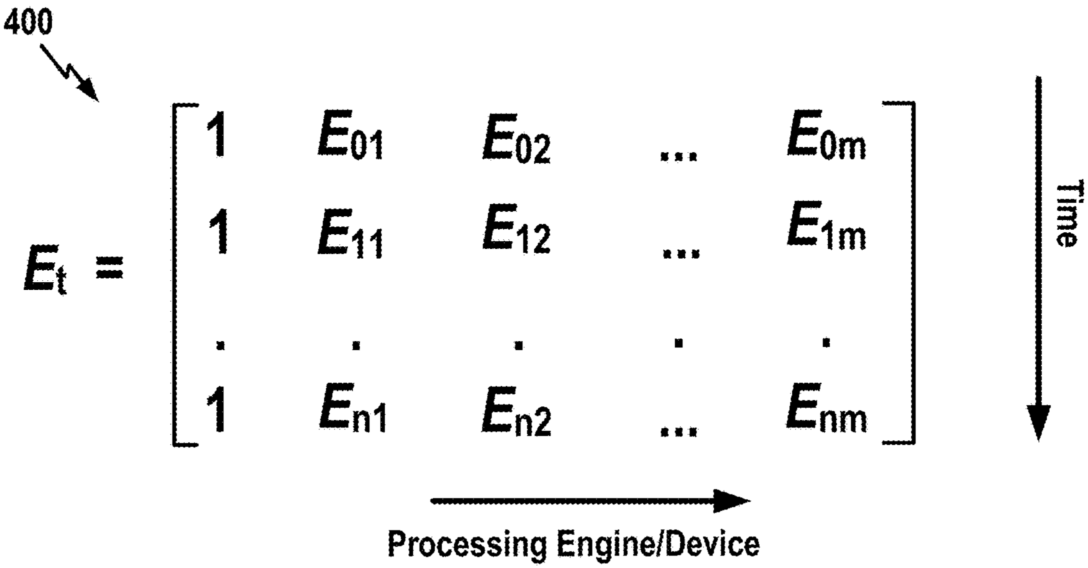
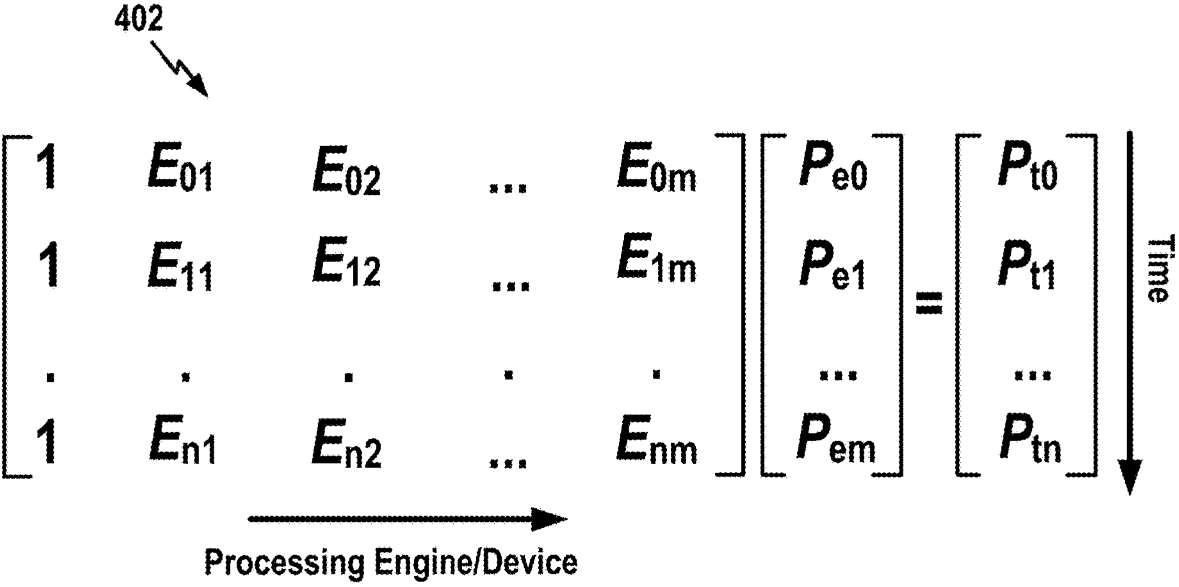
*FIG. 4*

FIG. 11

1302

Obtain and storing a set of total power consumption values (for a set of hardware processing devices) measured at different times by a power sensor of an SSD as a power measurement vector (Pt)

1304

For each of the total power consumption values in Pt, obtaining corresponding indications of particular processing devices/engines that were active (e.g., an active events list) when the power consumption was measured and storing the indications in a corresponding row of a matrix (E), where a first column of the matrix (E) stores a value indicative of baseline power

1306

Determine power-per-processing event vector values (Pe) by performing a least-squares procedure on the matrix (E) and the power measurement vector (Pt) to determine an estimated power consumption vector (Pe), wherein E · Pe = Pt, and where each value within the vector (Pe) represents the estimated power consumption of a corresponding one of the processing devices for a corresponding processing event, and wherein at least some initial values in the vectors and the matrix may be populated with values (a) obtained from a host, (b) randomly generated, or (c) assigned as unique indicator values

1308

Obtain an additional total power measurement value and corresponding indications of particular processing devices operating while the additional total power consumption value was measured (e.g., an active events list)

1310

Perform an iterative/recursive least-square procedure to determine an updated estimated power consumption vector (Pe)

1312

Control delivery of power to the set of processing devices/engines based on the power updated-per-processing event values in vector Pe to, e.g., maintain power within a power budget

*FIG. 13*

CALIBRATION OF RESOURCE SERVER POWER ALLOCATIONS WITHIN A DATA STORAGE DEVICE USING CONFORMAL PREDICTIONS

CROSS-REFERENCE TO RELATED APPLICATIONS

This application is a continuation-in-part (CIP) of U.S. patent application Ser. No. 18/132,230, filed Apr. 7, 2023, entitled "RELIABILITY ASSESSMENT FOR USE WITH POWER-PER-PROCESSING EVENT ESTIMATIONS WITHIN A DATA STORAGE DEVICE," which was a CIP of U.S. patent application Ser. No. 17/959,037, filed Oct. 3, 2022, entitled "POWER-PER-PROCESSING EVENT ESTIMATES BASED ON TOTAL POWER CONSUMPTION MEASUREMENTS WITHIN A DATA STORAGE DEVICE," the entire contents of both of which are incorporated herein by reference.

FIELD

The subject matter described herein relates to data storage devices and controllers. More particularly, the subject matter relates, in some examples, to the management of power within data storage devices.

INTRODUCTION

In consumer electronics, solid state drives (SSDs) or other data storage devices (DSDs) incorporating non-volatile memories (NVMs) are often replacing or supplementing conventional rotating hard disk drives for mass storage. The non-volatile memories may include one or more flash memory devices, such as NAND flash memories. The NVMs may also include multiple NAND flash dies or chips that comprise the NVM. Within SSDs and other data storage devices, it is important to control power and energy consumption to, e.g., maximize battery life and manage operating temperatures. Herein, methods and apparatus are provided to efficiently control power consumption within SSDs and other data storage devices, including providing guaranteed power prediction intervals.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a data storage device that includes: a non-volatile memory (NVM); a plurality of processing devices (e.g. processing engines), each configured to perform a corresponding processing event to process NVM data; a power sensor configured to measure a total power consumption of the plurality of processing devices; and one or more processors. The one or more processors are configured, individually or collectively, to: measure a power-per-sequence value for each of a plurality of sequences of processing events using the power sensor; determine an estimated power-per-processing event value for each of the processing events; determine, based on the measured power-per-sequence values and the estimated power-per-processing event values, a conformity score for each of the plurality of sequences of processing events; determine sequence-based correction terms from the conformity scores; adjust the power-per-processing event values using the sequence-based correction terms; and control delivery of power to the plurality of processing devices based on the adjusted power-per-processing event values.

Another aspect of the disclosure provides a method for use by a data storage device comprising a non-volatile memory (NVM) and a plurality of processing devices configured to process NVM data. The method includes: measuring a power-per-sequence value for each of a plurality of sequences of processing events using a power sensor; determining an estimated power-per-processing event value for each of the processing events; determining, based on the measured power-per-sequence values and the estimated power-per-processing event values, a conformity score for each of the plurality of sequences of processing events; determining sequence-based correction terms from the conformity scores; adjusting the power-per-processing event values using the sequence-based correction terms; and controlling delivery of power to the plurality of processing devices based on the adjusted power-per-processing event values.

Yet another aspect of the disclosure provides an apparatus for use by a data storage device that includes an NVM and a plurality of processing devices configured to process NVM data. The apparatus includes: means for measuring a power-per-sequence value for each of a plurality of sequences of processing events using a power sensor; means for determining an estimated power-per-processing event value for each of the processing events; means for determining, based on the measured power-per-sequence values and the estimated power-per-processing event values, a conformity score for each of the plurality of sequences of processing events; means for determining sequence-based correction terms from the conformity scores;

means for adjusting the power-per-processing event values using the sequence-based correction terms; and means for controlling delivery of power to the plurality of processing devices based on the adjusted power-per-processing event values.

BRIEF DESCRIPTION OF THE DRAWINGS

FIG. 4 illustrates general forms of the active events matrix, the measured power vector, and the power-per-processing event vector of FIG. 3, in accordance with some aspects of the disclosure.

FIG. 11 is a schematic block diagram configuration for another exemplary data storage device configured in accordance with some aspects of the disclosure.

FIG. 13 is a flow chart of another exemplary method according to aspects of the present disclosure.

DETAILED DESCRIPTION

Figure 1:
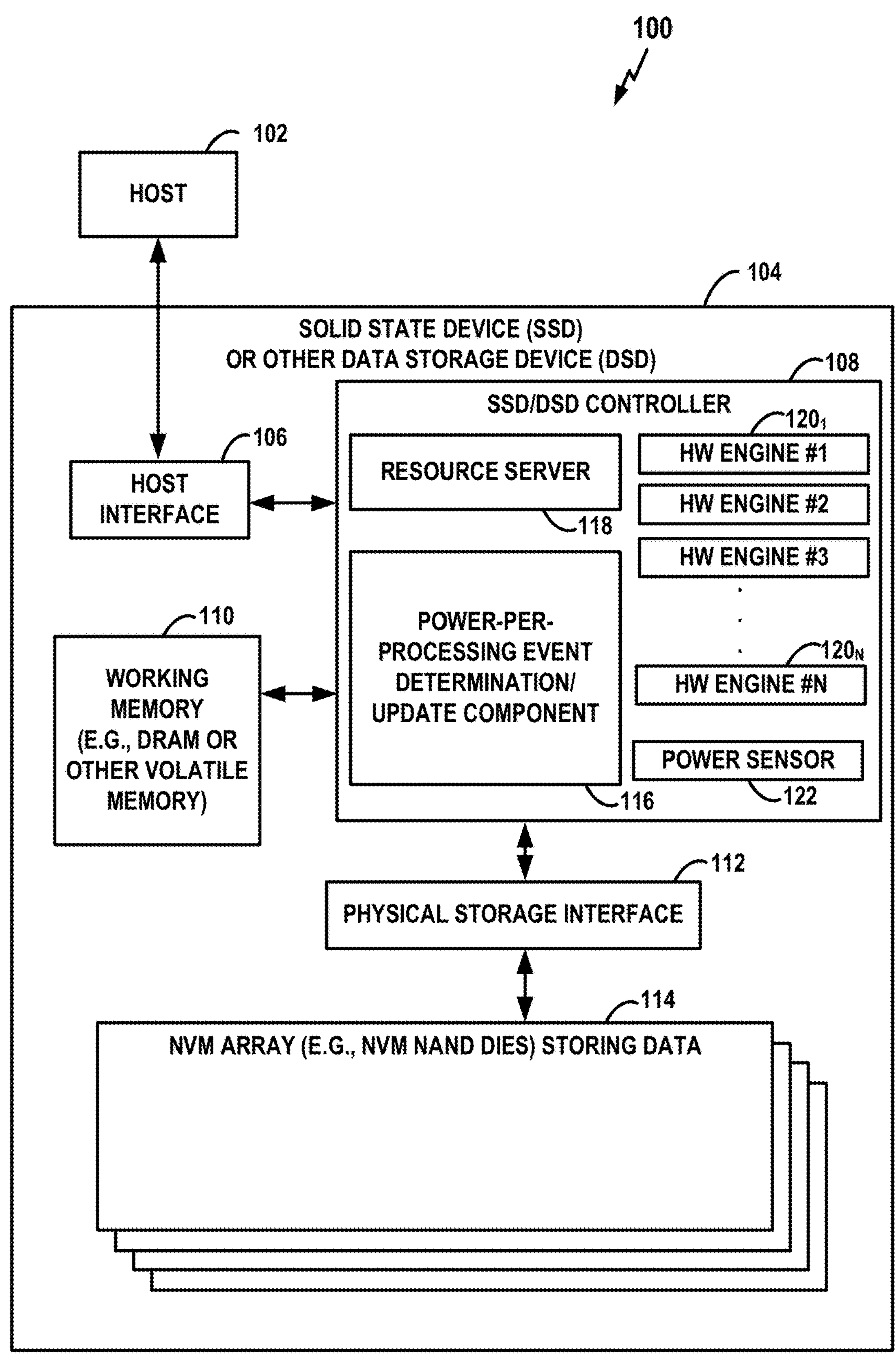
FIG. 1 is a schematic block diagram illustrating an exemplary data storage device (DSD) embodied as a solid-state device (SSD), including an SSD controller configured to determine individual power-per-processing event values based on total power consumption measurements from a power sensor, in accordance with some aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to data storage devices (DSDs) and to data storage controllers of the DSDs. In the main examples described herein, data is stored within non-volatile memory (NVM) arrays. In other examples, data may be stored in hard disk drives (HDDs), tape drives, hybrid drives, etc. DSDs with NVM arrays may be referred to as solid state devices (SSDs). Some SSDs use NAND flash memory, herein referred to as "NANDs." A NAND is a type of non-volatile storage technology that does not require power to retain data. It exploits negative-AND, i.e., NAND, logic. For the sake of brevity, an SSD having one or more NAND dies will be used as a non-limiting example of a DSD below in the description of various embodiments. It is understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays.

Overview

As noted above, within DSDs, it is important to control power consumption to, for example, maximize battery life and manage operating temperatures. Generally speaking, the lower the power consumption, the longer the battery life and the lower the operating temperature. Nevertheless, at any given time and in any given processing state, the device often should abide by a strict power budget, which enables the device to utilize most of the available power so long as the power is below a power consumption budget such as a budget representative of a total amount of power that is available at any particular time. Deviating from the power budget may have critical effects on the device performance and compliance. For example, using more power than allowed or permitted by the power budget might cause the host power supply to fail and, as a result, impede (or cause failure in) memory device qualification tests. On the other hand, using less power than allowed or permitted might provide sub-optimal performance, and thus the device may appear to have lower performance and be less competitive in the marketplace. Hence, it is desirable to tune a DSD to utilize its power budget to the fullest without exceeding the budget. Note that the term "power consumption" is used herein as a convenient way of referring to the amount of power used by the DSD or its components while performing operations (e.g., the amount of power delivered to those components by a power supply) and may be represented in Watts (or similar units), where one Watt is one Joule/second. Power consumption is thus distinct from energy consumption, which may be represented in Joules (or similar units).

In some examples, in order to determine a power budget for a new DSD, the overall power consumption of the device is measured in a lab during different operational modes (e.g., Idle, Read, Write and mixed loads), as well as in different power modes. Then, a lengthy and iterative characterization procedure is performed by engineers in which laborious estimates for the specific power consumption of different components/modules of the DSD are made by the engineers. Such characterization procedures often take a long time (usually weeks or months) and involve the work of several engineers. Moreover, the estimations might not be optimal. The estimates are then used to program the power control features of the DSD. Typically, once programmed, such features cannot be easily changed. That is, power control features of the DSD typically cannot be easily updated or tuned to utilize the full power budget of the DSD without exceeding the budget.

Aspects of the present disclosure relate to improved techniques for managing power in a data storage device. One aspect involves a data storage device such as an SSD that includes: an NVM, a set of hardware (HW) processing devices (which may also be referred to as processing engines) configured to perform operations (such as reading data from the NVM and writing data to the NVM), a power sensor configured to measure a total power consumption of the set of hardware processing devices, and a processor. The processor is configured to determine a power-per-processing event value for each of the set of processing devices and to control power delivered to the set of processing devices based on the power-per-processing events values. For example, the power allocated to the processing devices may be controlled based on a power control profile derived from the power-per-processing event values to control the total amount of power to efficiently exploit the power budget of the device to maximize performance while maintaining power consumption within a power budget. A common example is to postpone an engine operation if there is currently not enough power available for its full operation (based on a power estimation). In some aspects, the power budget may include a peak power envelope and an average power envelope (or other power quantile between peak power consumption and minimal power consumption, e.g. a 30%-quantile might indicate a power value that, in 30% of the cases, the power consumption is expected to exceed this value).

Herein, the term "power-per-processing event value" is used as a convenient way of referring to the amount of power delivered to and used by a particular processing engine (e.g., a Read engine/processing circuit or a Write engine/processing circuit) while performing a corresponding processing event (e.g., a Read or Write). It should be understood that the power-per-processing events referred to herein may be represented in Watts (or similar units) and are distinct from energy-per-processing events, discussed below, which may be represented in Joules (or similar units). Note that for NAND-based NVM devices, a Read is often referred to as a Sense and a Write is often referred to as a Program. Herein, both terms may be used.

In some aspects, the processor is further configured to: store a set of total power consumption values measured at different times as a power measurement vector (Pt) and, for each of the total power consumption values, store corresponding indications (e.g., an active events list) of the particular processing devices in a corresponding row of a matrix (E), wherein a first column of the matrix (E) stores a value indicative of a baseline power. Note that the matrix is designated with E because it has a column for each type of processing engine to indicate whether the various engines were active when corresponding total power consumption values were measured. That is, the E stands of Engine and not Energy. The processor then determines the power-per-processing event values by performing a least-squares procedure on the matrix (E) and the power measurement vector (Pt) to determine an estimated power consumption vector (Pe), wherein $E \cdot Pe = Pt$, and wherein each value within the estimated power consumption vector (Pe) represents the estimated power consumption of a corresponding one of the processing devices/engines for a corresponding processing event.

Other inference-based models or regression analysis procedures (besides least-squares) for estimating parameters can be used as well. Examples of other regression analysis estimation procedures include (a) various other forms of linear regression, (b) multiple regression, (c) polynomial regression, (d) logistic regression, (c) Ridge Regression and Lasso Regression, (f) Time Series Regression, (g) Nonlinear Regression, (h) Poisson Regression, and (i) Generalized Linear Models (GLMs) that extend the linear regression framework to handle different types of dependent variables, including binary, count, and continuous variables.

In still other aspects, the processor is further configured to: update the estimated power consumption vector Pe by updating the power measurement vector Pt with an additional power measurement entry and performing an iterative or recursive least-squares procedure on the matrix E and the updated power measurement vector Pt to solve for an updated estimated power consumption vector Pe. The least-squares procedure may be referred to as an on-line least-squares (OLS) since the procedure may be performed by an SSD while the SSD is operating (as opposed to an off-line procedure that might otherwise performed in a lab). Note that the OLS procedure may be generally regarded as an inference model that operates to infer the values for Pe from the Pt and E values and, in some embodiments, to predict Pe values.

In this manner, the lengthy characterization procedure summarized above that might otherwise take engineers weeks or months to complete can be avoided. Moreover, the power profile can be adaptively updated or tuned to respond to changes in the device, such as changes in operating temperatures, processes, and/or voltages, so as to periodically and adaptively optimize power usage.

In some aspects, an initial off-line least-squares procedure may be performed in a lab to determine initial power-per-event values for storing in a DSD. Thereafter, the DSD may adaptively update the power-per-event values based on power usage data the DSD collects during operations using the iterative or recursive least-squares procedure.

In other aspects, the power-per-event values can be generated entirely on-line by the DSD itself based on power measurement data the DSD collects without requiring an initial off-line procedure prior to deployment and activation of the DSD.

In still other aspects, systems and procedures are provided for assessing the reliability of power-per-event value determinations and/or estimates, and then controlling power delivery based on the assessment. This may be done, for example, by estimating (or predicting) an updated total power consumption of the data storage device based on initial power-per-processing event values determined by the least-squares procedure and then comparing the estimated (or predicted) updated total power consumption value to a measured updated total power consumption value. For example, a difference value may be computed between the estimated (or predicted) total power consumption and the updated total power consumption measured by the power sensor. The difference value is compared to a difference threshold. If the difference value does not exceed the difference threshold, indicating that the power-per-processing event values are sufficiently accurate, the data storage device controls power using the power-per-processing event values.

On the other hand, if the difference value is greater than the threshold, indicating that the power-per-processing event values may not be sufficiently accurate (e.g., there has been a significant change in device temperature affecting power usage), the data storage device takes appropriate action. For example, the device may re-compute the power-per-processing event values using updated (e.g., newly-measured) total power consumption values. In other examples, the device may instead switch to using default power-per-processing event values. In still other examples, depending upon resource availability with the data storage device, the device may send the updated total power consumption values and other data to a host device, which performs the off-line least squares procedure to update the power-per-processing event values, then sends the updated values to the data storage device for use therein. In yet other examples, one or more parameters used in the least square procedure may be adjusted to improve the accuracy of the procedure. One such parameter, described below, is a configurable weight a. The parameter may be adjusted, for example, based on the temperature of the device as measured by a temperature sensor to fine-tune the least squares procedure based on device temperature. Thus, in various examples, the data storage device controls the delivery of power to its various processing devices based on a comparison of an estimated updated total power consumption value and measured updated total power consumption value.

Note that reliability, as the term is used herein, may be quantified or characterized in various ways, such as in terms of accuracy, precision, trustworthiness, correctness, validity, etc. In some examples, an inherent reliability score may be obtained from the OLS inference model for comparison against a suitable reliability score-based threshold. In other examples, an accuracy score (e.g., a difference value D) may be obtained by comparing one or more estimated or predicted power-consumption values to one or more measured power consumption values, which are measured after the prediction is made. Note also that power-per-processing may be abbreviated herein as P/PE, where appropriate.

In still other aspects, systems and procedures are described for providing reliable estimation for a "worst case" power consumption per event to enable improved control power usage control to, e.g., improve quality of service (QOS) within an SSD. In this regard, the above-summarized procedures generally operate to generate and process "point-estimation" values for the P/PE values. Even given an optimal point estimation (which may not be the case), the point estimate represents an average value, and there may be deviations of the events from the estimated power. For example, assuming that the average power consumption of a certain event is 40 mW, and assuming that the SSD has estimated the average value correctly, the actual power consumption might be >50 mW in 40% of the cases, which might cause significant performance degradation to the system if not properly accounted for. Accordingly, procedures are described herein for estimating a worst case P/PE value. This may be achieved by an online calibration technique that exploits least-squares (LS)-based Conformal Prediction (CP) so as to provide guaranteed power prediction intervals (as opposed to point predictions).

These and other features are described in more detail below.

Exemplary Devices, Systems and Procedures for Power-Per-Processing Event Assessment FIG. 1 is a schematic block diagram of a system 100 that includes an exemplary DSD 104 embodied as an SSD (or other DSD, but for simplicity referred to as an SSD) including SSD controller 108 configured with a power-per-processing event determination/update component 116 for determining and/or updating power-per-processing event values measured within the SSD and a HW resource server 118 for controlling power usage of various HW processing engines or processing devices based on the power power-per-processing event values, in accordance with some aspects of the disclosure. (Herein, for generality and convenience, the terms "processing devices" and "processing engines" are used interchangeably.)

FIG. 1 also illustrates a set of HW processing engines or devices $\mathbf{120}_1 \ldots \mathbf{120}_N$, which may be, for example, Read transfer engines, Write transfer engines, etc. The processing engines are typically specialized HW devices that perform particular processing operations on NVM data. Herein, the term NVM data refers to data for storage within the NVM, including data to be stored (programmed) on the NVM array 114 or data that has been read from the NVM array 114. Other examples of processing engines include a Program engine, a Sense engine, an Erase engine, a Decrypt engine, etc. The SSD controller 108 also includes a power sensor 122. As will be explained, the power-per-processing event determination/update component 116 may determine and/or adaptively update power-per-processing event values for each of the processing engines $\mathbf{120}_1 \ldots \mathbf{120}_N$ based on total power consumption measurements provided by power sensor 122 to enable the resource server 118 to control the power usage of the processing engines to maintain power usage within a current power budget.

The system 100 also includes a host 102 with the SSD 104 coupled to the host 102. The host 102 provides commands to the SSD 104 for transferring data between the host 102 and the SSD 104. For example, the host 102 may provide a write command to the SSD 104 for writing data to the SSD 104 (using a Write engine of the HW engines $\mathbf{120}_1 \ldots \mathbf{120}_N$) or a read command to the SSD 104 for reading data from the SSD 104 (using a Read engine of the HW engines $\mathbf{120}_1 \ldots \mathbf{120}_N$). The host 102 may be any system or device having a need for data storage or retrieval and a compatible interface for communicating with the SSD 104. For example, the host 102 may be a computing device, a personal computer, a portable computer, a workstation, a server, a personal digital assistant, a digital camera, or a digital phone as merely a few examples.

The SSD 104 includes a host interface 106, an SSD or DSD controller 108, a working memory 110 (such as dynamic random access memory (DRAM) or other volatile memory), a physical storage (PS) interface 112 (e.g., flash interface module (FIM)), and an NVM array 114 having one or more dies storing data. The host interface 106 is coupled to the controller 108 and facilitates communication between the host 102 and the controller 108. The controller 108 is coupled to the working memory 110 as well as to the NVM array 114 via the PS interface 112. The host interface 106 may be any suitable communication interface, such as an NVM express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link. The NVM array 114 may include multiple dies.

In some examples, the host 102 may be a laptop computer with an internal SSD and a user of the laptop may wish to playback video stored by the SSD. In another example, the host again may be a laptop computer, but the video is stored by a remote server.

Although, in the example illustrated in FIG. 1, the SSD 104 includes a single channel between controller 108 and NVM array 114 via PS interface 112, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 108 may be implemented in a single integrated circuit chip and may communicate with different layers of memory in the NVM 114 over one or more command channels.

The controller 108 controls operation of the SSD 104. In various aspects, the controller 108 receives commands from the host 102 through the host interface 106 and performs the commands to transfer data between the host 102 and the NVM array 114. Furthermore, the controller 108 may manage reading from and writing to working memory 110 for performing the various functions effected by the controller and to maintain and manage cached information stored in the working memory 110.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, application specific integrated circuit (ASIC), or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

In some aspects, the power-per-processing event determination/update component 116 may be a separate component from the SSD controller 108 and may be implemented using any combination of hardware, software, and firmware (e.g., like the implementation options described above for SSD controller 108) that can perform the power-per-processing event determination/update operations as will be described in further detail below.

The working memory 110 may be any suitable memory, computing device, or system capable of storing data. For example, working memory 110 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the working memory 110, or a portion thereof, to store data during the transfer of data between the host 102 and the NVM array 114. For example, the working memory 110 or a portion of the volatile memory 110 may be a cache memory. The NVM array 114 receives data from the controller 108 via the PS interface 112 and stores the data. In some embodiments, working memory 110 may be replaced by a non-volatile memory such as MRAM, PCM, ReRAM, etc. to serve as a working memory for the overall device.

The NVM array 114 may be implemented using NAND flash memory. In one aspect, the NVM array 114 may be implemented using any combination of NAND flash, PCM arrays, MRAM arrays, and/or ReRAM.

The PS interface 112 provides an interface to the NVM array 114. For example, in the case where the NVM array 114 is implemented using NAND flash memory, the PS interface 112 may be a flash interface module. In one aspect, the PS interface 112 may be implemented as a component of the SSD controller 108.

Although FIG. 1 shows an exemplary SSD and an SSD is generally used as an illustrative example in the description throughout, the various disclosed embodiments are not necessarily limited to an SSD application/implementation. As an example, the disclosed NVM array and associated processing components can be implemented as part of a package that includes other processing circuitry and/or components. For example, a processor may include, or otherwise be coupled with, embedded NVM array and associated circuitry. The processor could, as one example, offload certain operations to the NVM and associated circuitry and/or components. As another example, the SSD controller 108 may be a controller in another type of device and still be configured to perform or control power management and perform some or all of the other functions described herein.

Figure 2:
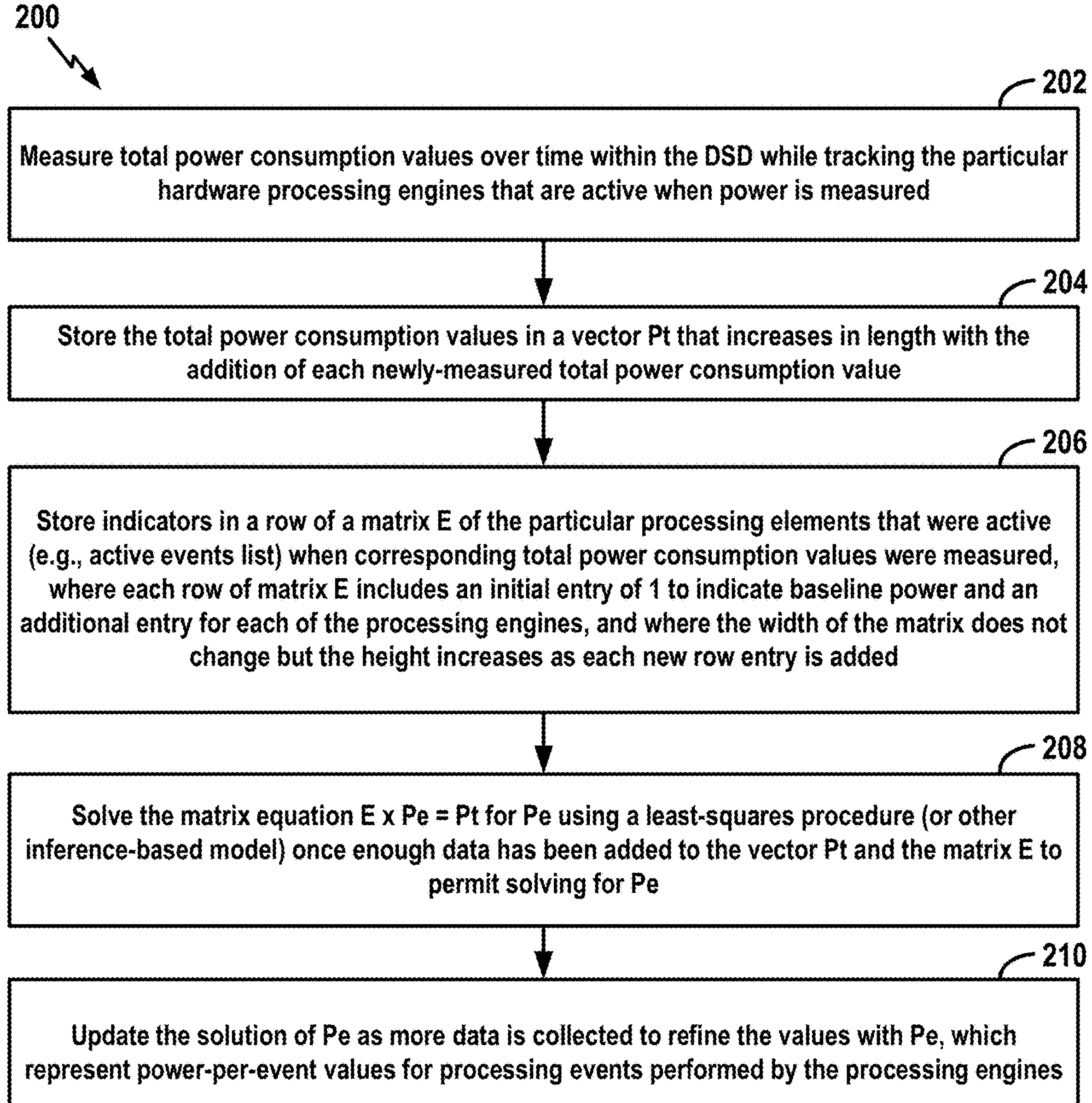
FIG. 2 is a flow diagram illustrating an exemplary method for determining power-per-processing event values based on total power consumption measurements, in accordance with some aspects of the disclosure.

FIG. 2 is a flow diagram 200 that illustrates an exemplary method for determining power-per-processing event values for processing events (e.g., Reads or Writes) performed by a set of hardware processing engines, where each power-per-processing event value represents the power consumed or used by a particular processing engine while performing its operation (i.e., a processing event). For example, the power-per-processing event for the Read engine is the total power consumed (i.e., used) by the Read engine while performing a Read operation. As another example, the power-per-processing event value for an Encrypt engine is the total power consumed (i.e., used) by the Encrypt engine while performing an encryption operation.

The method of FIG. 2 operates to determine an estimated power consumption vector Pe, wherein each value within the vector Pe represents the estimated power-per-processing event for a corresponding one of the processing engine types. Hence, if there are ten processing engine types, the vector Pe will have ten values with each value indicating the number of active engines of the same type. Exemplary types of processing engines include but are not limited to: Write transfer; Read transfer; Program Single-Level Cell (SLC)/Multi-Level Cell (MLC)/Tri-Level Cell (TLC)/Quad-Level Cell (QLC) (1/2/3/4 Bits Per Cell); Sense SLC/MLC/TLC/QLC (1/2/3/4 Bits Per Cell); Fast Sense (e.g., a separate high-speed sense circuit); Erase; error correction coding (ECC) Encode; ECC Decode (e.g., with different modes or "gears"); Encryption; Decryption; DDR interface; HMB (host memory buffer) functions; DSP (digital signal processing) functions including DSP functions with various different bit error estimation scan modes (BES)). Each is given a numerical designator, e.g., Encode Write Transfer=0, Read Transfers=1, etc. Each engine has a corresponding function or operation, e.g., a Write transfer operation, a Read transfer operation, etc.

At 202, a processor (e.g., the power-per-processing event determination/update component 116 of FIG. 1) measures total power consumption Pt within the DSD (or within a part of the DSD that includes all of the processing engines) using a power sensor (e.g., power sensor 122 of FIG. 1) while tracking the hardware processing engines that are active. For example, the processor may obtain a current active events list from a resource server (e.g., resource server 118 of FIG. 1) that lists all of the processing engines active when the total power consumption was measured. The total power consumption Pt represents the power consumed by all currently-active processing engines as well as a baseline power that is consumed even when none of the processing engines is active. Thus, in an example, an active events list and the corresponding total power consumption are obtained periodically. In other examples, the active events list may be obtained whenever a new processing event is initiated or when one is completed or at other times when the processor is triggered to obtain the active events list.

At 204, the processor stores the measured total power consumption values in a vector Pt (or other suitable data storage array) in memory. Hence, in the example where power is measured periodically, a new Pt value is added into the vector Pt periodically. The vector Pt thus increases in length with the addition of each newly measured Pt power value. Each new entry in the Pt vector may be denoted $Pt_0$, $Pt_1$, $Pt_2$, etc.

At 206, the processor stores indicators in a row of a matrix E of the particular processing elements that were active (e.g., an active events list) when corresponding total power consumption values Pt were measured. Each row of matrix E (see, for example, FIG. 3, discussed below) includes an initial column entry of 1 to indicate baseline power and an additional column entry for each of the processing engines. The width (i.e., the number of columns) of the matrix E does not change over time but the height (i.e., the number of rows) of the matrix E increases as each new row entry is added. Thus, each row of the matrix E includes (in addition to its initial 1) a column entry for storing an indicator to indicate whether each particular type of processing engine is active and, if so, how many of the particular type are active. If none are active, a value of 0 is stored in the corresponding entry in the matrix, if one is active, a 1 is stored, if two are active, a 2 is stored, etc.

At 208, the processor solves the matrix equation $E \cdot Pe = Pt$ for Pe using a least-squares procedure (or other inference-based model) once enough data has been added to the vector Pt and the matrix E to permit solving for Pe. Pe is a vector representing power-per-processing event values Pe for processing events performed by the various processing engines. For example, the first entry in Pe (Pe0) represents a baseline power, the second entry (Pe1) represents the power-per-processing event for the 1st processing engine type (e.g., the Encode TLC engine), the second entry in Pe (Pe2) represents the power-per-processing event for the $2^{nd}$ processing engine type (e.g., the Encode SLC engine), and so on. As least-squares methods are well known, the basic least-squares method used to initially solve for Pe will not be described herein in detail.

At 210, the processor updates the solution of Pe as more data is collected (i.e., more rows are added to E and Pt) to refine the values with Pe. A recursive or iterative least-squares method for updating Pe is described below. Initially, the estimate of Pe may be poor if there is relatively little data in the Pt vector and the E matrix when the least-squares method is initially applied. However, as more power measurements are recorded while different combinations of processing engines are operating, the estimate of Pe becomes more accurate to provide increasingly accurate estimates of the power consumed by each individual processing engine. Over time, hundreds of thousands or millions of power measurements may be made to provide accurate estimates of each of the power-per-processing element values and to permit changes in those values over time to be tracked (such as changes that may be due to changes in ambient temperature or changes due to the wear of the NVM die as it ages). Note that the processing events discussed herein may be executed as sequences of processing events or sequences of operations, and the total power for a sequence of processing events can be determined from the power-per-event (P/PE) values of the individual PEs of the sequence.

Note that in the example of FIG. 2, and in many of the other examples herein, the processing devices or engines are HW processing devices/engines. The HW devices or engines can include ASIC and internal Intellectual Property (IP) components, such as a Host Interface Module, a low-density parity check (LDPC) module, a DDR Controller, front end/back end (FE/BE) processors and an FIM as well as different NAND operations (e.g., Read and Write transfers, Erase, and so forth). However, in at least some examples, one or more of the processing devices/engines may be configured other than in hardware, such as in firmware.

Figure 3:
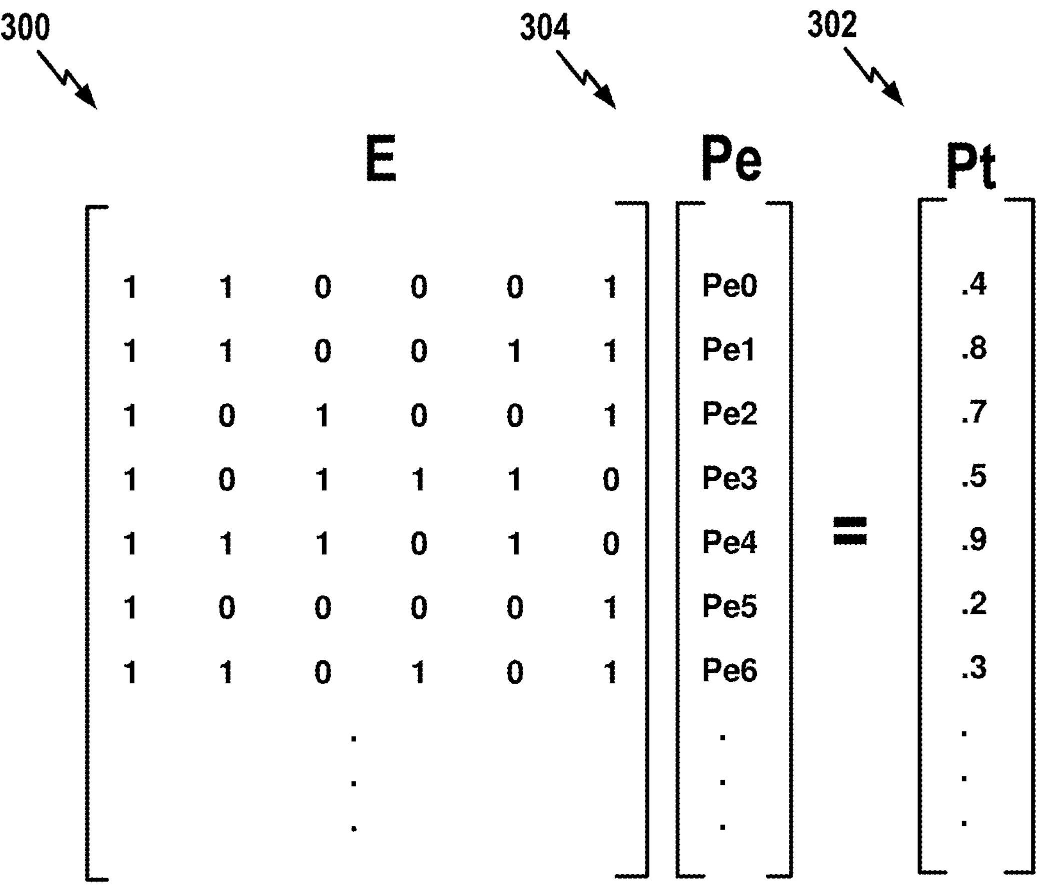
FIG. 3 illustrates an exemplary active events matrix along with a corresponding measured power vector and a power-per-processing event vector, in accordance with some aspects of the disclosure.

FIG. 3 illustrates an exemplary matrix E 300 along with a corresponding Pt 302 vector containing the measured power values and a Pe vector 304, which represents the vector to be solved for. A first column in the matrix E consists of all 1s to represent baseline power. In this simplified example, there are five types of processing engines (hence, six total columns in matrix E) and there is only one instance of each type of engine. That is, there is only one Read transfer engine and only one Write transfer engine, etc. In the illustrative example of FIG. 3, when a first power value Pt was measured, the first and fifth processing engines were active but the others were not, and hence the first row of the matrix E includes [1,1,0,0,0,1]. When the second power value Pt was measured, the first, fourth, and fifth processing engines were active but the others were not, and hence the second row of the matrix E includes [1,1,0,0,1,1]. Additional entries are shown in matrix E where various different combinations of processing engines are active. Note that all of the processing engines are not active at the same time since, in this example, that would exceed the total power budget.

FIG. 3 additionally shows exemplary entries of the corresponding Pt 302 vector, which contains measured values for power. In this example, the exemplary power values are presented in arbitrary units and are scaled between 0 and 1. As shown, the first measured power value corresponding to the first row of matrix E was 0.4, the second measured power value corresponding to the second row of matrix E was 0.8, and so on.

FIG. 3 also shows the entries of the corresponding Pe 304 vector, which are the unknown values to be solved for. As noted, once there are a sufficient number of entries in matrix E and vector Pt, the processing system can solve for Pe. As more data is collected, the solution becomes increasingly overdetermined and least-squares procedures can be used to fit the Pe vector to the matrix E and vector Pt with increasing precision. In a practical example, millions of entries may be collected and, as will be explained below, efficient recursive techniques may be used to adjust previous estimates of the Pe vector as new data is collected.

Note that the computed values in the Pe vector represent the power consumed by each particular type of processing engine while it is operating. This data may then be used to control power delivery. Note also that this information is obtained without needing to measure the individual power consumed by each individual processing engine. Rather, at any given time, only total power consumption is measured. Still further, although in the example of FIG. 3 each entry in the matrix E is either 0 or 1, in other examples, the entries may be 2 or 3 or more, if more than one engine per type is active during a particular interval (such as two concurrent Read operations or two concurrent Write operations).

As shown in FIG. 4, in some examples, the matrix E is an active-HW-engines-matrix E 400 built based on the active-engines measurements (m HW engines, measured at n+1 points of time). Each HW-engine is represented as $E_{ij}$—were i represents the time index, and j represents the engine-index (e.g., Encode SLC=1, Encode TLC=2, Decode SLC=3, . . . ). The value of $E_{ij}$ is equal to the number of active engines of type j at time point i. The vector Pt of length n+1 contains the overall power measurements of the device along time.

As also shown in FIG. 4, in some examples, the relation between the power-per-processing event (i.e., the power-per HW-operation) and the total power can be written as an algebraic matrix expression 402, where Pe is the estimation of power-consumption of each processing event (HW-event) to be computed. That is, each value of Pe represents the power-per-processing event for a corresponding one of the HW processing engines/devices. Given n+1>m (formally, m<number of independent rows of E), a solution may be obtained using a least-squares method. Note that this method provides a closed form automatic technique to estimate the internal power consumption of each processing engine inside a memory device. This estimation can be used by the resource server of the memory device to allocate and manage the power consumption. Since the method uses a systematic approach based on calculations, it can be used also during device characterization to accelerate time-to-market, potentially this reducing time from weeks or months to hours. As noted, the method can also be performed on-line, i.e., by the DSD itself.

As noted, in some examples, power is measured periodically and so the time interval between two consecutive lines or rows of the matrix E is the same. In other examples, though, the time interval between two consecutive lines or rows of the matrix E may not be the same and can have variations. When using the procedure on-line in a DSD to estimate the power-per-processing event of different processing engines (e.g., the power consumed by, or associated with, a Read event or an Encrypt event), variations in the time intervals do not present a problem since the goal is to estimate power consumed per processing event and not power consumed per unit interval of time. The procedure operates to correlate power usage with processing events and, as more and more data is collected, any variations in timing intervals tend to average out. That is, it is sufficient that there is a correlation between measured power values and particular power engines operating when the power measurement is made. In examples where a power measurement is made at periodic time intervals, the power-per-unit time could be computed as well based on the time intervals.

Figure 5:
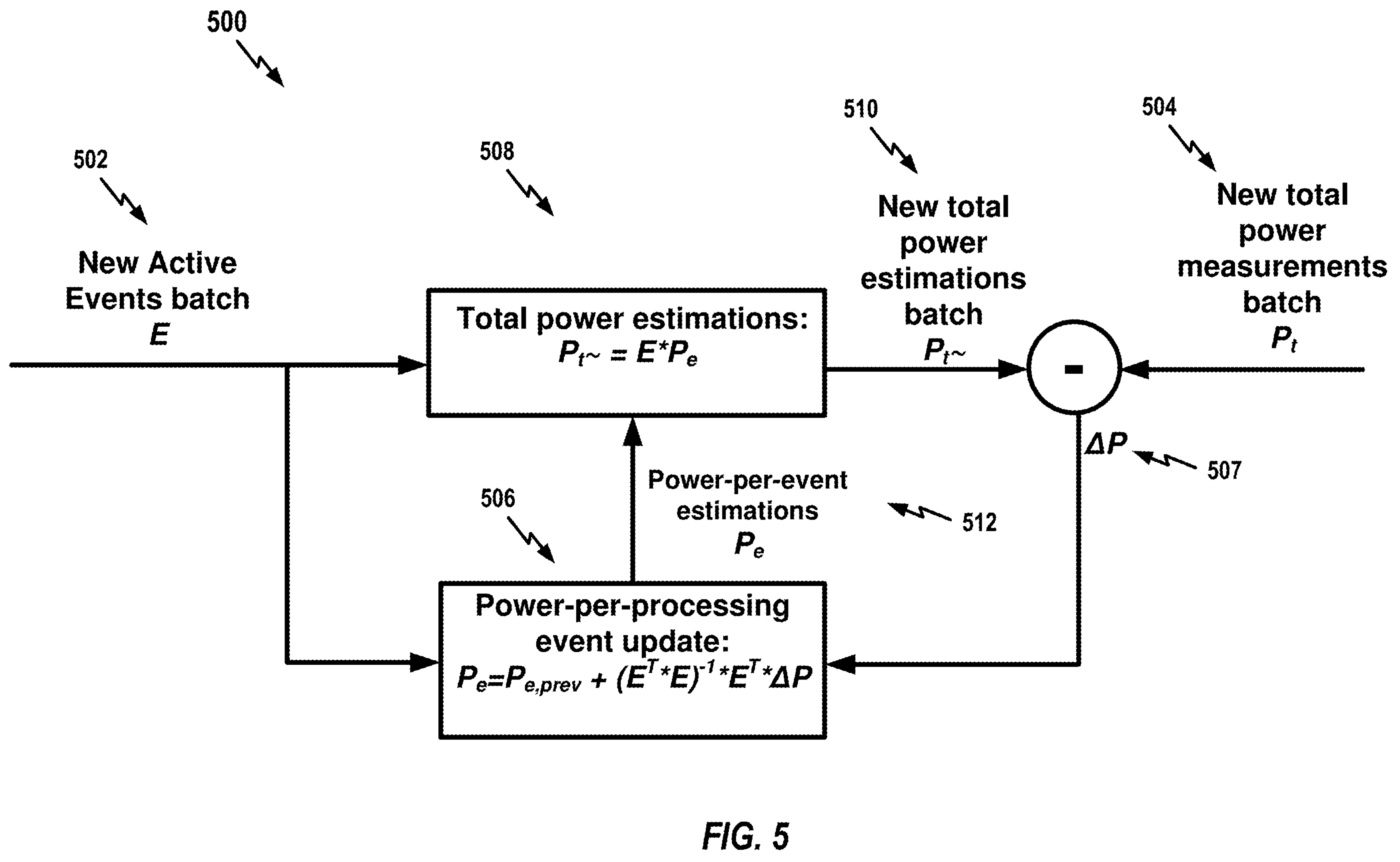
FIG. 5 illustrates a general form of a recursive or iterative least-squares procedure, in accordance with some aspects of the disclosure.

FIG. 5 illustrates a general form of a recursive or iterative least-squares procedure 500 for updating the Pe values based on new E values and new $P_t$ values. A new batch 502 of active events E is input, which may be a matrix E that includes one or more new rows listing recently active (or recently completed) processing events. Concurrently, a new batch 504 of total power measurement values is input, which may be a vector Pt 504 that includes one or more new entries of total power measurements corresponding to the new active events in E.

E is applied to a power-per-processing event update formula 506, which also receives a ΔP vector 507 that represents the difference between the newly received Pt vector and the last previous $P_t$ vector 510 (denoted $P_t^{-}$). The formula of block 506:

$$P_e = P_{e,prev} + \left(E^T * E\right)^{-1} * E^T * \Delta P \quad \text{(Eq. 1)}$$

operates to update the last previous $P_e$ vector (denoted $P_{e,prev}$) based on the new E and ΔP to yield a new updated Pe vector 512.

The new updated Pe vector 512 and the new E 502 are applied to the total power estimations formula in block 508:

$$P_t^{\sim} = E * P_e \tag{Eq. 2}$$

that generates a new total power estimations vector $P_t^{\sim}$ 510 that can be compared with yet another new $P_t$ 504 to determine yet another new value for ΔP 507 and so on. The procedure of FIG. 5 thus continuously or periodically updates the power-per-processing event estimations, each time a new batch of active events E and their corresponding total power estimation measurements $P_t$ are available.

A simple low-complexity variant, which operates on a single total power measurement and its corresponding active events vector and does not require any on-line matrix inversion and computation on large matrixes, will now be described. Assuming an initial $P_e$ vector has been computed using Least-squares (where $P_e=P_{e0}, P_{e1}, \ldots, P_{em}$—representing the power-per-processing event for each of the m+1 engines), then each time i a new total power measure $P_{t\_i}$ and a set of corresponding active events vector $E_i$ is obtained, the device performs an update procedure for the elements in $P_e$ that were active in $E_i$:

$$P_{ej,new} = \alpha \cdot P_{ej,prev} + (1-\alpha) \cdot \frac{1}{E_{i,j}}\left(P_{t,i} - \sum_{j' \neq j} E_{i,j'} \cdot P_{ej',prev}\right) \tag{Eq. 3}$$

In the equation, α is a configurable weight given each new sample (0<α<1) that can be set or optimized empirically (and potentially vary with time, e.g., α may be inversely proportional to the number of samples n that have been processed so far, thus as $P_e$ training progresses, its values become more stable and reduce the impact of new samples which may be noisy).

As an example, assume that only engines 1, 3, and 7 were active at time i (i.e., $E_i$=[1 0 1 0 0 0 1 0 . . . ]). Then, the processor computes new intermediate estimates:

$$P_{e1\_i} = P_{t\_i} - P_{e3} - P_{e7} \tag{Eq. 4}$$

$$P_{e3\_i} = P_{t\_i} - P_{e1} - P_{e7}$$

$$P_{e7\_i} = P_{t\_i} - P_{e1} - P_{e3}$$

Then the processor updates the relevant $P_e$ vector elements:

$$P_{e1} = \alpha \times P_{e1\_i} + (1-\alpha) \times P_{e1} \tag{Eq. 5}$$

$$P_{e3} = \alpha \times P_{e3\_i} + (1-\alpha) \times P_{e3}$$

$$P_{e7} = \alpha \times P_{e7\_i} + (1-\alpha) \times P_{e7}$$

where α is the configurable weight given to each new sample (0<α<1).

These $P_e$ update steps are sufficiently simple to implement in real-time either in a HW implementation or in firmware (FW). Note also that the operations can be implemented with thresholds so that only large changes in Pe values will be reported to the resource server. That is, unless a new Pe value differs by more than a threshold amount ΔX (e.g., 10% or 5% or some other threshold amount) from the previous corresponding Pe value, the previous Pe value is still used for power management. If the new Pe value differs by more than the threshold amount, the new Pe value is used in power management.

Figure 6:
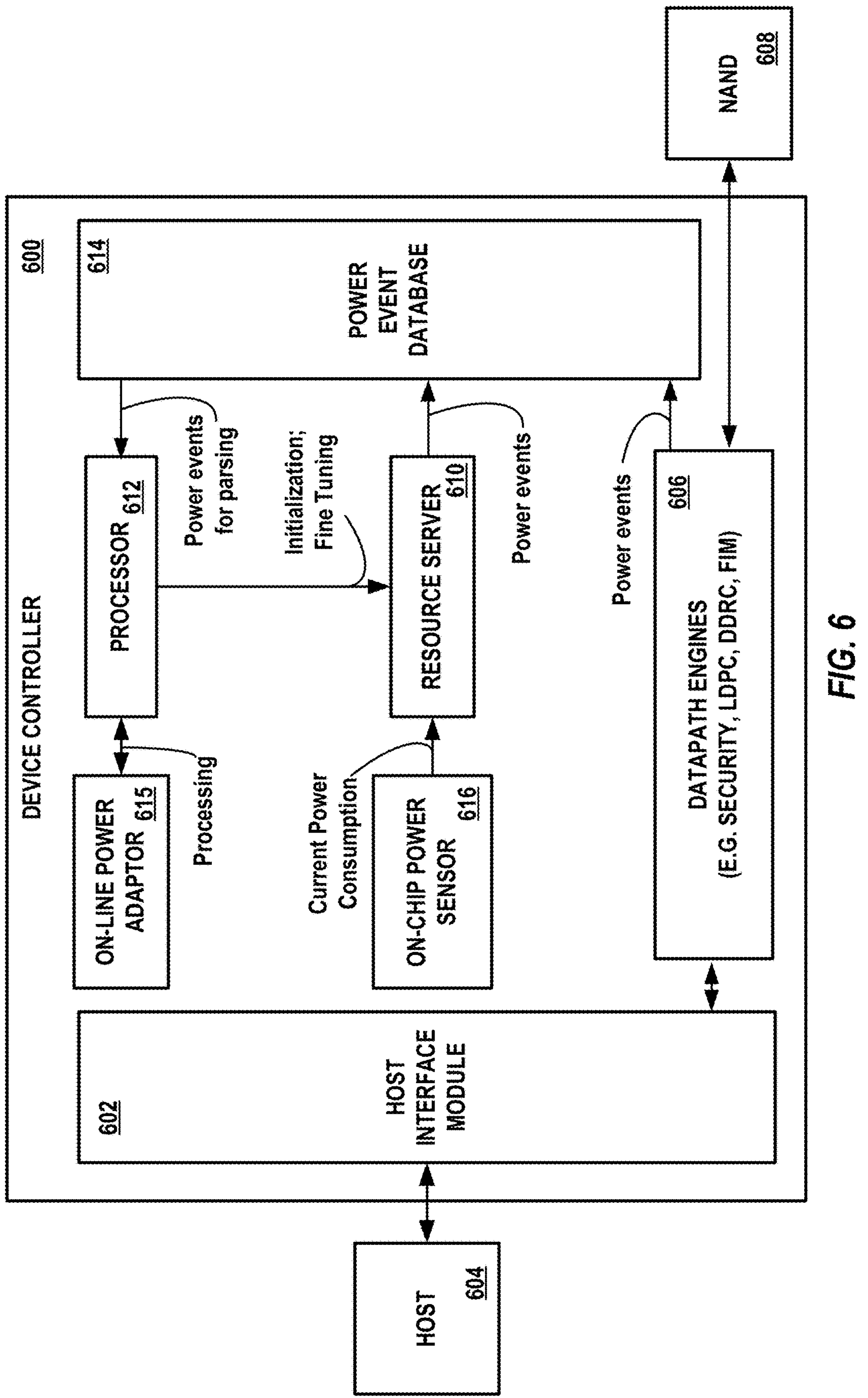
FIG. 6 illustrates selected features of a device controller, including a power-based resource server and an on-line power adaptor, in accordance with some aspects of the disclosure.

FIG. 6 illustrates selected features of a device controller 600 (which may correspond to SSD controller 108 of FIG. 1). Controller 600 includes a host interface module 602 that interfaces with a host 604 for sending/receiving data and commands. A set of data path engines 606 route data between the host interface module 602 and a NAND 608 (or other NVM array). Exemplary data path engines 606 include a security engine, an LDPC engine, a DDR controller (DDRC), and an FIM. A resource server 610 manages the resources in the controller 600, including its power resources. A processor 612 configures the resource server 610 during an initialization stage or phase, which may be based on initial off-line calibration data obtained in a lab. The resource server 610 along with the data-path engines 606 implemented in the system generate power-related events. The events are stored in a Power Event datastore or database 614, which may be implemented with DDR. The power events may be stored in the form of the matrix E and power vectors Pe and Pt described above. Either the resource server 610 or the processor 612 receives notifications regarding the current consumed power from an on-chip power sensor 616. The processor 612 reads a list of processing events from the power event datastore or database 614 from time-to-time (e.g., periodically or when a processing event is completed or at other times when it is triggered to do so) and correlates (or parses) the processing events with consumed power as measured by the power sensor 616. That is, the processor 612 may perform the above-described procedures to compute power-per-processing event values Pe for each processing engine 606. An on-line power adaptor 615 may be configured to evaluate the results (e.g., detect changes in Pe values over time) and provide information to the processor 612 so that the processor 612 may reconfigure (e.g., fine-tune) the resource server 610 to meet a power budget.

Figure 7:
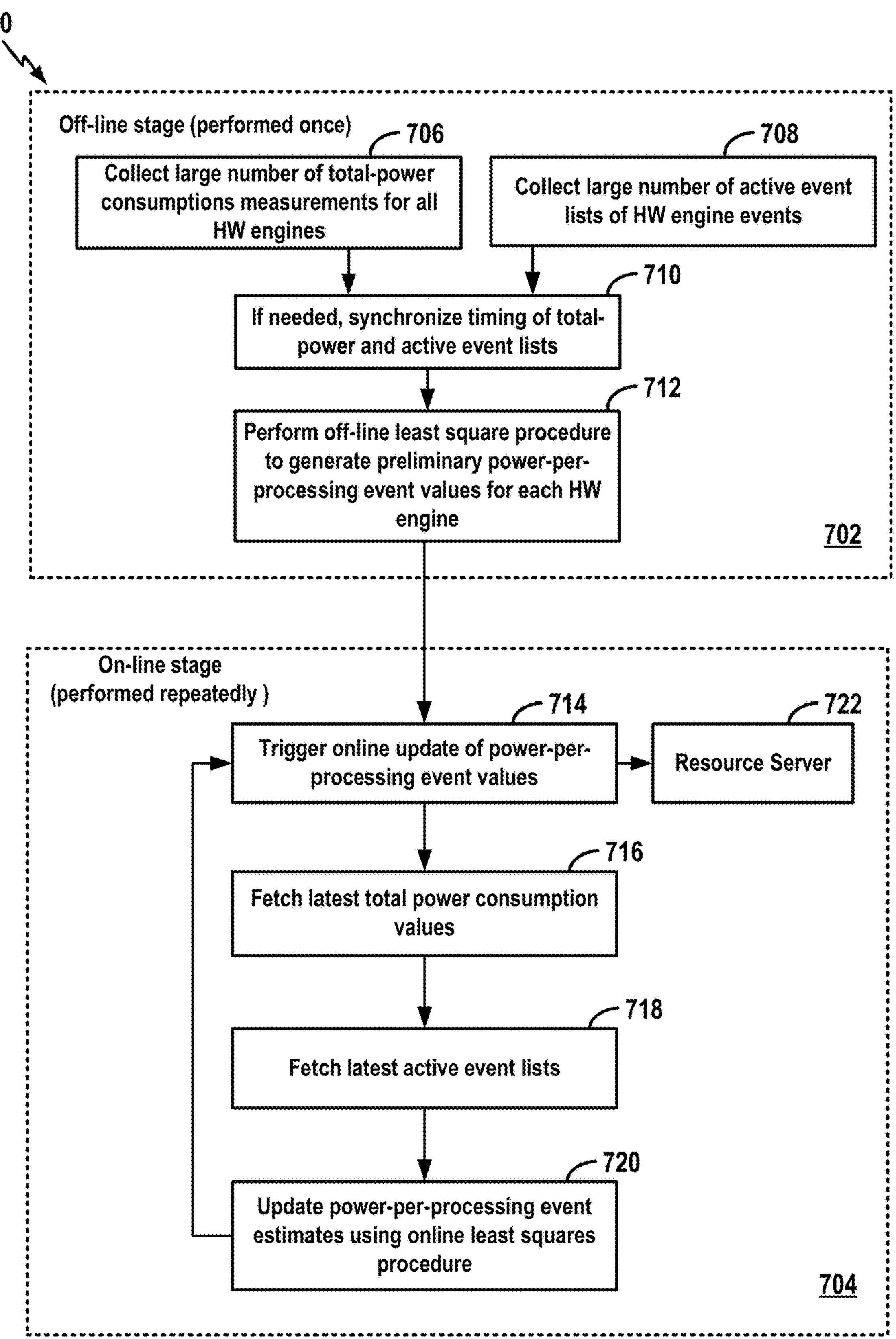
FIG. 7 is a flowchart summarizes an overall procedure for determining and updating power-per-processing event values, in accordance with some aspects of the disclosure.

FIG. 7 summarizes an overall procedure 700 that includes an initial off-line stage 702 that may be performed in a lab during device characterization and an on-line stage 704 that is performed by an SSD after it has been deployed to a user and is operating to store and process user data. Beginning at block 706, a test device (such as a test device in a device characterization lab) collects a large number of total power consumption measurements over a test interval, which may be over a period of minutes or hours. An on-board power sensor (as in FIG. 6) may be used to sense the power for output to the test device.

Concurrently at block 708, the test device collects a large number of corresponding active events, i.e., processing events or operations performed by the HW processing engines of the SSD while the power measurements are obtained. For example, the SSD may output lists of events to the test device. Note that, in some examples, the test device may perform operations (at block 710) to synchronize the timing of the total power measurements and the active events. This may be done, for example, by recording a time stamp along with each power measurement and recording a time stamp along with each active events list. The test device then synchronizes the power measurements with the active event lists using the time stamp information or other information.

At block 712, the test device performs an off-line least-squares procedure to generate an initial estimate of the power-per-processing event. For example, the test device may store the power measurements in a vector Pt and corresponding active event lists in a row of a matrix E (where each row in the matrix includes an initial 1 to represent baseline power, as discussed above), and then determine Pe from E·Pe=Pt. The resulting Pe values may then be stored in the SSD, which is deployed to a user.

At block 714, the SSD triggers the on-line power-per-processing event estimation procedure to update the power-per-processing event values. At block 716, the SSD fetches the latest total power measurement Pt measured by a power sensor in the SSD. At block 718, the SSD fetches the latest active event list (latest values for E) since the last trigger (e.g., fetched from the power event datastore or database shown in FIG. 6). At block 720, the SSD updates the power estimation using the recursive or iterative on-line least-squares procedure described above to update the values for Pe. Alternatively, although less efficient, the SSD may update the power estimation using the procedures of FIGS. 2-4 by: (a) adding an additional row to the current E matrix with each new active events list; (b) adding an additional entry to the current Pt vector with each corresponding total power measurement; and then (c) solving for Pe from E·Pe=Pt.

Processing then returns to block 714 to wait for a next trigger to again update the Pe values. Note that the update can be triggered at fixed times (i.e., periodically or in realtime) or may be triggered on some non-uniform time scale, such as on-demand by a host or as a result of some change in the SSD such as a significant change in operating temperature. As also shown in FIG. 7, the latest updated Pe data is sent to the resource server 722 for use in controlling power usage to, e.g., keep the power within a current budget.

A significant advantage of applying on-line least-squares procedure is that instead of executing only the off-line one-time calculation based on all data collected off-line, the SSD updates the estimations for each extra collected data point, which involves only a minimal calculation cost. This “data point” includes a new power sample and the list of active events at this point of time. The SSD may be configured to check if the new point fits a current power model’s estimation and then conditionally update it accordingly. Moreover, real-time updating is feasible (depending upon the processing capability of the SSD).

In some aspects, rather than performing the off-line stage 702 to determine the preliminary power-per-processing event values (Pe) and values for matrix (E) and vector (Pt), initial “dummy” values might be generated for populating at least one of E, Pe and/or Pt. For example, initial values may be randomly assigned and/or each processing device/engine might be given a unique binary indicator value. Over time, as more and more real data (i.e., new active event lists and corresponding power measurements) are collected by the SSD, the initial dummy values will have less and less of an influence on the estimates of power-per-processing event values so that the estimates will converge on the correct values. Hence, in some examples, the off-line stage 702 of FIG. 7 is not needed even when using the recursive update procedure.

Figure 8:
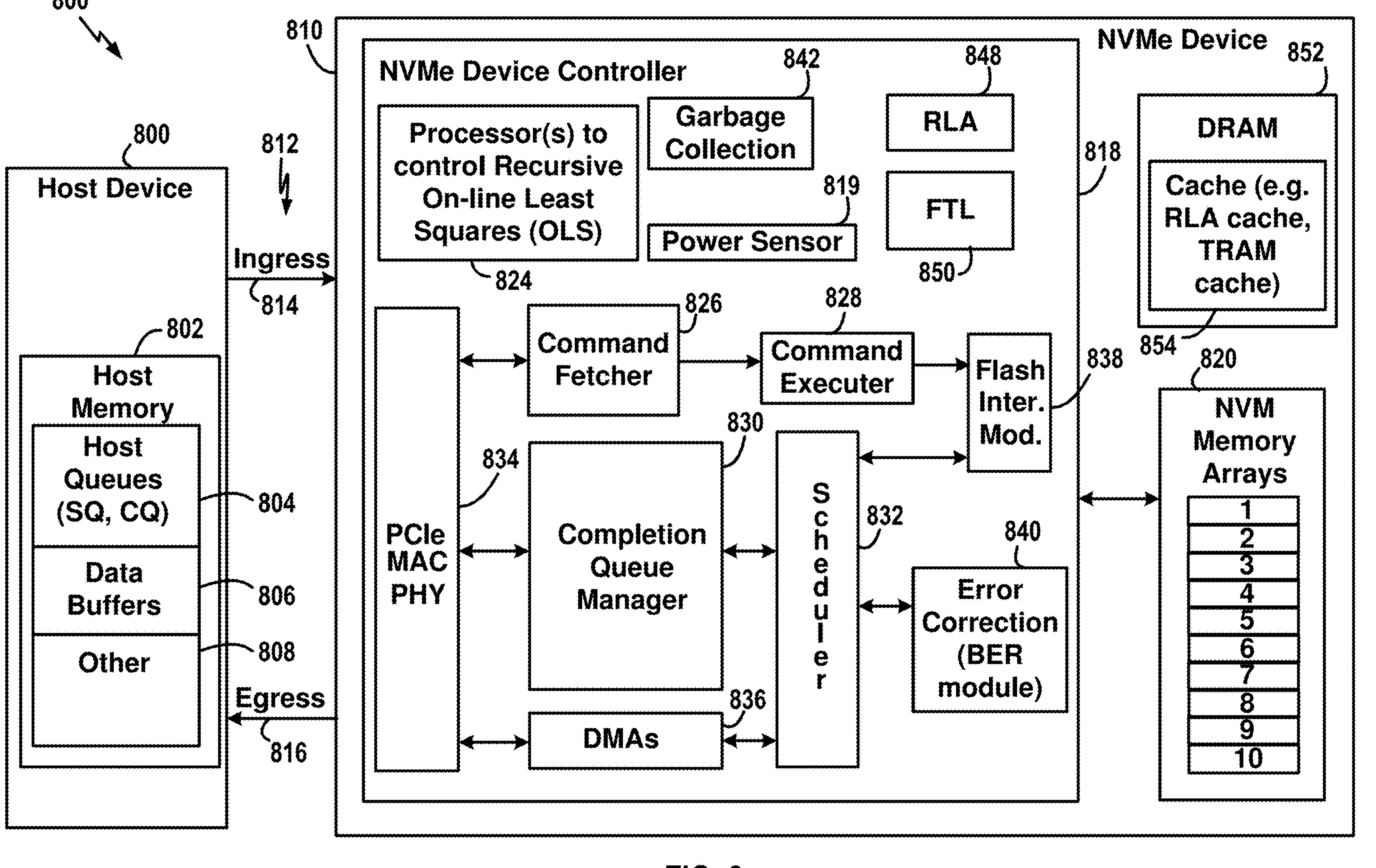
FIG. 8 is a schematic block diagram illustrating an exemplary data storage system with an NVM express (NVMe) device controller, the controller configured to determine and update power-per-processing event values, in accordance with some aspects of the disclosure.

FIG. 8 is a schematic block diagram illustrating an exemplary data storage system with an NVMe device controller 818, the controller configured to perform the above-described recursive or iterative least-squares procedure, in accordance with some aspects of the disclosure (or the non-iterative version of the procedure). The system includes a host device 800 that may be any suitable computing or processing platform capable of accessing memory on an NVM data storage device to write data using NVMe procedures. The host device 800 includes an internal memory 802, which in this example is dynamic random-access memory (DRAM). The host memory 802 may be configured to include, as shown, various host submission queues (SQs) and completion queues (CQs) 804, data buffers 806 and other memory components 808. The host device 800 may store data in an NVMe storage device 810. The NVMe device 810 may be any suitable device that provides non-volatile memory storage for host device 800 in accordance with NVMe standards. For example, the NVMe device 810 may be a removable storage device, such as a flash SSD that is removably connectable to host device 800. In another example, the NVMe device 810 may be non-removable or integrated within the host device 800. In some embodiments, the host device 800 and the NVMe device 810 are communicatively connected via a PCIe bus 812 (including ingress 814 and egress 816).

The NVMe storage device 810 of FIG. 8 includes an NVMe controller 818 and a non-volatile memory 820. The NVMe controller 818 controls access to the non-volatile memory 820 such as a NAND. The NVMe controller 818 thus may be a non-volatile memory controller that implements or supports the NVMe protocol, and the non-volatile memory 820 may be implemented with two dimensional (2D) or three dimensional (3D) NAND flash memory. The NVMe controller includes one or more processors 824 configured to control/manage the recursive or iterative on-line least-squares (OLS) procedure. The processor(s) 824 are also responsible for the execution of other front-end and back-end tasks.

In operation, a command fetcher 826 of the NVMe controller 818 fetches commands, such as read requests for data, from the submission queues within the host memory 802 and forwards the commands to a command executer 828. The command fetcher 826 is responsible for fetching and parsing the commands from the host and queuing them internally, and may form part of a front end of the NVMe controller 818. The command executer 828 is responsible for arbitrating and executing the commands (and can include various processing devices/engines for executing the commands). Upon completion of the commands, the NVMe controller 818 generates completion entries that are ultimately directed to the completion queues within the host memory 802. A completion queue manager 830 is responsible for managing the host completion queues. Among other functions, the completion queue manager 830 routes completion entries received from a scheduler 832 to a completion queue within the host device 800 via a PCIe MAC PHY interface 834.

Actual streams of data (obtained as the result of read commands applied to the NVM memory arrays 820) are delivered to the host device 800 using one or more DMAs 836. Additional components of the NVMe controller 818 shown in FIG. 8 include an FIM 838, which is responsible for controlling and accessing the memory arrays 820, and an ECC component 840, which includes a bit error rate (BER) module. The BER module may represent another example of a processing device/engine.

Additional components of the NVMe controller 818 include: a garbage collection module 842 for controlling garbage collection and related tasks; a read look ahead (RLA) controller 848; and a flash translation layer (FTL) 850. Note that some of these components may be part of the flash interface module 838 but are shown separately for the sake of completeness and convenience. The NVMe storage device 810 may additionally include a DRAM 852 (or other working memory), which may include a cache 854.

In one aspect, the recursive or iterative OLS processor 824 can perform one or more of the actions of process 500 in FIG. 5 or the OLS stage 704 of FIG. 7. For example, in one aspect, the recursive or iterative OLS processor 824 may update power-per-processing event values based on measured total power consumption and active event lists based on total power consumption measurements made by a power sensor 819. In one aspect, the OLS processor 824 can be implemented as a single processor. In another aspect, the OLS processor 824 can be implemented with a main processor and a secondary processor (e.g., a physical storage or PS processor). The main processor can be directed to performing the general functions of the controller 818, while the PS processor can be directed to performing the functions (e.g., Reads and Writes) related to communication with the memory arrays 820.

In one aspect, the host 800 or the NVMe device 810 includes or acts as a resource server that allocates certain units of power for the device. The techniques described herein for saving power can help the device 810 comply with the power allocations set forth by the resource server. In one aspect, the active events lists may be generated by the command executer 828 and stored in DRAM 852.

Figure 9:
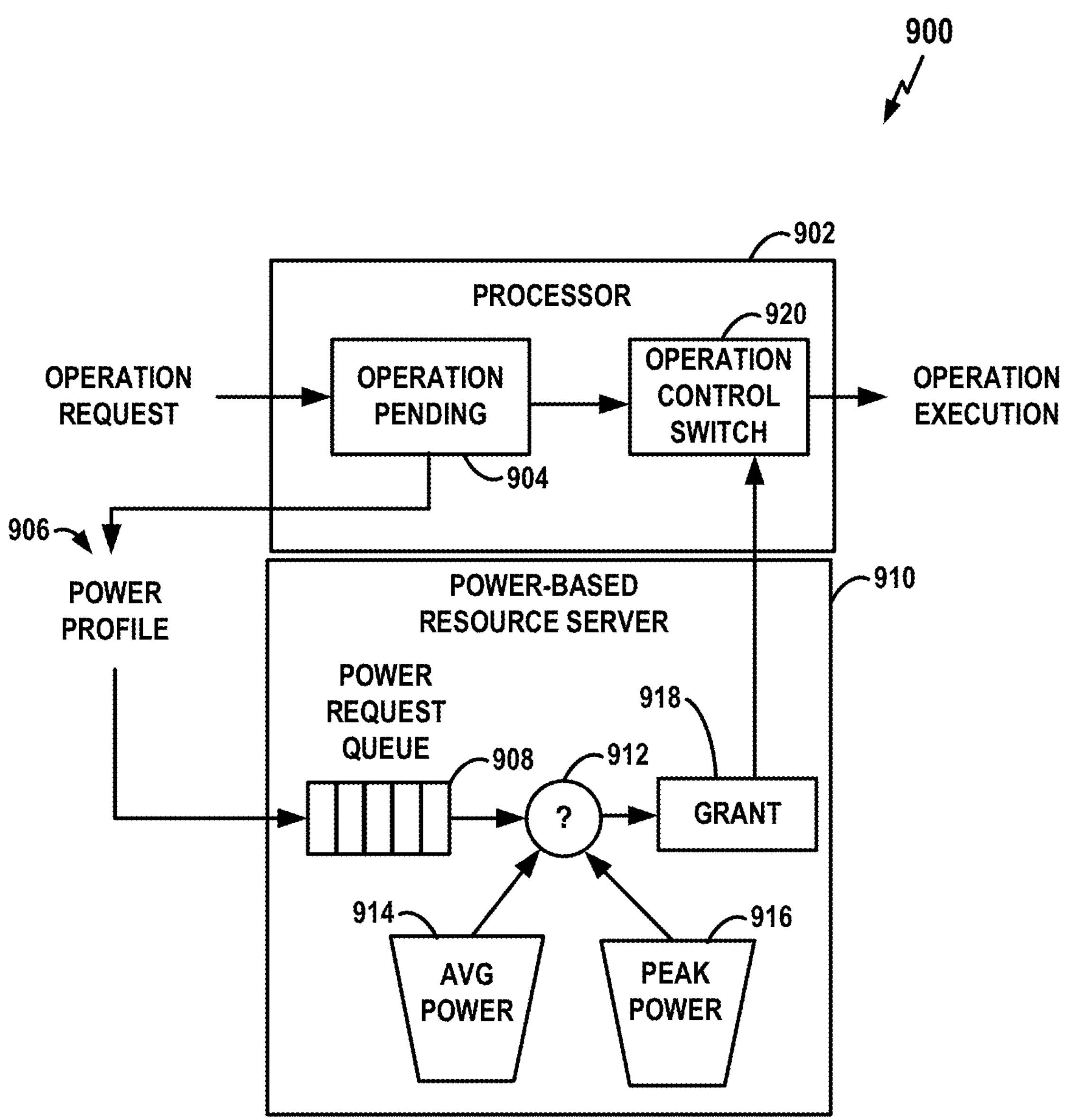
FIG. 9 is a schematic block diagram illustrating aspects of a power control/management system of an SSD, in accordance with some aspects of the disclosure.

FIG. 9 is a block diagram illustrating aspects of a power control/management system 900 of an SSD. A processor 902 receives an operation request (e.g., a Read transfer or a Write transfer operation from a host, which may be in the form of a Read or Write command) and saves the request as a pending operation 904. A power profile 906 is generated by the processor for the operation, which may specify the power-per-processing event value for the particular operation (which may also be referred to as a processing event). The power profile 906 is inserted into a power request queue 908 of a power-based resource server 910, which may already have various operations in the queue 908. A decision component 912 of the resource server 910 determines whether the SSD has sufficient power to execute one or more entries in the queue based on average power information 914 and peak power information 916 of currently executing operations. If there is sufficient power to perform the operation without exceeding average and peak power limits (in accordance with a current power budget), the resource server grants the request by allocating the power and a grant component 918 sends a signal to an operation control switch 920 within the processor 902, which, in turn, forwards the operation to the appropriate HW device/engine for execution. Operation requests remain in the queue 908 until power can be allocated. The HW devices or engines can include ASICs, internal IP components, such as the Host Interface Module, LDPC, DDR Controller, FE/BE processors and FIM) of FIG. 8 as well as different NAND operations components (e.g., Read and Write transfers, Erase, and so forth). As noted above, processing events may be executed as sequences of processing events. The resource server may be configured to control power by assessing the total power of a sequence of processing events, as well as individual events. In the following, various general exemplary procedures and systems are described.

Additional Exemplary Apparatus and Procedures

Figure 10:
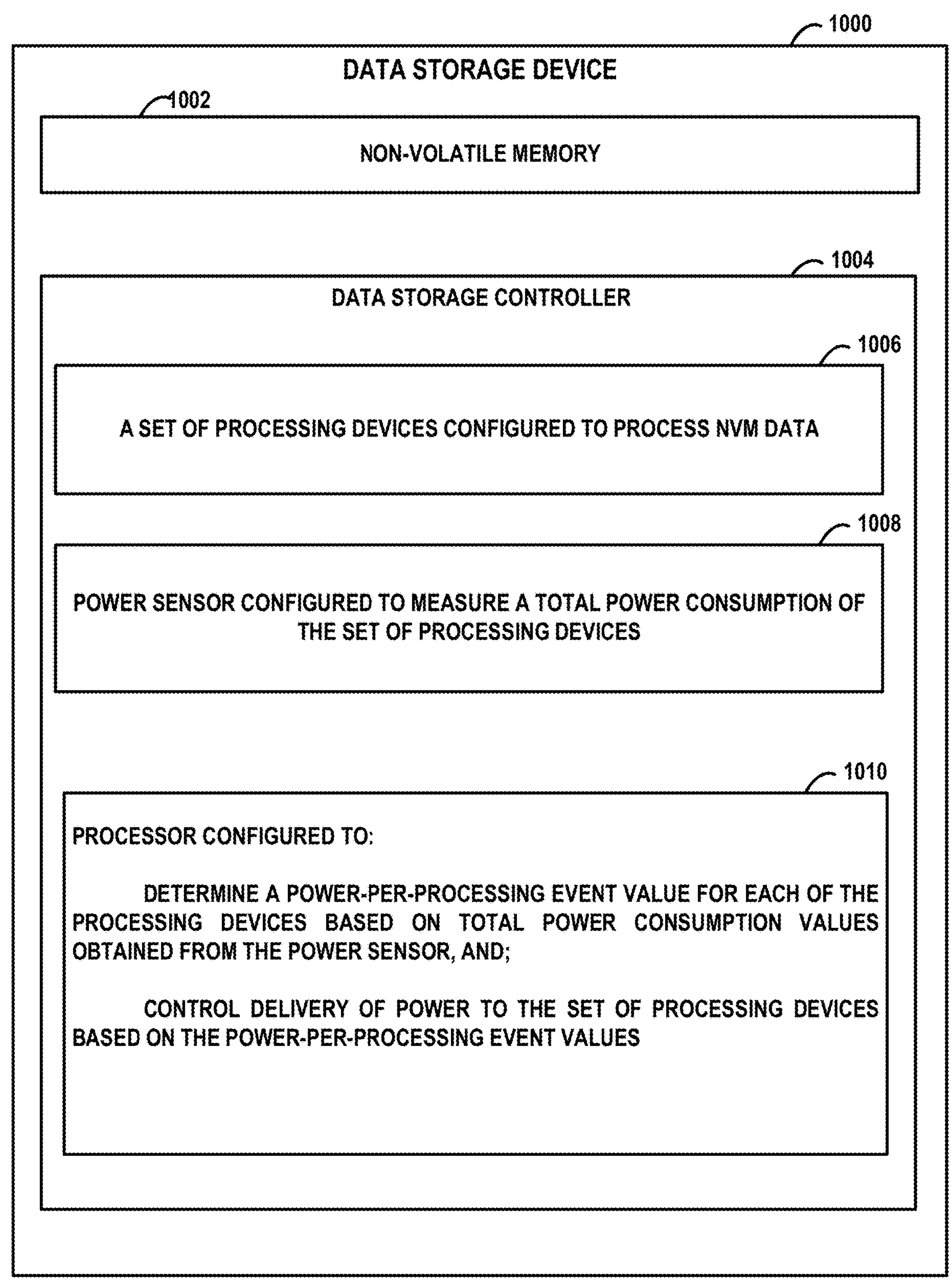
FIG. 10 is a schematic block diagram illustrating an exemplary data storage device configured in accordance with some aspects of the disclosure.

FIG. 10 broadly illustrates a data storage device 1000 configured according to one or more aspects of the disclosure. The data storage device 1000 includes an NVM 1002. In some aspects, the NVM 1002 stores data, such as user data obtained from a host. The data storage device 1000 also includes a data storage controller 1004. The data storage controller 1004 includes a set or plurality of processing devices or engines 1006 configured to process NVM data. For example, each may be configured to perform a processing operation or other processing event on NVM data. As noted above, NVM data refers to data for storage within an NVM, including data to be stored (programmed) on an NVM array or data that has been read from the NVM array. In some aspects, the processing devices are configured to perform different operations on data to be stored in or read from the NVM 1002, where each processing operation is a processing event. The data storage controller 1004 also includes a power sensor 1008 configured to measure a total power consumption of the set or plurality of processing devices 1006 and a processor or processing circuit 1010. The processor 1010 is configured to determine a power-per-processing event value for each of the set of processing devices 1006 based on total power consumption values obtained from the power sensor 1008 and control delivery of power to the set of processing devices 1006 based on the power-per-processing event values. The determination of the power-per-processing event value for each of the set or plurality of processing devices 1006 may be made using, e.g., the least-squares procedures described above in connection with FIGS. 2-5. In some aspects, some or all of the processing devices/engines 1006 and the processor 1010 are components of an integrated circuit, such as an ASIC. For example, the various processing devices/engines 1006 may be different circuits or modules within the integrated circuit and the processor 1010 may be another circuit or module within the same integrated circuit. See, for example, the circuits/modules of FIG. 14, described below. In other aspects, some or all of the processing devices/engines 1006 may be separate components formed on separate chips, such as separate ASICs, IPs, etc.

Figure 11:
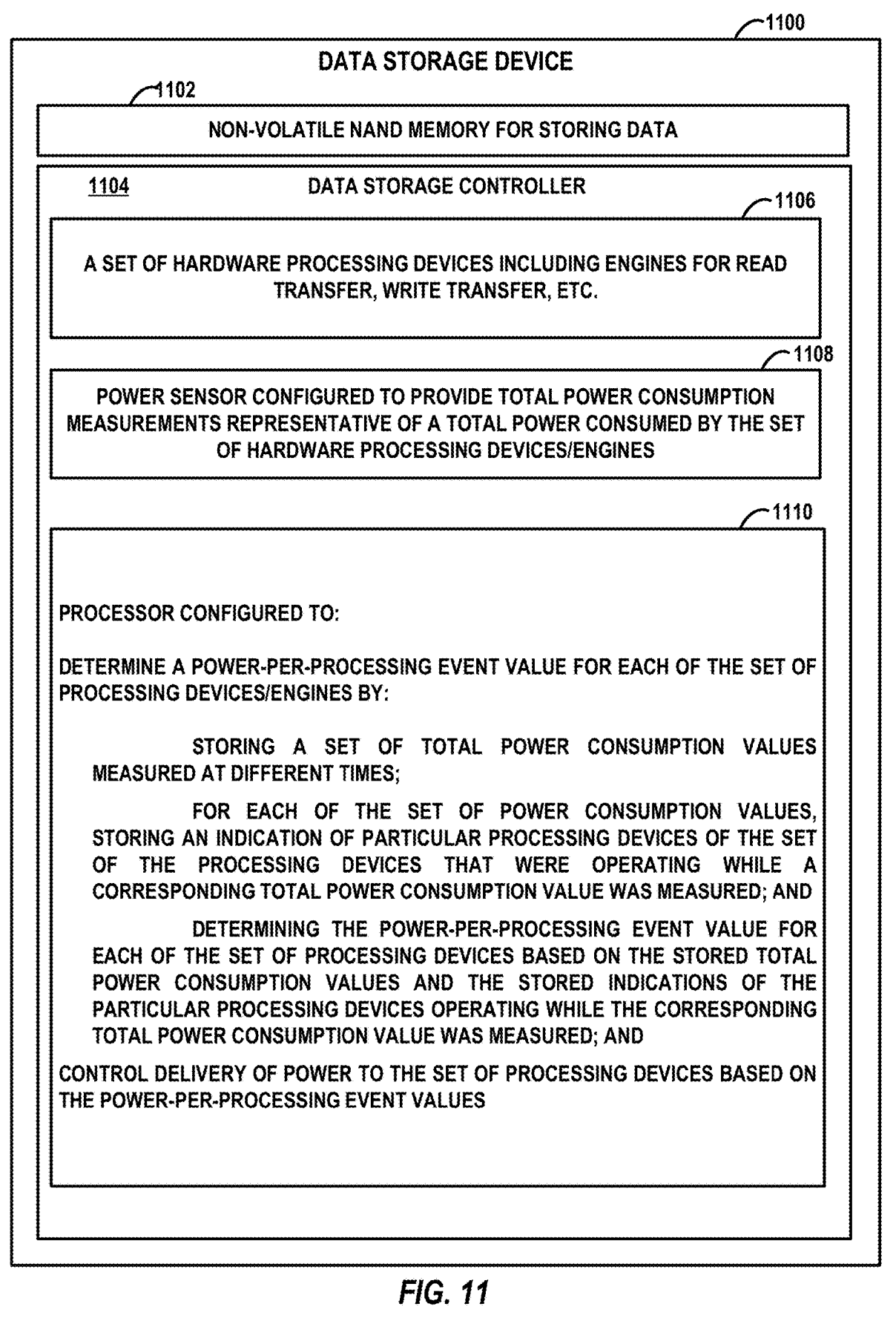

FIG. 11 broadly illustrates another data storage device 1100 configured according to one or more aspects of the disclosure. The data storage device 1100 includes an NVM NAND 1102 for storing data, such as user data obtained from a host, and a data storage controller 1104. The data storage controller 1104 includes a set (or plurality) 1106 of hardware processing devices that includes one or more of a Read transfer engine, a Write transfer engine, etc. (See above for a more complete list of exemplary devices or engines.) Each HW engine or device is configured to perform operations on data, each processing operation being a processing event. Exemplary processing events or operations include one or more of a Read transfer operation, a Write transfer operation, etc. These operations may be initiated, e.g., based on commands received from a host.

The data storage controller 1104 also includes a power sensor 1108 (configured to provide total power consumption measurements representative of a total power consumed by the set of hardware processing devices 1106) and a processing circuit or processor 1110. The processor 1110 is configured to determine a power-per-processing event value for each of the set of processing devices 1106 based on the total power measurements obtained from the power sensor 1108 by: (a) storing a set of total power consumption values measured at different times; (b) for each of the set of power consumption values, storing an indication of particular processing devices of the set of the processing devices that were operating while a corresponding total power consumption value was measured; and (c) determining the power-per-processing event value for each of the set of processing devices based on the stored total power consumption values and the stored indications of the particular processing devices operating while the corresponding total power consumption value was measured. See, again, the least-squares procedures described above in connection with FIGS. 2-5.

The processor 1110 is configured to then control the delivery of power to the set of processing devices 1106 based on the power-per-processing event values by, for example, using the systems and procedures of FIG. 9.

Figure 12:
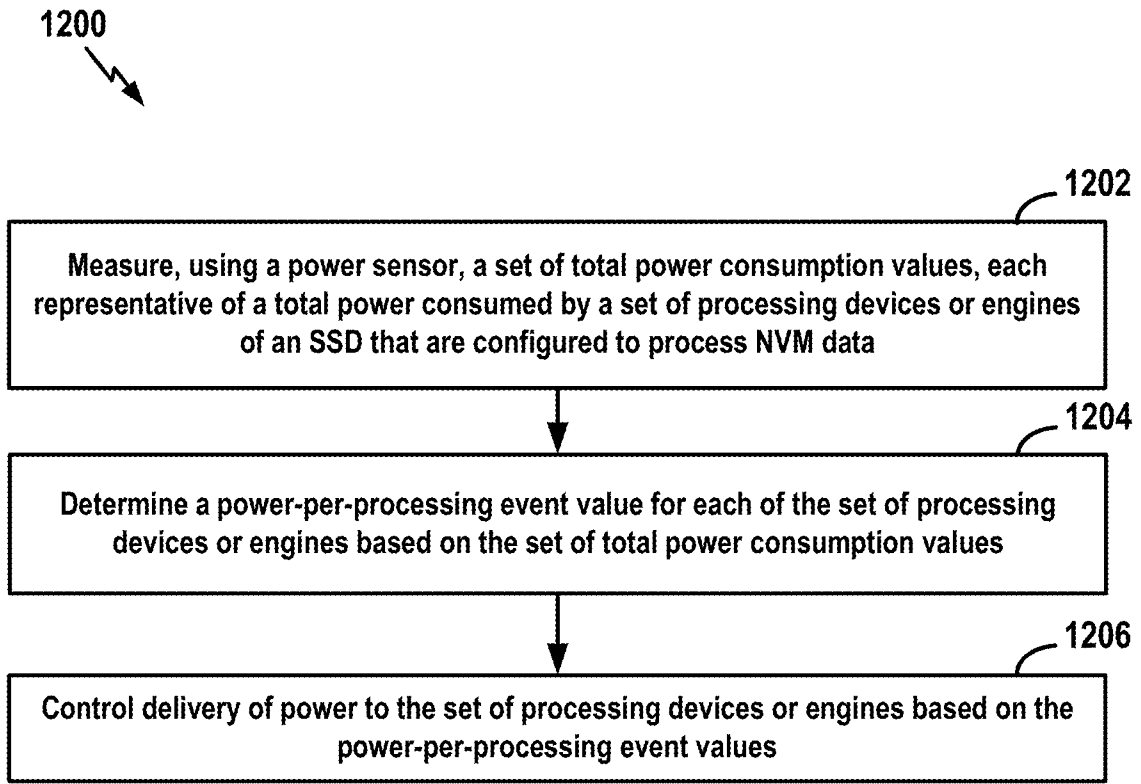
FIG. 12 is a flow chart of an exemplary method according to aspects of the present disclosure.

FIG. 12 illustrates a method or process 1200 in accordance with some aspects of the disclosure. The process 1200 may take place within any suitable data storage device or apparatus capable of performing the operations, such as an SSD configured with a power sensor and appropriate processing circuitry. See, for example, the devices of FIGS. 1, 6, and 8-10, described above, and FIG. 14, described below.

At block 1202, the data storage device measures (using a power sensor within the data storage device) a set or plurality of total power consumption values, each representative of a total power consumed by a set or plurality of processing devices or engines that are configured to process NVM data. The set of processing devices may include, e.g., one or more of a Read transfer engine, a Write transfer engine, etc. (See above for a more complete list of exemplary devices or engines.) The HW engines may be configured to perform operations or other processing events including, e.g., one or more of a Read transfer operation, a Write transfer operation, etc.

At block 1204, the data storage device determines a power-per-processing event value for each of the set or plurality of processing devices or engines based on the set or plurality of total power consumption values. See, e.g., the on-line OLS procedures described above. In some examples, the power-per-processing event values correspond to one or more of a power-per-Read transfer event, a power-per-Write transfer event, etc.

At block 1206, the data storage device controls delivery of power to the set or plurality of processing devices or engines based on the power-per-processing event values to, e.g., maintain power within a power budget.

FIG. 13 illustrates a method or process 1300 in accordance with some other aspects of the disclosure. The process 1300 may take place within any suitable data storage device or apparatus capable of performing the operations, such as an SSD configured with a power sensor and appropriate processing circuitry. See, for example, the devices of FIGS. 1, 6, and 8-10, described above, and FIG. 14, described below.

At block 1302, the data storage device obtains and stores a set or plurality of total power consumption values (for a set of hardware processing devices) measured at different times by a power sensor of an SSD as a power measurement vector (Pt).

At block 1304, for each of the total power consumption values in Pt, the data storage device obtains corresponding indications of particular processing devices/engines that were active (e.g., an active events list) when the power consumption was measured and stores the indications (e.g., the active events list) in a corresponding row of a matrix (E), where a first column of the matrix (E) stores a value indicative of baseline power.

At block 1306, the data storage device determines power-per-processing event vector values (Pe) by performing a least-squares procedure on the matrix (E) and the power measurement vector (Pt) to determine an estimated power consumption vector (Pe), wherein E·Pe=Pt, where each value within the vector (Pe) represents the estimated power consumption of a corresponding one of the processing devices/engines for a corresponding processing event. In some aspects, at least some initial values in the vectors and the matrix may be (a) obtained from a host, (b) randomly generated, or (c) assigned as unique indicator values. (See, above, in the descriptions of the off-line stage 702 on FIG. 7.)

At block 1308, the data storage device obtains an additional total power measurement value Pe and corresponding indications of particular processing devices operating while the additional total power consumption value was measured (e.g., an updated active events list).

At block 1310, the data storage device performs an iterative/recursive least-square procedure to determine an updated estimated power consumption vector (Pe).

At block 1312, the data storage device may control the delivery of power to the set of processing devices or engines based on the power updated-per-processing event values in Pe to, e.g., maintain power within a power budget.

Figure 14:
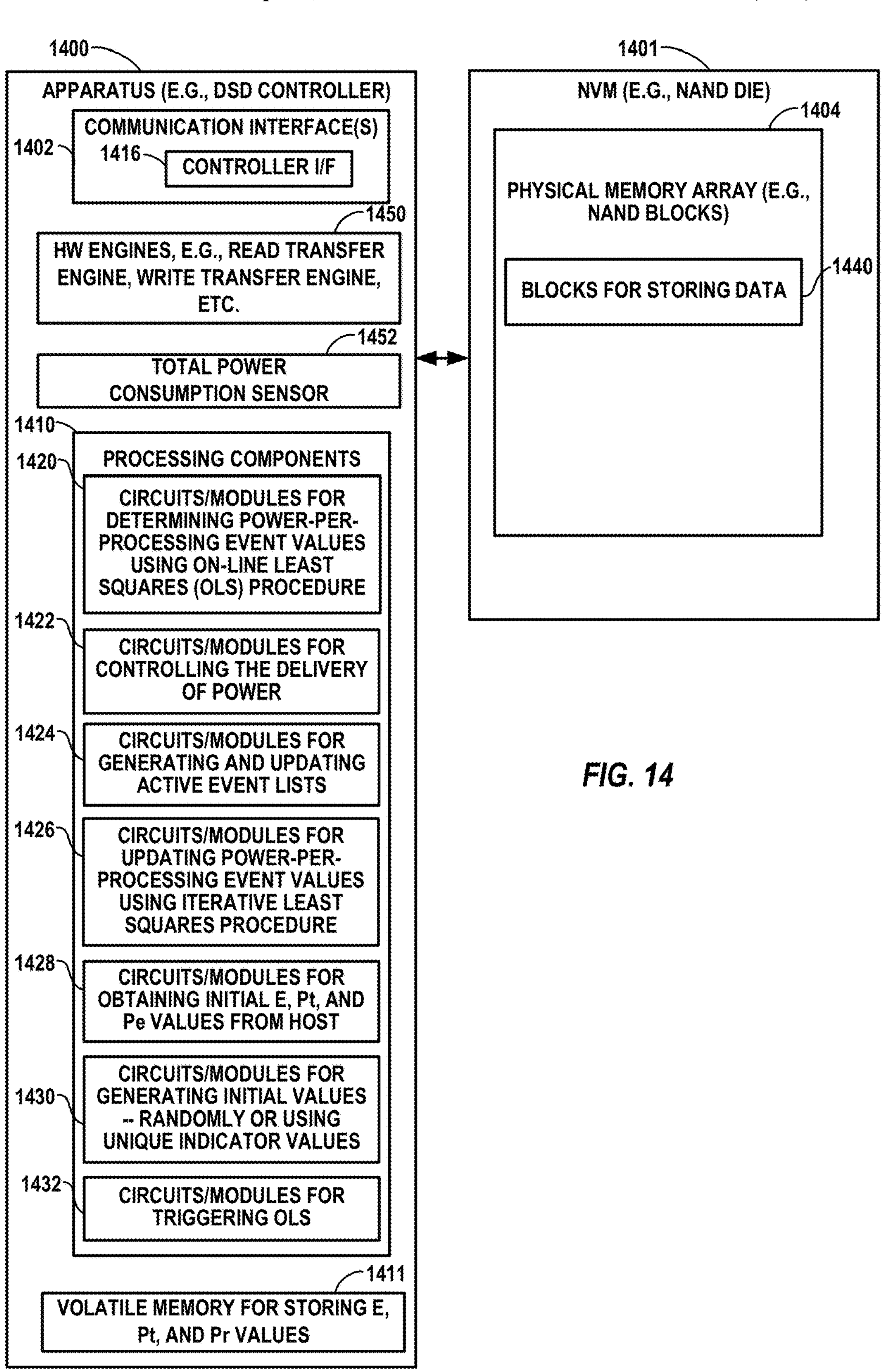
FIG. 14 is a schematic block diagram of an exemplary apparatus configured in accordance with some aspects of the disclosure, which includes components configured for determining power-per-processing event values and controlling power management.

FIG. 14 illustrates an embodiment of an exemplary data storage device or apparatus 1400 configured according to one or more aspects of the disclosure. The apparatus 1400, or components thereof, could embody or be implemented within a data storage controller such as a DSD controller coupled to a NAND die NVM 1401 or some other type of NVM array that supports data storage. In various implementations, the apparatus 1400, or components thereof, could be a component of a processor, a controller, a computing device, a personal computer, a portable device, workstation, a server, a personal digital assistant, a digital camera, a digital phone, an entertainment device, a medical device, a self-driving vehicle control device, an edge device, or any other electronic device that stores, processes, or uses data.

The apparatus 1400 includes a communication interface 1402 and is coupled to a NVM 1401 (e.g., a NAND die). The NVM 1401 includes physical memory array 1404. These components can be coupled to and/or placed in electrical communication with one another via suitable components, represented generally by the connection line in FIG. 14. Although not shown, other circuits such as timing sources, peripherals, voltage regulators, and power management circuits may be provided, which will not be described any further.

The communication interface 1402 of the apparatus 1400 provides a means for communicating with other apparatuses over a transmission medium. In some implementations, the communication interface 1402 includes circuitry and/or programming (e.g., a program) adapted to facilitate the communication of information bi-directionally with respect to one or more devices in a system. In some implementations, the communication interface 1402 may be configured for wire-based communication. For example, the communication interface 1402 could be a bus interface, a send/receive interface, or some other type of signal interface including circuitry for outputting and/or obtaining signals (e.g., outputting signal from and/or receiving signals into a DSD).

The physical memory array 1404 may include one or more NAND blocks 1440. The physical memory array 1404 may be accessed by the processing components 1410.

In one aspect, the apparatus 1400 may also include volatile memory 1411 such as a DDR for storing instructions and other information to support the operation of the processing components 1410, including storing E, Pt and Pe values (described above), active event lists, and any other information needed for performing OLS procedures.

In one aspect, the apparatus 1400 may include a set of HW engines or devices 1450, including, e.g., one or more of a Read transfer engine, a Write transfer engine, etc. (See above for a more complete list of exemplary device or engines.) The HW engines 1450 may be configured to perform operations or other processing events including, e.g., one or more of a Read transfer operation, a Write transfer operation, etc. In some aspects, each of the HW engines/devices 1450 may be different circuits/modules configured for performing different operations. In some aspects, some or all of the processing devices/engines 1450 and the processor components 1410 are components of an integrated circuit, such as an ASIC. For example, the various processing devices/engines 1450 may be different circuits or modules within the integrated circuit and the various processing components 1410 may be other circuits or modules within the same integrated circuit. In one aspect, the apparatus 1400 may also include a total power consumption sensor 1452 for measuring the total power of the set of HW engines 1450 (including any baseline power that may be consumed even when none of the HW engines 1450 is active).

The apparatus 1400 includes various processing components 1410 arranged or configured to obtain, process and/or send data, control data access and storage, issue or respond to commands, and control other desired operations. For example, the processing components 1410 may be implemented as one or more processors, one or more controllers, and/or other structures configured to perform functions. According to one or more aspects of the disclosure, the processing components 1410 may be adapted to perform any or all of the features, processes, functions, operations and/or routines described herein. For example, the processing components 1410 may be configured to perform any of the steps, functions, and/or processes described with respect to FIGS. 1-10. As used herein, the term "adapted" in relation to processing components 1410 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with FIGS. 1-10. The processing components 1410 serve as an example of a means for processing. In various implementations, the processing components 1410 may provide and/or incorporate, at least in part, functionality described above for the components of controller 108 of FIG. 1, processor 612 of FIG. 6, or controller 818 of FIG. 8.

According to at least one example of the apparatus 1400, the processing components 1410 may include one or more of: circuit/modules 1420 configured for determining power-per-processing event values using the OLS procedure described above; circuit/modules 1422 configured for controlling the delivery of power to the HW engines 1450 based on the power-per-processing event values; circuits/modules 1424 configured for generating and updating active event lists representative of particular HW engines active at any given time; circuits/modules 1426 configured for updating the power-per-processing event values using the iterative/recursive least-squares procedure described above; circuits/modules 1428 configured for obtaining initial E, Pt, and Pe values from host (for use in embodiments where an off-line OLS procedure is initially performed (as in FIG. 7); circuits/modules 1430 for generating initial values (e.g., for E, Pt, and Pe) by assigning randomly generated values or by using unique indicator values; and circuits/modules 1432 for triggering the OLS procedure (or the iterative/recursive OLS procedure) based, for example, on a change in device temperature or other factors. The physical memory array 1404 may include blocks 1440 for storing data, such as user data.

In at least some examples, means may be provided for performing the functions illustrated in FIG. 14 and/or other functions illustrated or described herein. For example, the means may include one or more of: means, such as circuits/modules 1420, for determining power-per-processing event values by, e.g., using the OLS procedure described above; means, such as circuits/modules 1422, for controlling the delivery of power to the HW engines 1450 based on the power-per-processing event values; means, such as circuits/modules 1424, for generating and updating active event lists representative of particular HW engines active at any given time; means, such as circuits/modules 1426, for updating the power-per-processing event values using the iterative/recursive least-squares procedure described above; means, such as circuits/modules 1428, for obtaining initial E, Pt, and Pe values from host (for use in embodiments where an off-line OLS procedure is initially performed (as in FIG. 7); means, such as circuits/modules 1430, for generating initial values (e.g., for E, Pt, and Pe) by assigning randomly generated values or by using unique indicator values; and means, such as circuits/modules 1432, for triggering the OLS procedure (or the iterative/recursive OLS procedure) based, for example, on a change in device temperature or other factors.

Still further, in some aspects, the power sensor 1452 provides a means for measuring a total power consumption of a plurality of processing devices. The circuits/modules 1420 provide a means for determining a power-per-processing event value for each of the plurality of processing devices based on total power consumption values obtained from the means for measuring the total power consumption. The circuits/modules 1422 provide a means for controlling delivery of power to the plurality of processing devices based on the power-per-processing event values.

Reliability Assessment of Power-Per-Processing Event Values

In the following, systems and procedures are described for assessing the reliability (e.g., accuracy) of power-per-event value determinations and/or estimates, and then controlling power delivery based on the assessment. As noted above, this may be done, for example, by estimating (or predicting) an updated total power consumption of the data storage device based on initial power-per-processing event values determined by the least-squares procedure and then comparing the estimated (or predicted) updated total power consumption value to a measured updated total power consumption value and controlling power delivery based on the comparison.

Figure 15:
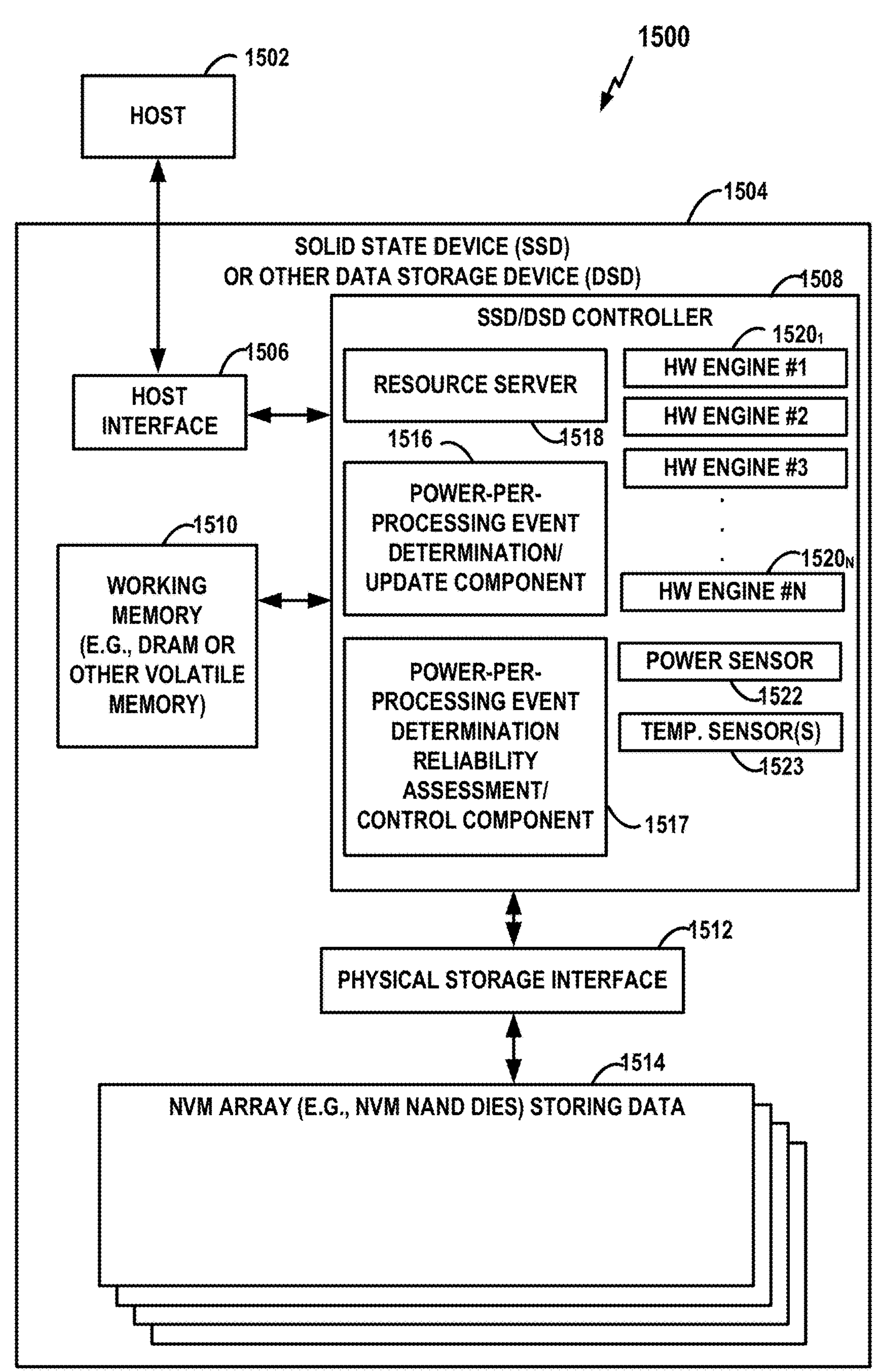
FIG. 15 is a schematic block diagram illustrating another exemplary DSD embodied as an SSD, including an SSD controller configured to determine individual power-per-processing event values based on total power consumption measurements from a power sensor and to assess the reliability of the power-per-processing event values, in accordance with some aspects of the disclosure.

FIG. 15 is a schematic block diagram of a system 1500 that is similar to the system 100 of FIG. 1 but also includes a power-per-processing event (P/PE) determination reliability assessment/control component 1517 and one or more temperature sensor(s) 1523. Components of the system 1500 of FIG. 15 that are the same or similar to those of FIG. 1 will be only briefly described. System 1500 includes a DSD 1504 embodied as an SSD including SSD controller 1508 configured with a P/PE determination/update component 1516 and a HW resource server 1518, along with the P/PE determination reliability assessment/control component 1517, which is configured to assess the reliability (e.g., accuracy) of the P/PE values determined by component 1516 and to control power delivery based on that assessment. In some examples, component 1517 estimates an updated total power consumption value from the P/PE values provided by component 1516, measures an updated total power consumption value using a power sensor 1522, compares the estimated updated total power consumption value to the measured updated total power consumption value, and then controls the delivery of power to a set of processing devices (e.g., HW engines 1520$_1$-1520$_N$) based on the comparison by applying control signals to a resource server 1518.

The system 1500 also includes a host 1502 with the SSD 1504 coupled to the host 1502. For example, the host 1502 may provide a write command to the SSD 1504 for writing data to the SSD 1504 (using a Write engine of the HW engines 1520$_1$ . . . 1520$_N$) or a read command to the SSD 1504 for reading data from the SSD 1504 (using a Read engine of the HW engines 1520$_1$ . . . 1520$_N$). The SSD 1504 also includes a host interface 1506, a working memory 1510 (e.g., volatile memory), a PS interface 1512 (e.g., FIM), and an NVM array 1514 having one or more dies storing data. In some aspects, the P/PE determination/update component 1516 and/or the P/PE determination reliability assessment/control component 1517 may be separate components from the SSD controller 1508 and may be implemented using any combination of hardware, software, and firmware (e.g., like the implementation options described above for SSD controller 108) that can perform the P/PE processing operations.

Figure 16:
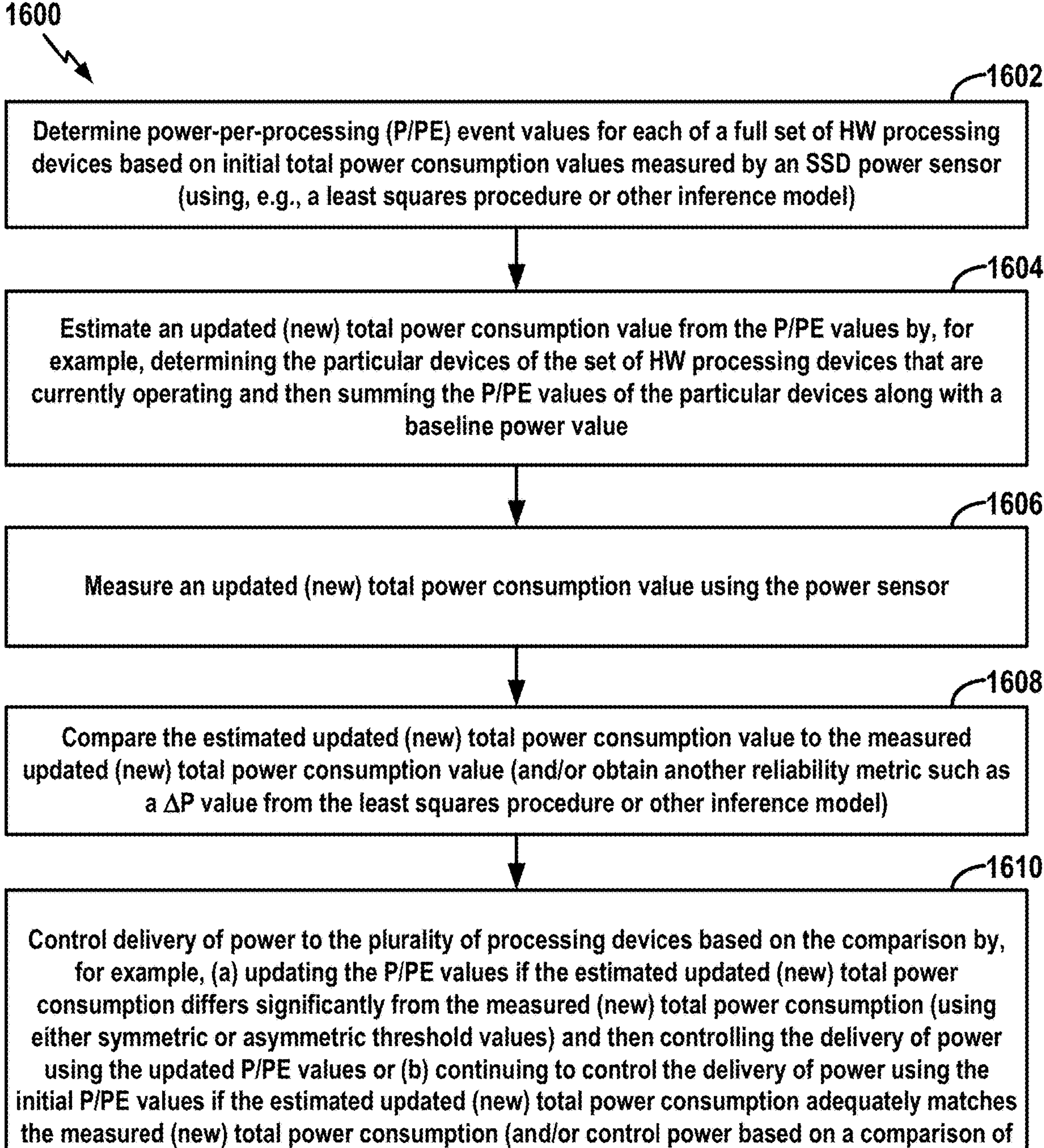
FIG. 16 is a flow diagram illustrating an exemplary method for assessing the reliability of the power-per-processing event values and controlling the delivery of power based, at least in part, of the assessment, in accordance with some aspects of the disclosure.

FIG. 16 is a flow diagram 1600 that illustrates an exemplary method for assessing the reliability (or accuracy) of the P/PE values. The method may be performed, e.g., by the SSD controller 1508 of FIG. 15. Beginning at block 1602, the SSD controller 1508 uses the P/PE determination/update component 1516 to determine P/PE event values for each of a full set of HW processing devices (e.g., HW engines 1520$_1$-1520$_M$) based on initial total power consumption values obtained from a power sensor (e.g., power sensor 1522). The least squares procedures described above or other inference model may be used to determine the P/PE event values. At block 1604, the SSD controller 1508 uses the P/PE determination reliability assessment/control component 1517 to predict, estimate, or otherwise determine an updated (new) total power consumption value (e.g., a new Pt value) from the P/PE values by, e.g., determining the particular devices of the set of HW processing devices that are currently operating (e.g., by fetching events from an active events list) and summing the P/PE values of the particular (active) devices along with the above-described baseline power value.

In one example, if HW engines #1, #2, and #6 are the only HW engines currently operating, then the controller sums the previously-computed P/PE values for HW engines #1, #2, and #6 (e.g., Pe1, Pe3 and Pe6 of FIG. 3) along with the baseline power value. The resulting sum (referred to herein as an estimated updated total power value) should represent the total power Pt currently being consumed by the SSD, so long as the computed P/PE values still properly correspond to the actual power consumed by the corresponding HW components. As noted, changes in the temperature of the SSD or other factors can cause the actual power consumption of devices to deviate from the computed P/PE values. Also note that, in examples where the Pe values computed using the procedures described above correspond to a type of HW device, the computation of the estimated updated total power value should take into account for the number of HW devices of that particular type that are currently running.

At block 1606, the SSD controller 1508 uses the power sensor 1522 to measure an updated (new) total power consumption value. That is, a new value for Pt is measured. At block 1608, the SSD controller 1508 uses the P/PE determination reliability assessment/control component 1517 to compare the estimated updated (new) total power consumption value (e.g., the computed sum) to the measured updated (new) total power consumption value Pt to determine the difference, if any. For example, a difference value (D) may be computed by subtracting the estimated updated (new) total power consumption value from the measured updated (new) total power consumption value Pt and then taking the absolute value thereof. If the computed P/PE values are accurate, then D should be near zero. If the absolute value of D is significantly different from zero, that is an indication that the P/PE values are no longer accurate and should be updated or replaced with default values, if appropriate. Accordingly, in some examples, the absolute value of D is compared to a difference threshold ($T_D$) and, if ABS(D) (also expressed as |D|) is greater than the threshold ($T_D$), an indication is generated that the P/PE values are no longer sufficiently accurate. If ABS(D) is not greater than the threshold ($T_D$), an indication is generated that the P/PE values are sufficiently accurate.

In other examples, rather than comparing the absolute value of D against a single positive threshold $T_D$, the SSD controller compares D (which might be a positive or negative value) to a pair of upper and lower thresholds as follows: $-T_{DL}<D<T_{DU}$, where $T_{DL}$ and $T_{DU}$ may be different (i.e., asymmetric) values. If D is between $-T_{DL}$ and $T_{DU}$, then the SSD controller continues to control the delivery of power using the initial P/PE values. However, if D is either less than $-T_{DL}$ or greater than $T_{DU}$, the SSD controller updates the P/PE values. Asymmetric treatment for positive and negative deviations may be advantageous since, in some cases, underestimating power consumption is more problematic than overestimating power consumption and therefore different threshold values for positive/negative D values can be helpful. Note that the case where the absolute value of D is compared to a single positive threshold may be regarded as a symmetric case.

Note also that the estimated updated (new) total power consumption value of block 1604 may be regarded as a predicted power consumption value, with D representing an accuracy score obtained by comparing the predicted power consumption value(s) to measured power consumption values (or sums of such values), which may be measured after the prediction is made. D thus represents the reliability of the prediction in terms of its accuracy. (D may be regarded as an "experimental" accuracy score in the sense that the predicted power consumption values represent experimental values for comparison against the measured power consumption values.) In other examples, D may be quantified in terms of a reliability score obtained from the OLS procedure using linear regression metrics, e.g., the aforementioned ΔP value 507 of FIG. 5, R-squared scores, or the like. Thus, D is not limited to a simple difference value but more generally represents a difference metric that, e.g., encompasses ΔP values, regression metrics, etc., and so at block 1608 various reliability metrics can be obtained and used. Likewise, the threshold $T_D$ is not limited to an accuracy score threshold and instead may be, e.g., a ΔP threshold, an R-squared threshold, or the like.

At block 1610, the SSD controller 1508 uses the P/PE determination reliability assessment/control component 1517 to control the delivery of power based on the comparison by, for example, (a) updating the P/PE values if the estimated updated (new) total power consumption differs significantly from the measured (new) total power consumption (using either symmetric or asymmetric threshold values) and then controlling the delivery of power using the updated P/PE values or (b) continuing to control the delivery of power using the initial P/PE values if the estimated updated (new) total power consumption adequately matches the measured (new) total power consumption. Power may be controlled, e.g., to maintain power within a power budget. Additionally or alternatively, at block 1610, power may be controlled based on a comparison of the reliability metric (e.g., ΔP) to a suitable threshold (e.g., a ΔP-based threshold). Hence, is should be understood that, in some examples, the device need not estimate a total power consumption nor compare estimated total power consumption against measured total power consumption. Rather, the device may determine the P/PE values using an inference model while generating a reliability score (e.g., ΔP) and then compare the reliability score to a suitable reliability threshold value (e.g., a ΔP-based threshold) to determine whether and how to control power. The reliability threshold may also be called D.

Figure 17:
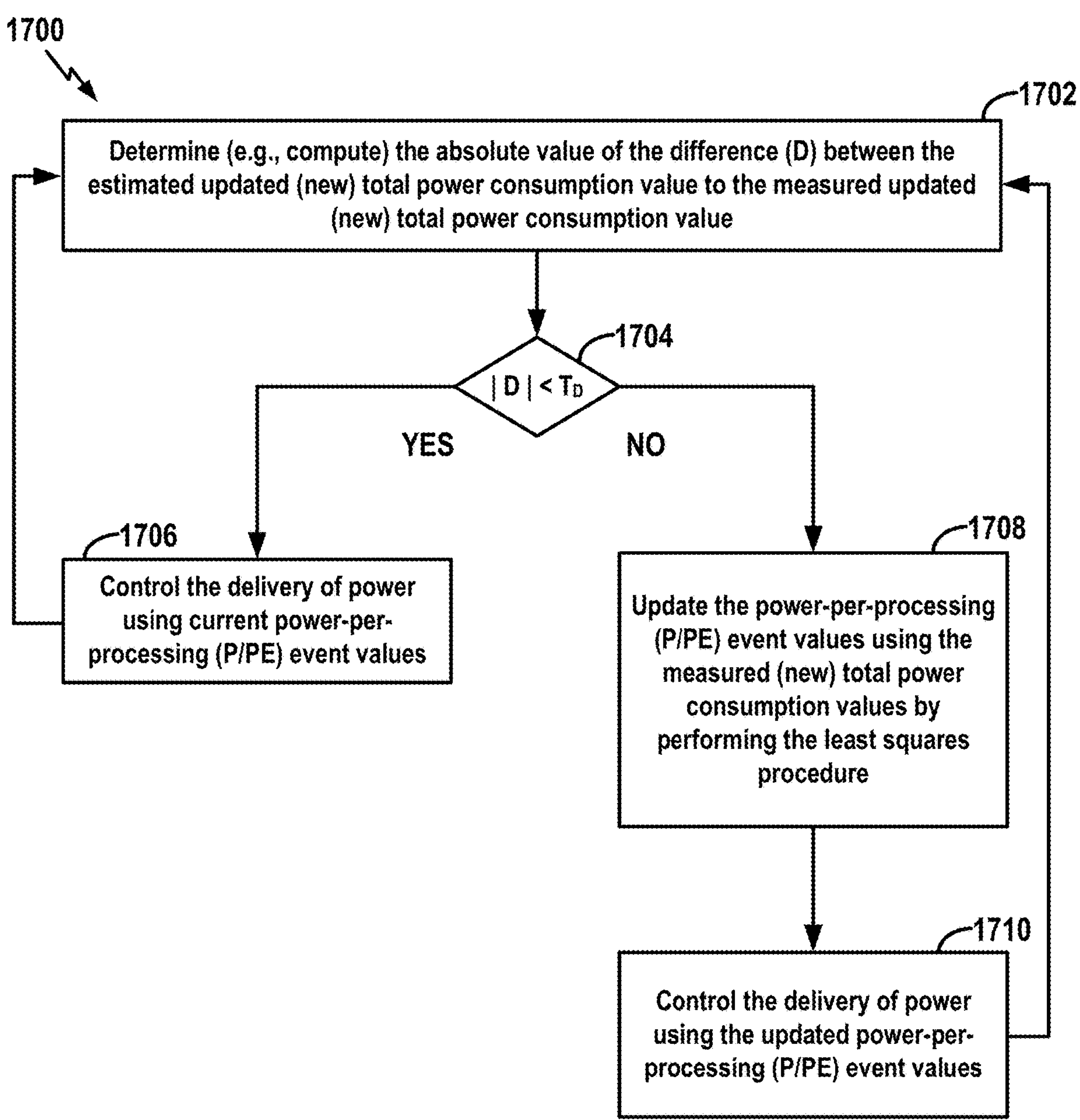
FIG. 17 is a flow diagram illustrating an exemplary method for updating power-per-processing event values, in accordance with some aspects of the disclosure.

FIG. 17 is a flow diagram 1700 that illustrates a first exemplary method for controlling power in an SSD based on a comparison of estimated total power consumption and measured total power consumption. In this example, if the estimated total power consumption differs too much from the measured total power consumption, P/PE values are updated by repeating the least squares procedure with updated data. The method may be performed, e.g., by the SSD controller 1508 of FIG. 15. Beginning at block 1702, the SSD controller 1508 determines (e.g., calculates or computes) the difference (D) between the estimated updated (new) total power consumption value to the measured updated (new) total power consumption value. At decision block 1704, the SSD controller 1508 compares |D| to the threshold Tp. If $|D| < T_D$, then processing proceeds to block 1706 where the SSD controller 1508 controls (or continues to control) the delivery of power using a current set of power-per-processing (P/PE) event values (e.g. the P/PE values determined at block 1602 of FIG. 16). Otherwise (i.e., $|D| \geq T_D$), processing proceeds to block 1708 where the SSD controller 1508 updates the P/PE values using the measured (new) total power consumption values by performing or updating the least squares procedure. At block 1710, the SSD controller 1508 controls the delivery of power using the updated set of P/PE values. In either case, processing returns to block 1702 to update the determination of the difference (D) based on newly measured total power consumption values. The updated set of P/PE values may then be used as the new current P/PE values. In some examples, block 1702 is performed periodically, e.g., once per second or once per minute. In other examples, block 1702 may be triggered based on a triggering event, such as a significant change in SSD temperature or SSD workload, or in response to control signals from a host.

In some examples, a suitable value for the threshold ($T_D$) may be determined in advance during device characterization and programmed into the SSD. In some examples, the difference (D) and the threshold ($T_D$) both may be expressed as percentage differences, such as $T_D$=10%, so that if the newly-measured total power consumption value differs from the estimated total power consumption value by more than 10%, then the values for P/PE are updated. Other percentage values for the threshold ($T_D$) may be set, for example, in the range of 5% to 20%. In some examples, the value for the threshold ($T_D$) may be adaptively adjusted by the device based on various factors such as temperature, workload, age of the device, or other factors such as the deployed usage of the device (e.g., cloud storage, embedded (iNAND) storage, etc.) or current quality of service (QOS). In one example, if the temperature of the device increases or the workload increases, the threshold ($T_D$) may be increased by a corresponding amount to reduce how often the least squares procedure is performed so as to reduce device heat and/or workload.

In other examples, the above-described asymmetric processing may be exploited. That is, rather than comparing the absolute value of D against a single positive threshold $T_D$ at block 1704, the SSD controller compares D (which might be a positive or negative value) to a pair of upper and lower thresholds: $-T_{DL}<D<T_{DU}$, where $T_{DL}$ and $T_{DU}$ may be different values. If D is between $-T_{DL}$ and $T_{DU}$, processing proceeds to block 1706. However, if D is either less than $-T_{DL}$ or greater than $T_{DU}$, processing proceeds to block 1708. That is, if D is a negative number less than $-T_{DL}$, processing proceeds to block 1708. Likewise, if D is a positive number greater than $T_{DU}$, processing also proceeds to block 1708. The same or similar procedures as discussed above for setting/adjusting $T_D$ may be used to set/adjust $T_{DL}$ and $T_{DU}$.

Figure 18:
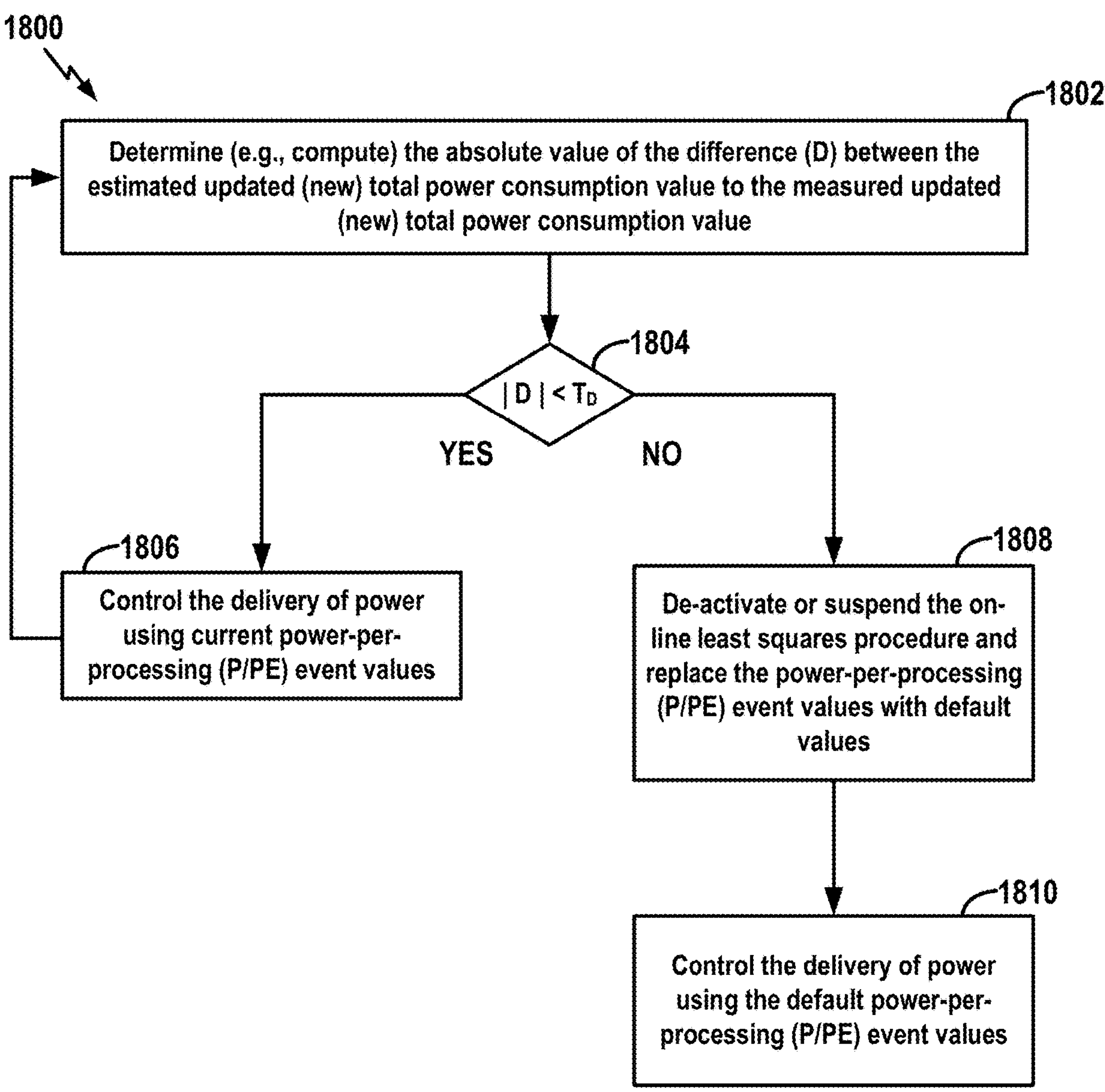
FIG. 18 is a flow diagram illustrating an exemplary method for replacing estimated power-per-processing event values with default values, in accordance with some aspects of the disclosure.

FIG. 18 is a flow diagram 1800 that illustrates a second exemplary method for controlling power in an SSD based on a comparison of estimated total power consumption and measured total power consumption. In this example, if the estimated total power consumption differs too much from the measured total power consumption, P/PE values are replaced with default values. Many aspects of the method of FIG. 18 are the same or similar to the method of FIG. 17 and hence will not be described in detail. The method may be performed, e.g., by the SSD controller 1508 of FIG. 15. Briefly, at block 1802, the SSD controller 1508 determines the difference (D). At decision block 1804, the SSD controller 1508 compares |D| to the threshold $T_D$. If $|D|<T_D$, the SSD controller 1508 controls the delivery of power using a current set of P/PE values at block 1806 and then processing returns to block 1802 to update D based on newly measured total power consumption values. On the other hand, if $|D| \geq T_D$, processing proceeds to block 1808 where the SSD controller 1508 deactivates (or suspends) the on-line least squares procedure and replaces the P/PE values (which had been determined using the least squares procedure) with default P/PE values. (Alternatively, the above-described asymmetric thresholds may be used.) At block 1810, the SSD controller 1508 controls the delivery of power using the default P/PE event values. For example, the default P/PE values may be determined in advance during device characterization and stored in the SSD. In some examples, the default values are the initial P/PE values determined by an off-line least square procedure and then stored in the SSD.

Although not shown in FIG. 18, in some examples, while controlling power using the default P/PE values, the SSD may be triggered eventually to re-activate the on-line least squares procedure to compute new P/PE values to replace the default values, with processing returning to block 1802. For example, the on-line least squares procedure may be re-activated (or un-suspended) following a significant change in SSD temperature or SSD workload or after some set amount of time or based on host control signals. In this manner, default P/PE values may be used for a while when $|D| \geq T_D$, but then the default P/PE values can be replaced eventually with newly computed P/PE values (so long as |D| continues to remain less than $T_D$).

Figure 19:
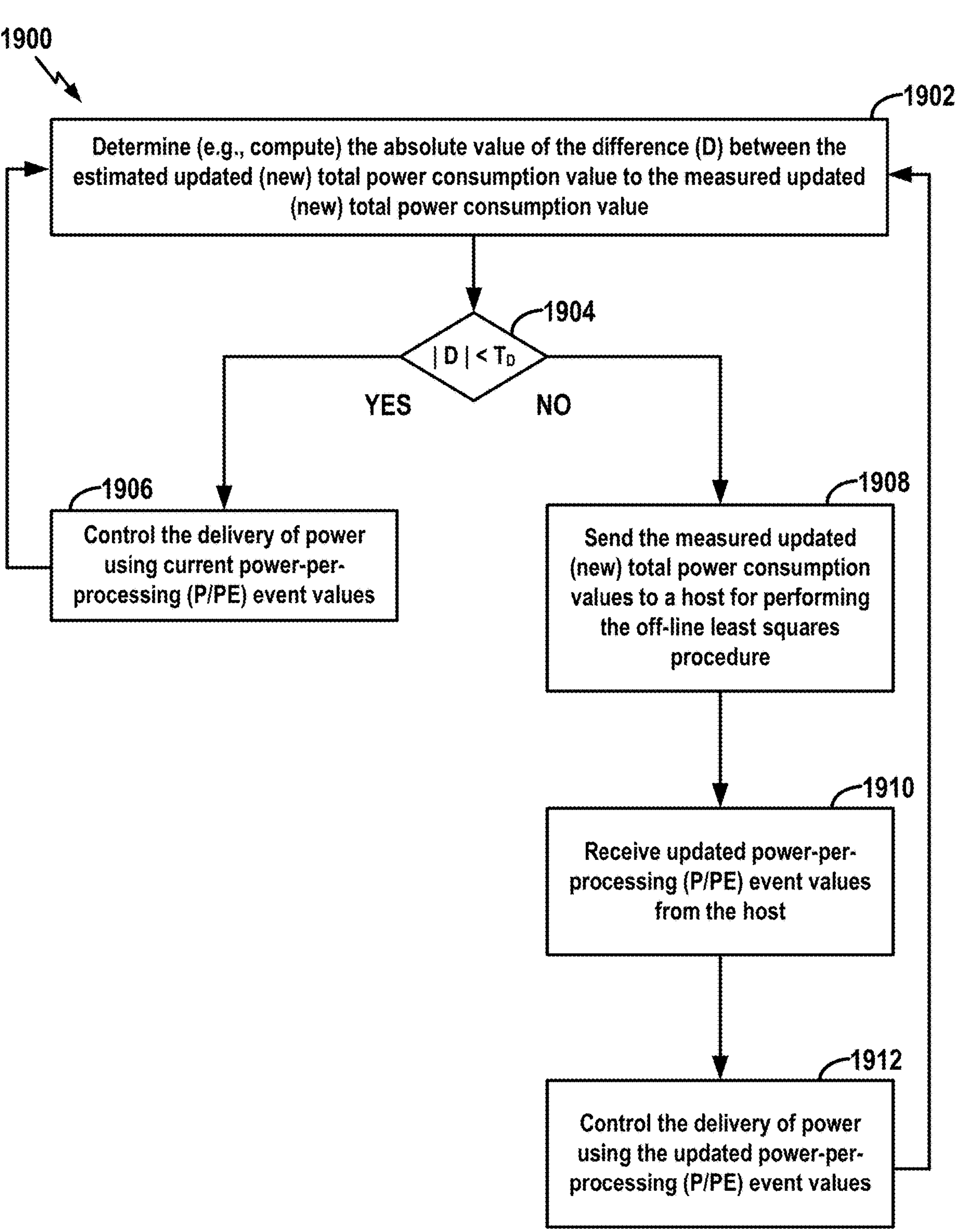
FIG. 19 is a flow diagram illustrating an exemplary method for replacing estimated power-per-processing event values with values obtained from a host device, in accordance with some aspects of the disclosure.

FIG. 19 is a flow diagram 1900 that illustrates a third exemplary method for controlling power in an SSD based on a comparison of estimated total power consumption and measured total power consumption. In this example, if the estimated total power consumption differs too much from the measured total power consumption, data is sent to a host, which performs the off-line least squares procedure and then provides the SSD with updated P/PE values. Many aspects of the method of FIG. 19 are the same or similar to the methods above and hence will not be described in detail. The method may be performed, e.g., by the SSD controller 1508 of FIG. 15. Briefly, at block 1902, the SSD controller 1508 determines the difference (D). At decision block 1904, the SSD controller 1508 compares |D| to the threshold $T_D$. If $|D|<T_D$, the SSD controller 1508 controls the delivery of power using the current set of power-per-processing (P/PE) event values at block 1906 and then processing returns to block 1902 to update D based on newly measured total power consumption values. On the other hand, if $|D|\geq T_D$, processing proceeds to block 1908 where the SSD controller 1508 sends the measured updated (new) total power consumption values to a host for performing the off-line least squares procedure. (Alternatively, the above-described asymmetric thresholds may be used.) At block 1910, the SSD controller 1508 receives updated P/PE values from the host. At block 1912, the SSD controller 1508 controls the delivery of power using the updated set of P/PE event values. For example, the default P/PE values may be determined in advance during device characterization and stored in the SSD. In some examples, the default values are the initial P/PE values determined by an off-line least square procedure and stored in the SSD. Also, in some examples, the host may update the P/PE values by taking into account information obtained from other similar SSDs that the host receives data from. So, e.g., data from multiple SSDs of a particular model can be processed to calibrate P/PE determination.

In some examples, the device may be configured to perform any or all of the procedures of FIGS. 17, 18 and 19, with the particular procedure selected by the SSD controller based on one or more factors. For example, multiple (tiered) values for the threshold ($T_D$) may be employed, e.g., ($T_{D1}$, $T_{D2}$, and $T_{D3}$) with $T_{D1}<T_{D2}<T_{D3}$. The particular procedure to be employed may depend on which threshold |D| exceeds. For example, if $T_{D2}\geq|D|\geq T_{D1}$, the update procedure of FIG. 16 may be performed to allow or enable the SSD to update the P/PE values. However, if $T_{D3}\geq|D|\geq T_{D2}$, the update procedure of FIG. 19 may be performed to allow or enable the host to update the P/PE values. If $|D|\geq T_{D3}$, the update procedure of FIG. 18 may be performed to replace the P/PE values with factory preset default values. Tiered thresholds also may be exploited for use with the above-described asymmetric thresholds $T_{DU}$ and $T_{DL}$, e.g., values may be set for $T_{DU1}$, $T_{DU2}$, $T_{DU3}$, and $T_{DL1}$, $T_{DL2}$, and $T_{DL3}$. In still other examples, rather than using a single difference value D, a more sophisticated error metric may be computed between recently measured total power consumption values and estimated total power consumption values for comparison against one or more threshold. In still other examples, the choice of the particular procedure may depend on the current processing load of the SSD, with the SSD sending data to the host to perform the update (FIG. 19) if the processing load exceeds some processing load threshold, but performing the update itself (FIG. 17) otherwise. There are many possible variations and all such variations are not described herein.

Figure 20:
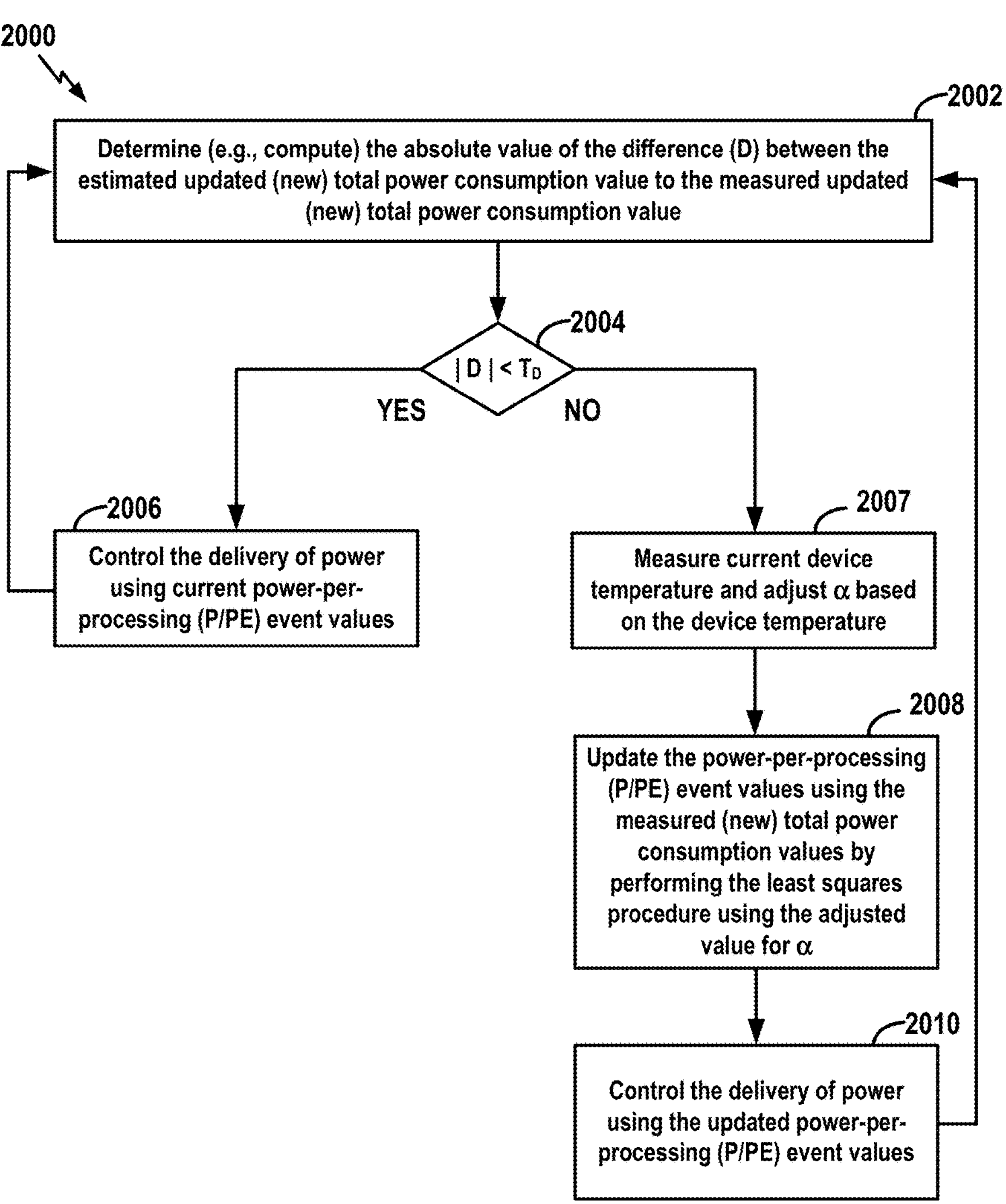
FIG. 20 is a flow diagram illustrating an exemplary method for adjusting power-per-processing event estimation parameters, in accordance with some aspects of the disclosure.

FIG. 20 is a flow diagram 2000 that illustrates an exemplary method for controlling power in an SSD based on a comparison of estimated total power consumption and measured total power consumption while selectively adjusting the value for a within the least squares procedure based on the current device temperature. Many aspects of the method of FIG. 20 are the same or similar to the methods described above and hence will not be described in detail. The method may be performed, e.g., by the SSD controller 1508 of FIG. 15. Beginning at block 2002, the SSD controller 1508 determines the difference (D) between the estimated updated (new) total power consumption value to the measured updated (new) total power consumption value. At decision block 2004, the SSD controller 1508 compares |D| to the threshold $T_D$. If $|D| <T_D$, then processing proceeds to block 2006 where the SSD controller 1508 controls the delivery of power using current P/PE event values. Otherwise (i.e., $|D|\geq T_D$), processing proceeds to block 2007 where the SSD controller 1508 measures the current device temperature using an on-board temperature sensor (thermometer) and adjusts & based on the device temperature. (Alternatively, the above-described asymmetric thresholds may be used.)

As discussed above, $\alpha$ is a configurable weight given each new sample ($0<\alpha<1$) that can be set or optimized empirically (and potentially vary with time, e.g., $\alpha$ may be inversely proportional to the number of samples n that have been processed so far, thus as $P_e$ training progresses, its values become more stable and reduce the impact of new samples which may be noisy). In one particular example, $\alpha$ may be set closer to 1 in response to a significant change in operating temperatures so that earlier P/PE values are weighted less in the calculation of the new P/PE values, since the temperature has changed and the earlier values (obtained at a different temperature) may no longer be helpful in correctly estimating the new P/PE values. On the other hand, if the temperature remains stable, then $\alpha$ may be set as described above in connection with Equation 3 so that P/PE values become more stable over time.

At block 2008, the SSD updates the P/PE values using the measured (new) total power consumption values by performing or updating the least squares procedure using the adjusted value for a. At block 2010, the SSD controller 1508 controls the delivery of power using the updated P/PE values. In either case, processing returns to block 2002 to update the determination of the difference (D) based on newly measured total power consumption values.

Figure 21:
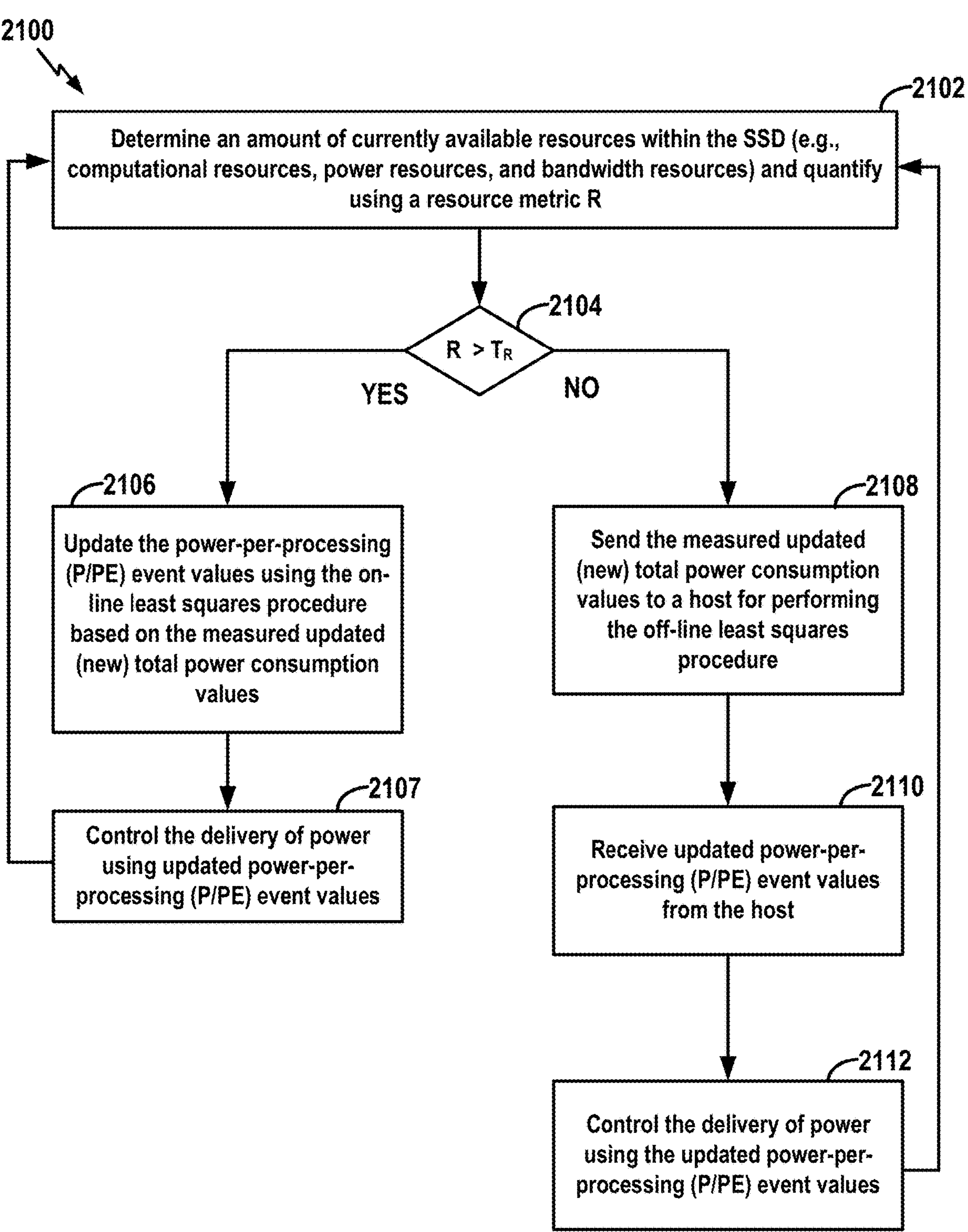
FIG. 21 is a flow diagram illustrating an exemplary method for controlling power-per-processing event operations based on resource availability, in accordance with some aspects of the disclosure.

FIG. 21 is a flow diagram 2100 that illustrates an exemplary method for controlling whether to perform on an on-line least squares procedure or to send data to a host for an off-line least squares procedure. Some aspects of the method of FIG. 21 are the same or similar to the methods described above and hence will not be described in detail. The method may be performed, e.g., by the SSD controller 1508 of FIG. 15. Briefly, at block 2102, the SSD controller 1508 determines an amount of currently available resources within the SSD (e.g., computational resources, power resources, and bandwidth resources) and quantifies the available resources using a resource metric R. At decision block 2104, the SSD compares R to a resource availability threshold $T_R$. If R exceeds $T_R$, indicating that the SSD has sufficient available resources to perform the on-line least squares procedure, processing proceeds to block 2106, where the SSD updates the P/PE values using the on-line least squares procedure based on the measured updated (new) total power consumption values. That is, the current P/PE values are updated using, e.g., the update procedure of FIG. 5. At block 2107, the SSD then controls the delivery of power using the on-line updated P/PE values. If R does not exceed $T_R$ at block 2104, indicating that the SSD does not have sufficient available resources to perform the on-line least squares procedure (without undue burden), processing proceeds to block 2108, where the SSD sends the measured updated (new) total power consumption values to a host for performing the off-line least squares procedure. At block 2110, the SSD receives the off-line updated P/PE values from the host. At 2112, the SSD controls the delivery of power using the off-line updated P/PE values.

In one example, at block 2102, the SSD may count the number of HW engines currently in use and generate a metric R based on the count for comparison, at block 2104, to a threshold $T_R$ that is also based on a count of HW engines. In one particular example, if ten or fewer HW engines are use, the on-line least squares procedure is performed. Otherwise, the data is sent to the host for off-line least squares. In another example, the SSD may determine how much power is currently being used by measuring total power consumption using the power sensor and generating a metric R for comparison, at block 2104, against a threshold $T_R$ that is also based on power consumption. In one particular example, if the measured power consumption is less than 5 watts, the on-line least squares procedure is performed. Otherwise, the data is sent to the host for off-line least squares. In this regard, the average active usage power consumption of the SSD may be, e.g., 5 watts. Accordingly, in this example, the on-line least squares procedure is only performed if power consumption is below the average active level. (In other examples, SSD power may be in the range of, e.g., 5-13 watts.)

In still another example, the SSD may determine how much transmission bandwidth is currently being consumed to transmit/receive data to/from the host and generate a metric R for comparison, at block 2104, against a threshold $T_R$ that is also based on bandwidth consumption. In one particular example, if more than 90% of the bandwidth is already being consumed, then the on-line least squares procedure is performed so that the SSD does not have to send data to the host. Otherwise, the off-line least squares procedure is used. The threshold values may be determined during device characterization and stored in the SSD. In some examples, the thresholds may be adaptively adjusted based, for example, of device temperature. Note that a single combined metric R may be generated that combines two or more individual metric values for comparison against a single threshold. For example, a single metric may be generated that collectively quantifies computational resources, power resources, and bandwidth resources, with each resource weighted differently in the combined metric. Again, the threshold may be set during device characterization and then adaptively adjusted.

Figure 22:
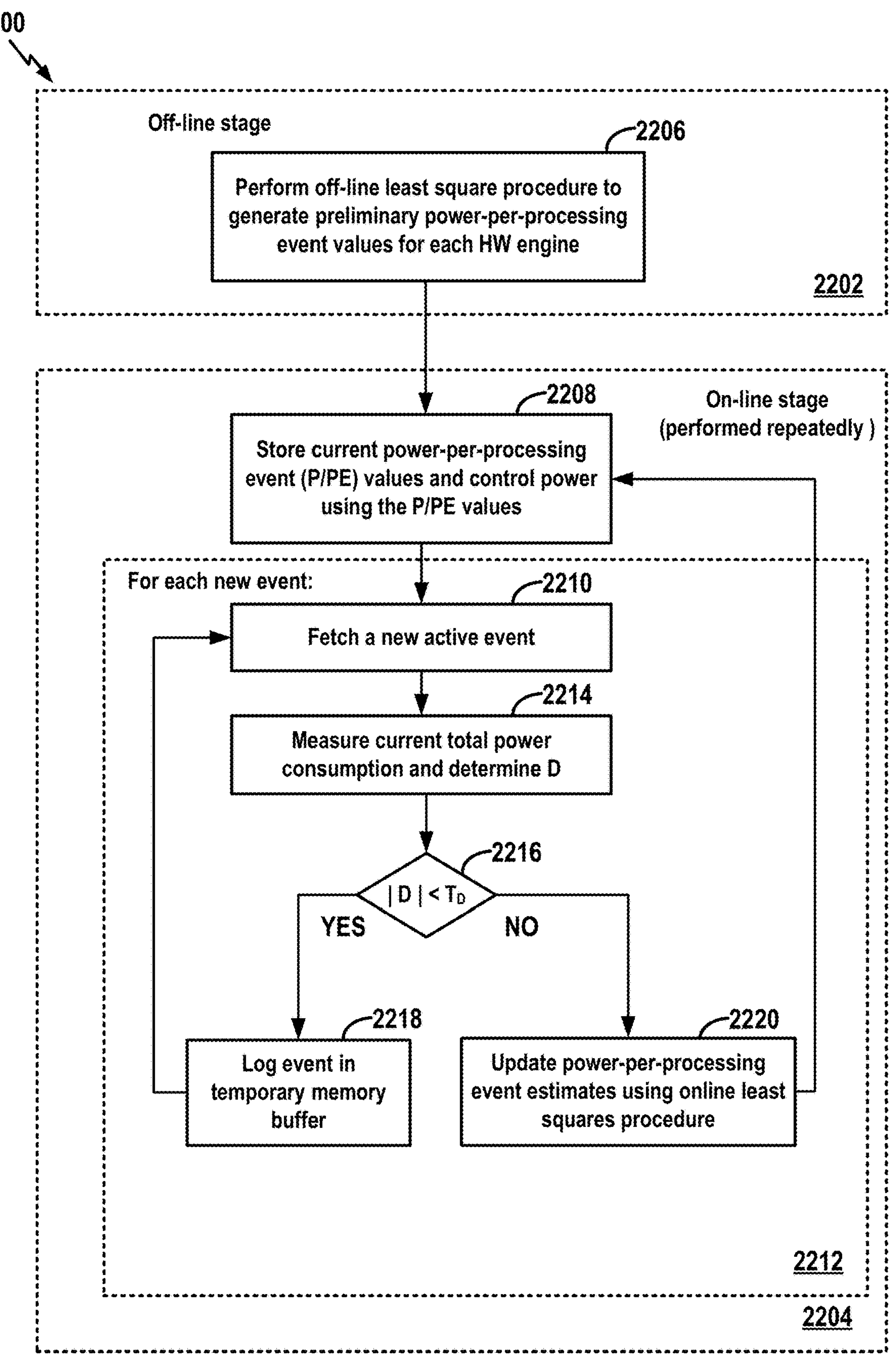
FIG. 22 is a flowchart summarizes an overall procedure for determining and updating power-per-processing event values that includes assessing the accuracy of the power-per-processing event values, in accordance with some aspects of the disclosure.

FIG. 22 is a block diagram that summarizes an overall procedure 2200 including an initial off-line stage and an on-line stage, in which the on-line stage controls power based, at least in part, on a comparison of estimated total power consumption and measured total power consumption. The initial off-line stage 2202 may be performed in a lab during device characterization or by a host device and the on-line stage 2202 may be performed by an SSD after it has been deployed to a user and is operating to store and process user data. Beginning at block 2206, a test device (such as a test device in a device characterization lab) performs the off-line least squares procedure described above in connection with FIG. 7 to generate preliminary or initial P/PE values for each HW engine of the SSD. The data is transferred into the SSD and stored, at block 2208, in a memory of the SSD as the current or latest P/PE values. At block 2208, the SSD also controls power to its various HW devices using the P/PE values.

Beginning at block 2210, a procedure 2212 commences within the SSD that is performed by the SSD controller for each new active event (e.g., a Read event, Write event, etc.). At block 2210, the SSD controller fetches a new active event (e.g., a power event fetched from the power event datastore shown in FIG. 6 and described above). At block 2214, the SSD controller measures the current total power consumption using a power sensor and determines the difference D (as described above). At decision block 2216, the SSD controller 1508 compares $|D|$ to the threshold $T_D$. If $|D|<T_D$, processing proceeds to block 2216 where the SSD controller 1508 logs the latest event in a temporary memory buffer and then returns to block 2210 to fetch and process the next event. Data in the memory buffer may be used, e.g., for diagnostic purposes or other purposes. Notably, no changes are made to P/PE values and so the SSD continues to control power to its HW devices using the currently-stored P/PE values. On the other hand, if $|D|\geq T_D$, processing proceeds to block 2220 where the SSD controller updates the P/PE values by running the on-line least squares procedure using the latest measured total power consumption values (obtained at block 2214). (Alternatively, the above-described asymmetric thresholds may be used.) Processing returns to block 2202 to store the updated P/PE values as the new current P/PE values and to control further power delivery based on the new P/PE values. The next active event is then fetched at block 2210 and to procedure continues. Note that, although not shown in FIG. 22, the various processing options or variations described in connection with FIGS. 16-21 can be exploited within the procedure of FIG. 22 to, e.g., trigger an off-line least squares procedure by a host. Note also that not all fetched events necessarily trigger another power measurement. In some examples, only certain fetched events trigger a new power measurement. Hence, the device may store a list of particular events that trigger a new power measurement at block 2214.

Figure 23:
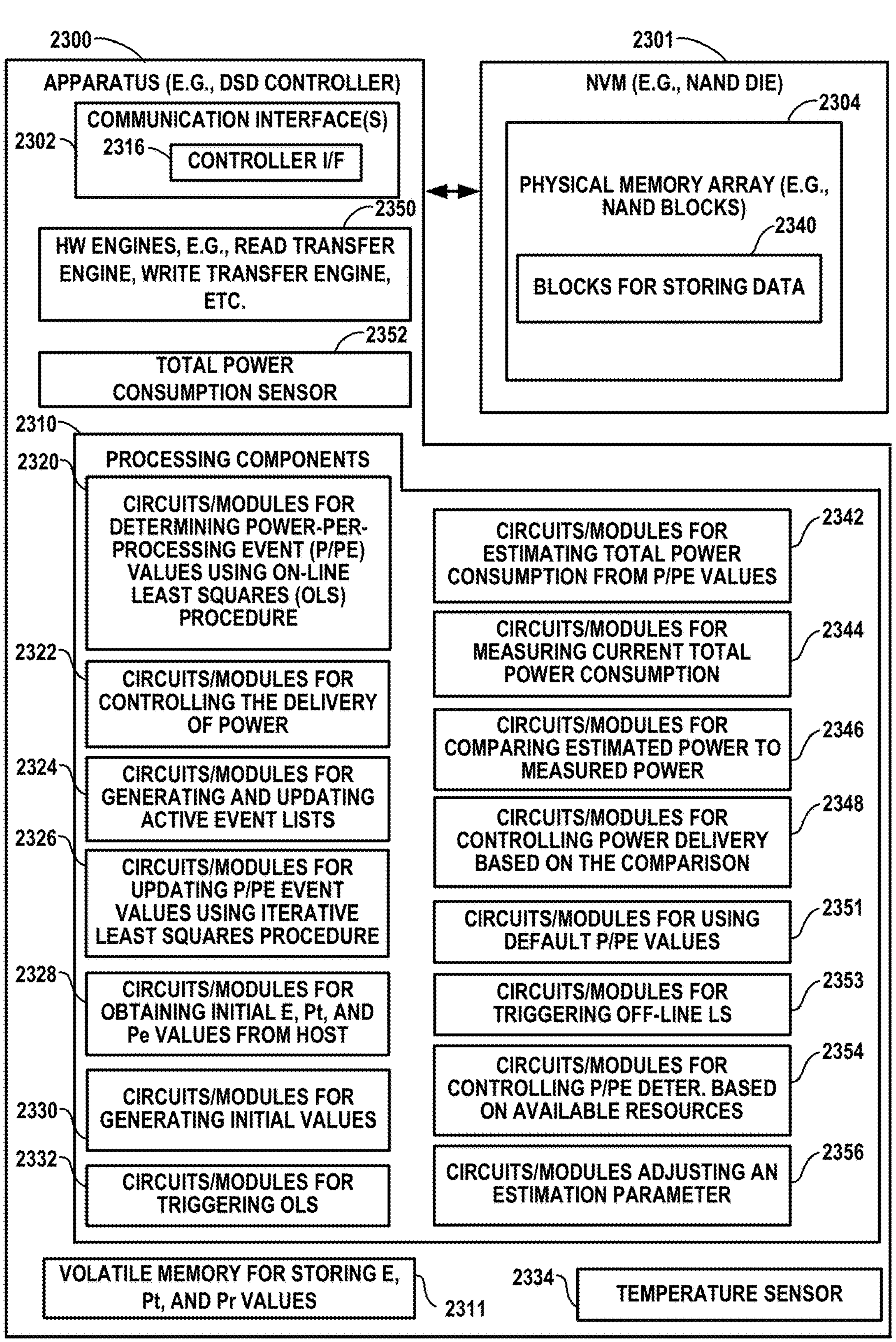
FIG. 23 is a schematic block diagram of an exemplary apparatus configured in accordance with some aspects of the disclosure, which includes components configured for determining power-per-processing event values and controlling power management, and also includes components for assessing the reliability of the power-per-processing event values.

FIG. 23 illustrates an embodiment of an exemplary data storage device or apparatus 2300 configured according to one or more aspects of the disclosure. The apparatus 2300 includes many features that are the same or similar to those described above in connection with FIG. 13. Hence, those features will only be summarized below.

Briefly, apparatus 2300 includes a communication interface 2302 and is coupled to an NVM 2301 (e.g., a NAND die). The NVM 2301 includes a physical memory array 2304. The physical memory array 2304 may include one or more NAND blocks 2340. The physical memory array 2304 may be accessed by the processing components 2310. In one aspect, the apparatus 2300 may also include volatile memory 2311 such as a DDR for storing instructions and other information to support the operation of the processing components 2310 including information for performing off-line least squares (OLS) procedures, such as the E, Pt, and Pr values, active event lists, etc. The apparatus 2300 may include a set of HW engines or devices 2350 and a total power consumption sensor 2352 for measuring the total power of the set of HW engines 2350.

The apparatus 2300 includes various processing components 2310 arranged or configured to obtain, process and/or send data, control data access and storage, issue or respond to commands, and control other desired operations. For example, the processing components 2310 may be configured to perform any of the steps, functions, and/or processes described with respect to FIGS. 1-22. The processing components 2310 serve as an example of a means for processing. In various implementations, the processing components 2310 may provide and/or incorporate, at least in part, functionality described above for the components of controller 108 of FIG. 1, processor 612 of FIG. 6, controller 818 of FIG. 8, and controller 1508 of FIG. 15.

According to at least one example of the apparatus 2300, the processing components 2310 may include one or more of: circuit/modules 2320 configured for determining power-per-processing event values using the OLS procedure; circuit/modules 2322 configured for controlling the delivery of power to the HW engines 2350 based on the P/PE values; circuits/modules 2324 configured for generating and updating active event lists representative of particular HW engines active at any given time; circuits/modules 2326 configured for updating the P/PE using the iterative/recursive least-squares procedure described above; circuits/modules 2328 configured for obtaining initial E, Pt, and Pe values from host; circuits/modules 2330 for generating initial values (e.g., for E, Pt, and Pe) by assigning randomly generated values or by using unique indicator values; and circuits/modules 2332 for triggering the OLS procedure (or the iterative/recursive OLS procedure) based, e.g., on a change in device temperature (measured by a temperature sensor 2334) or other factors. The physical memory array 2304 may include blocks 2340 for storing data, such as user data.

Additionally, the processing components 2310 may include one or more of: circuit/modules 2342 configured for estimating total power consumption from P/PE values; circuit/modules 2344 configured for measuring or obtaining current total power consumption (via power sensor 2352); circuit/modules 2346 configured for comparing the estimated total power consumption to the measured total power consumption, including computing the difference (D) described above for comparison against one or more threshold values (T); circuit/modules 2348 configured for controlling power delivery based on the comparison (e.g., as described in connection with FIGS. 16-22) to, e.g., maintain power within a power budget; circuit/modules 2351 configured for using default P/PE values to control power delivery (as in FIG. 18); circuit/modules 2353 configured for triggering off-line least squares (as in FIG. 19), including sending power consumption data to a host and receiving updated P/PE values from the host; circuit/modules 2354 configured for controlling the P/PE determination based on available resources (as in FIG. 21); and circuit/modules 2356 configured for adjusting an estimation parameter, such as adjusting a (as in FIG. 10).

In at least some examples, means may be provided for performing the functions illustrated in FIG. 23 and/or other functions illustrated or described herein. For example, the means may include one or more of: means, such as circuits/modules 2342, for estimating total power consumption from P/PE values; means, such as circuits/modules 2344, for measuring or obtaining current total power consumption; means, such as circuits/modules 2346, for comparing the estimated total power consumption to the measured total power consumption, including means for computing the difference (D) described above for comparison against one or more threshold values (T); means, such as circuits/modules 2348, for controlling power delivery based on the comparison; means, such as circuits/modules 2351, for using of applying default P/PE values to control power delivery; means, such as circuits/modules 2353, for triggering an off-line least squares procedure, including sending power consumption data to a host, and receiving updated P/PE values from the host; means, such as circuits/modules 2354, for controlling the P/PE determination based on available resources; and means, such as circuits/modules 2356, for adjusting an estimation parameter, such as adjusting a.

Still further, in some aspects: the total power consumption sensor 2352 provides a means for measuring a total power consumption of a plurality of processing devices; the circuits/modules 2320 provide a means for determining P/PE values for each of the plurality of processing devices based on initial total power consumption values obtained from the means for measuring total power consumption; the circuits/modules 2342 provide a means for estimating an updated total power consumption value from the P/PE values; the circuits/modules 2344 provide a means for measuring an updated (e.g., current) total power consumption value; and the circuits/modules 2348 provide a means for controlling delivery of power to the plurality of processing devices based on a comparison of the estimated updated total power consumption value and the measured updated total power consumption value.

Figure 24:
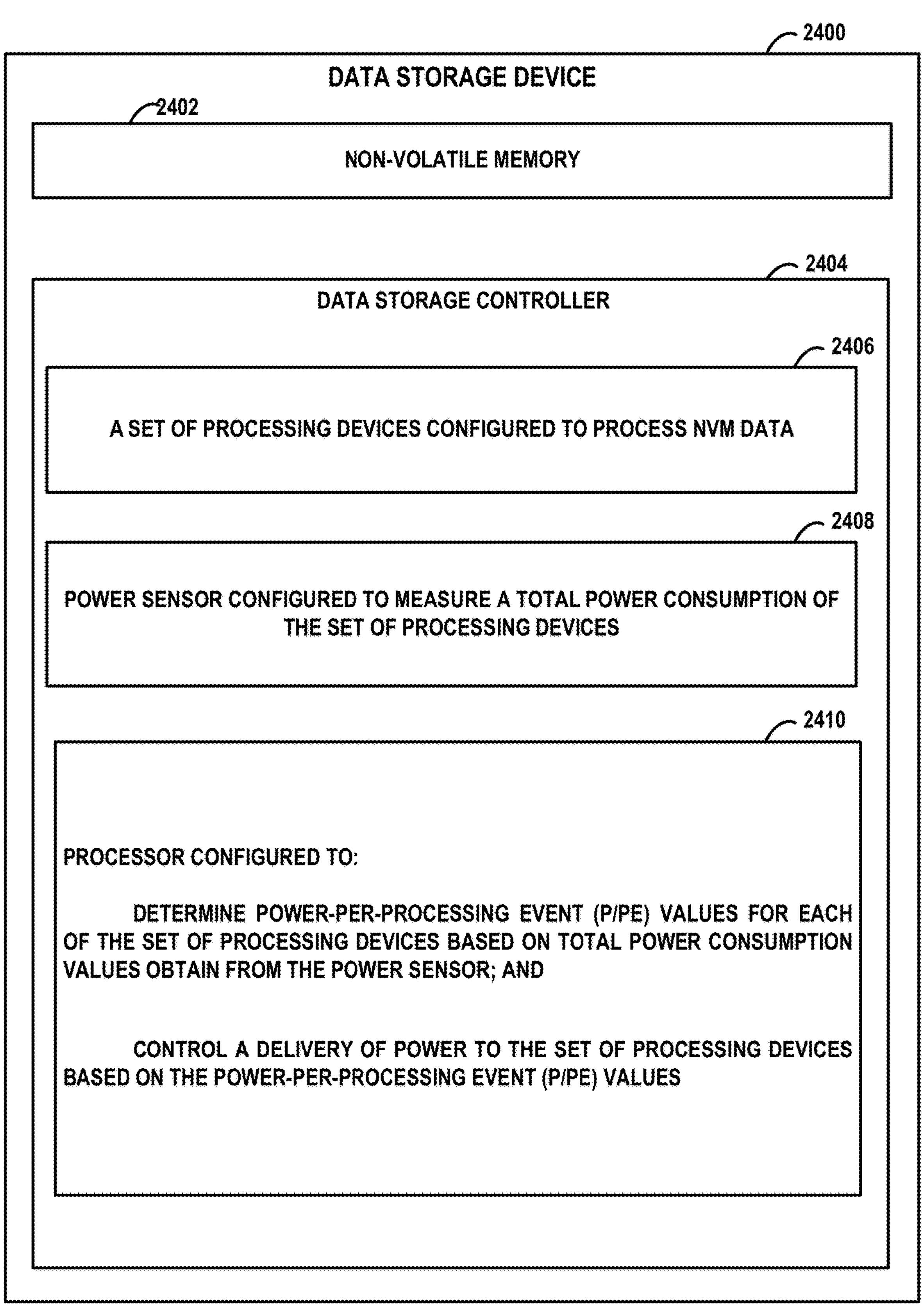
FIG. 24 is a schematic block diagram illustrating another exemplary data storage device configured in accordance with some aspects of the disclosure.

FIG. 24 broadly illustrates a data storage device 2400 configured according to one or more aspects of the disclosure. The data storage device 2400 includes an NVM 2402. In some aspects, the NVM 2402 stores data, such as user data obtained from a host. The data storage device 2400 also includes a data storage controller 2404. The data storage controller 2404 includes a set or plurality of processing devices or engines 2406 configured to process NVM data. For example, each may be configured to perform a processing operation or other processing event on NVM data. As noted above, NVM data refers to data for storage within an NVM, including data to be stored (programmed) on an NVM array or data that has been read from the NVM array. In some aspects, the processing devices are configured to perform different operations on data to be stored in or read from the NVM 2402, where each processing operation is a processing event. The set of processing devices 2406 may include, e.g., one or more of a Read transfer engine, a Write transfer engine, etc. (See above for a more complete list of exemplary devices or engines.)

The data storage controller 2404 also includes a power sensor 2408 configured to measure the total power consumption of the set or plurality of processing devices 2406 and a processor or processing circuit 2410. The processor 2410 is configured to determine P/PE values for each of the set or plurality of processing devices 2406 based on total power consumption values obtained from the power sensor 2408 and control a delivery of power to the set of processing devices based on the P/PE values. In some examples, the processor 2410 is configured to: estimate an updated total power consumption value from the P/PE values; measure an updated total power consumption value using the power sensor 2408; and control delivery of power to the set of processing devices 2406 based on a comparison of the estimated updated total power consumption value to the measured updated total power consumption value to, e.g., maintain power within a power budget. In other examples, the processor 2410 is configured to: determine the P/PE values using an inference model such as least squares models; obtain a reliability score (e.g. ΔP) from the inference model; and control the delivery of power to the set of processing devices based on the reliability score.

The determination of the P/PE value for each of the set or plurality of processing devices 2406 may be made using, e.g., the least-squares procedures described above in connection with FIGS. 2-5. The comparison of the estimated updated total power consumption value to the measured updated total power consumption value may be performed, e.g., as described above by determining a difference value (D) for comparison with a threshold (T). The control of the delivery of power to the set of processing devices 2406 based on the comparison may be performed, e.g., as described above in connection with FIGS. 16-22. In some aspects, some or all of the processing devices/engines 2406 and the processor 2410 are components of an integrated circuit, such as an ASIC. For example, the various processing devices/engines 2406 may be different circuits or modules within the integrated circuit and the processor 2410 may be another circuit or module within the same integrated circuit. See, for example, the circuits/modules of FIG. 23, described below. In other aspects, some or all of the processing devices/engines 2406 may be separate components formed on separate chips, such as separate ASICs, IPs, etc. Additionally, in some examples, a temperature sensor is provided.

Figure 25:
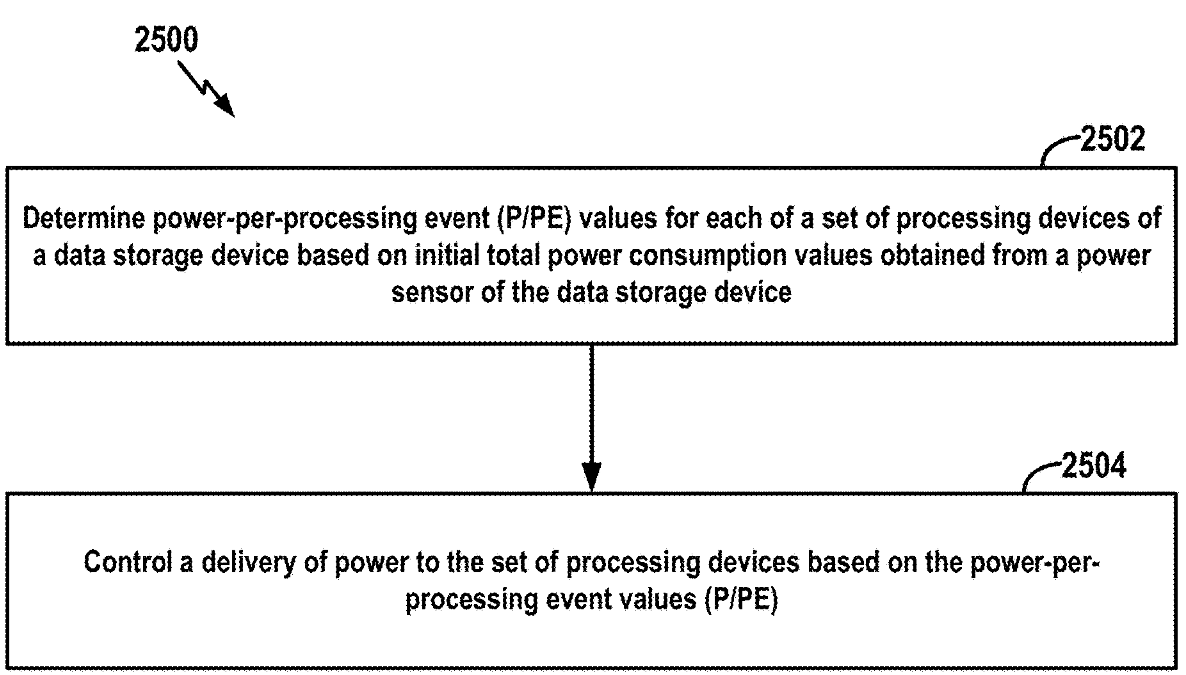
FIG. 25 is a flow chart of another exemplary method according to aspects of the present disclosure.

FIG. 25 illustrates a method or process 2500 in accordance with some aspects of the disclosure. The process 2500 may take place within any suitable data storage device or apparatus capable of performing the operations, such as an SSD configured with a power sensor and appropriate processing circuitry. See, for example, the devices of FIGS. 15, 23, and 24. See, also, processor 612 of FIG. 6. At block 2502, the data storage device determines P/PE values for each of a set or plurality of processing devices of a data storage device based on initial total power consumption values obtained from a power sensor of the data storage device. At block 2504, the data storage device controls a delivery of power to the plurality of processing devices based on the power-per-processing event values. In some examples, the delivery of power is controlled by: estimating an updated total power consumption value from the P/PE values; measuring an updated total power consumption value using the power sensor (e.g., the current power consumption); and then controlling the delivery of power to the set or plurality of processing devices based on a comparison of the estimated updated total power consumption value to the measured updated total power consumption value to, e.g., maintain power within a power budget. In other examples, the method includes: determining P/PE values using an inference model such as a least squares model; obtaining a reliability score (e.g. ΔP) from the inference model; and controlling the delivery of power to the set of processing devices based on the reliability score.

Figure 26:
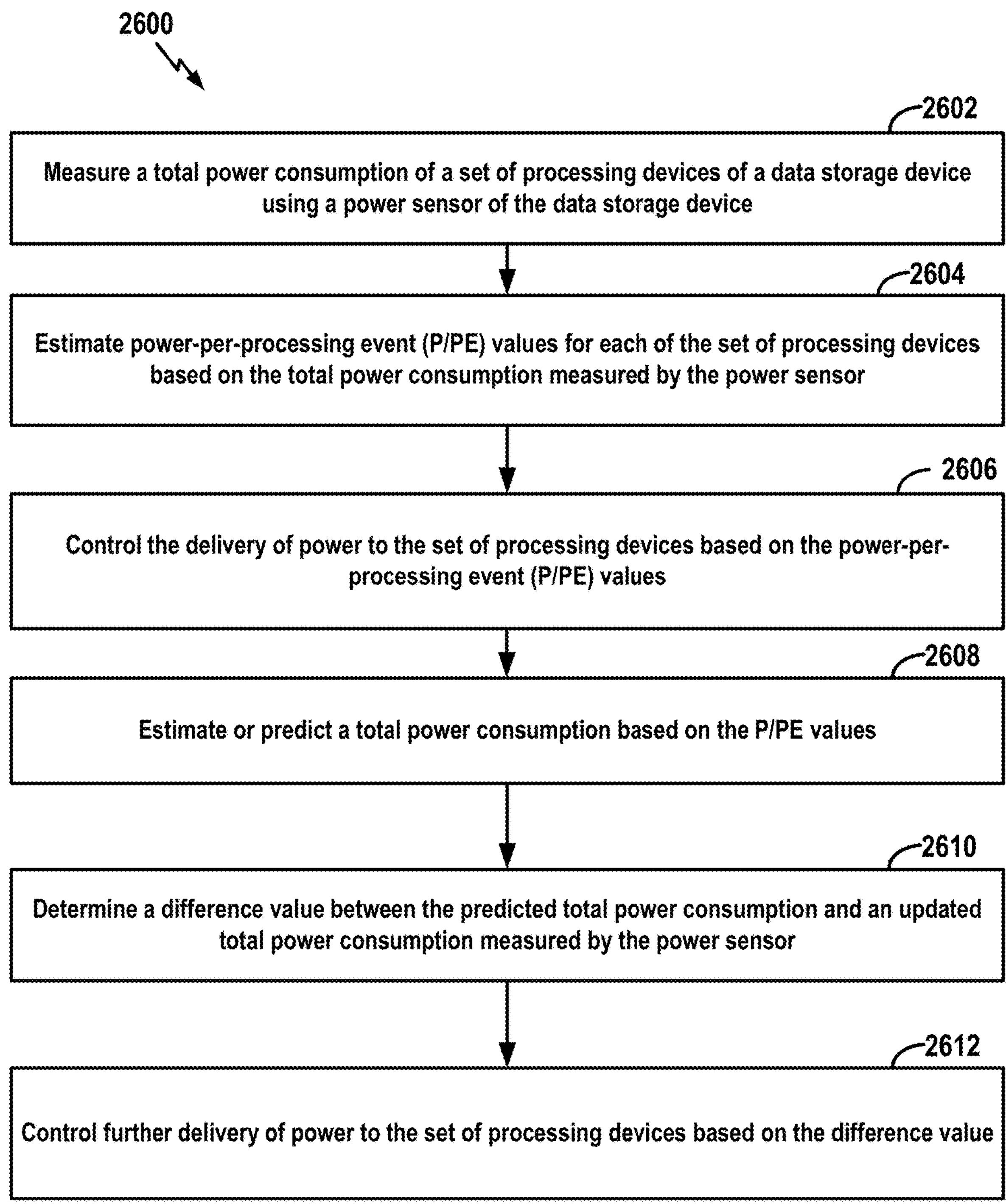
FIG. 26 is a flow chart of still another exemplary method according to aspects of the present disclosure.

FIG. 26 illustrates a method or process 2600 in accordance with some other aspects of the disclosure. The process 2600 may take place within any suitable data storage device or apparatus capable of performing the operations, such as an SSD configured with a power sensor and appropriate processing circuitry. See, for example, the devices of FIGS. 15, 23, and 24. At block 2602, the data storage device measures a total power consumption of a set or plurality of processing devices of a data storage device using a power sensor of the data storage device. At block 2604, the data storage device estimates P/PE values for each of the set or plurality of processing devices based on the total power consumption obtained from the power sensor. At block 2606, the data storage device controls the delivery of power to the set or plurality of processing devices based on the P/PE values to, e.g., maintain power within a power budget. At block 2608, the data storage device estimates (or predicts) a total power consumption based on the P/PE values. The estimate may be made, as described above, by summing the P/PE values for each HW device that are currently active along with the baseline power. At block 2610, the data storage device compares the estimated updated total power consumption value to the measured updated total power consumption value. At block 2610, the data storage device determines a difference value between the predicted total power consumption and an updated total power consumption measured by the power sensor. At block 2610, the data storage device controls the further delivery of power to the set of processing devices based on the difference value to, e.g., continue to maintain power within a power budget.

Calibration of Resource Server Power Allocations Using Conformal Prediction (CP)

In the following, systems and procedures are described for calibration of resource server power allocations to provide guaranteed power prediction intervals, wherein conformal prediction (CP) is employed. CP is a machine learning (ML) framework for uncertainty quantification that turns point predictions into prediction regions or intervals. That is, CP takes the predictions provided by (almost) any standard ML model (i.e., CP is model agnostic) and converts the predictions into a probability guarantee of covering the true outcome (within error bounds), with only minimal assumptions (i.e., CP is distribution-free). CP is thus a type of post-training calibration procedure that may be applied on a validation set to find prediction thresholds that quantify prediction uncertainty by assuring valid prediction intervals. Instead of attempting to learn uncertainty measures based on input features or by building designated models, CP bypasses the problem by calibrating model predictions on the validation set. An important aspect of CP is that it works by computing conformity scores on previously labeled data, then uses the scores to create prediction sets on a new (unlabeled) test data point.

CP may be summarized as follows:

1. Split a set of data (e.g. power estimations) into training, validation, and test sets.
2. Train an ML model (e.g., a "black-box model") and use the model's soft-score predictions as qi values. For example, calculate for each sample i its absolute residual score (equal to the distance of the model's prediction value from its ground truth value): $qi(Xi, Yi)=|Yi-\hat{f}(Xi)|$ where qi is the "conformity score" (or "non-conformity score") for i.
3. Apply inference on the validation set (either by splitting the dataset or by cross-validation) and find the threshold quantile $\hat{q}$ that fulfills a specified significance level, e.g., find the margin (equal to the prediction interval) that should be taken above/below the model's point prediction such that $(1-\alpha)$ of the predictions will be placed inside a margin, and where $\alpha$ is a specified significance level, e.g., $\alpha=0.05$ indicates that one wants to find the prediction interval that includes $(1-\alpha)=95\%$ of the overall samples population. For example, $\alpha$ may be a pre-defined threshold that indicates the allowed portion of cases that will deviate from the estimated power/energy budget. The value $(1-\alpha)$ may also be referred to as the coverage. The specified significance level may also be referred to as a preferred, requested, or required significance level. For example, technical specifications for a particular SSD design may require that a significance level be achieved to maintain power within technical specifications of the device. Note that the parameter $\alpha$ as it pertains to CP is a different parameter than the configurable weight a discussed above in connection with FIGS. 5 and 20. (The symbol $\alpha$ is used herein in connection with CP since it a standard symbol used in CP nomenclature. The symbol $\alpha$ is used above in connection with configurable weights since it is a standard symbol used in connection with weighted least squares.)
4. Then apply the threshold $\hat{q}$ to the test set.

More specifically, in some aspects, the calibration of a P/PE estimation model may be applied using LS-based CP on a collected dataset (e.g., a dataset of allocated power and the overall power measurements or power deviation indications). Upon measuring the power consumption of different processing event sequences, the LS procedures summarized above are initially applied to obtain estimations for P/PE values. Next, a LS-based conformity score per event sequence is calculated as:

$$qi(Xi, Yi) = Yi - \sum_{i=1}^{ni} \hat{f}(Xi),$$

where Xi corresponds to the list of operations in a current sequence sample i, Yi is a measured overall power consumption of current sequence, ni is the number of events per sequence sample i, and $\hat{f}(Xi)$ is the power estimation per event at sequence sample i. The LS-based conformity score per processing event sequence represents the cumulative deviation of the power estimations per event from the measured values. Next, the conformity scores are conformalized on the validation set based on a value α defined by the system. For example, if the measured power of 95% of the sequence samples is required to be less than or equal to the cumulative power estimations of the events that compose the sequence, then α is equal to 0.05 (=5% deviation).

The conformalization may be performed by calculating a histogram of LS-conformity scores over the validation set and finding the threshold ($Q_{1-\alpha}$) that contains on its left side 95% of the area under the histogram, where $Q_{1-\alpha}$ is the required correction for the sequence power estimation. As $Q_{1-\alpha}$ is the overall required correction for a whole operation sequence, for each such sequence, the $Q_{1-\alpha}$ mWs is divided between (i.e., distributed among) the different operations according to its relative occurrence over the whole validation set. Alternatively, the division of the correction value among the different operations may be based on the ratio of their individual LS power estimations (or a combination of the LS power estimations and the frequencies of these operations within the validation set). Further, these guaranteed upper bounds power estimation may be applied in a flexible manner, e.g. according to the host requirements, system conditions (e.g. whether the device is plugged to a power supply/high battery charge/low battery charge, temperature, etc.), and/or the internal setting of the current operation's urgency/importance.

Figure 27:
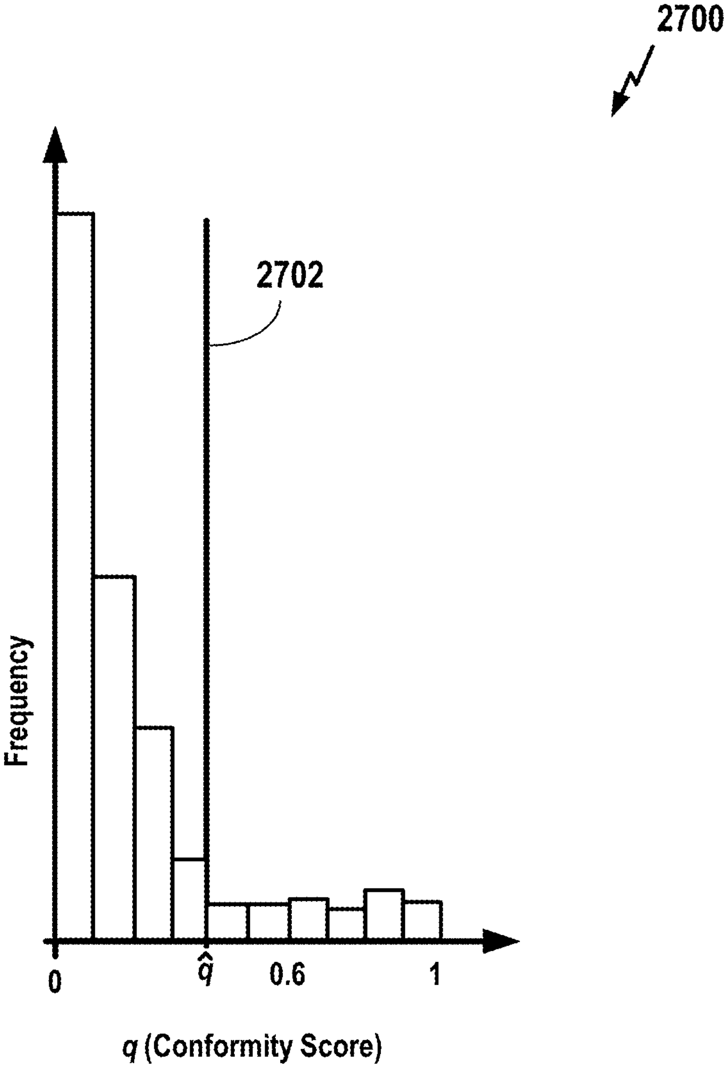
FIG. 27 illustrates an exemplary histogram for use with a conformalization procedure over the validation set according to aspects of the present disclosure.

FIG. 27 illustrates an exemplary histogram 2700 for the conformalization procedure over the validation set, with a conformity score (q) shown in the x-axis, and the frequency of the scores on the y-axis. A vertical line 2702 represents the threshold $\hat{q}$ that fulfills the required significance level, e.g., 95%.

As noted, CP enables a system to calibrate an otherwise standard model's outputs to provide accurate and reliable estimation of the error bounds. Instead of relying on the point-estimations of standard methods (that usually target the averaged power consumption per event), CP enables the reliable estimation of any power consumption quantile (e.g. 95% of the events of a specific operation—Random/Write/Decode-SLC/Decode-TLC etc.). This enables intelligent tradeoffs between power consumption and performance. It should be noted that a more common application of CP on a standard regression task provides a ground truth value ("label") for each sample. However, when applying CP to P/PE values, one has only the overall power consumption for a series of consecutive operations (e.g., Random/Write/Decode-SLC/Decode-TLC etc.). As such, a modified version of LS-based CP is described herein in which the procedure conformalizes the positive errors of the overall measured power consumption per each sequence of consecutive events (denoted as $y_i$) versus the sum of LS-based calculated power consumption of the events included in current sequence i.

In one example, the measured power consumptions of event sequences are:

1. Read-TLC+Encode+Decode+Write-SLC→$y_1$=50 mW
2. Read-TLC+Encode+Read-SLC→$y_2$=35 mW
3. Decode+Write-SLC+Decode+Write-SLC→$y_3$=90 mW

. . .

Applying LS-based estimations of P/PE values (as described above in connection with FIGS. 1-26), the device generates the following estimations for power-per-event (P/PE):

Read-TLC→10 mW
Encode→12 mW
Decode→25 mW
Write-SLC→15 mW.
Read-SLC→7 mW

The LS-based conformity score per each events sequence is calculated as follows:

$$qi(Xi, Yi) = Yi - \sum_{i=1}^{ni} \hat{f}(Xi)$$

where:

$X_i$ are the list of operations at current sequence sample i,
$Y_i$ is the measured overall power consumption of current sequence,
$q_i$ is the LS-based conformity score,
$n_i$ is the number of events per sequence sample i, and
$\hat{f}(Xi)$ is the power estimation per event at sequence sample i.

Exemplary LS-based conformity scores for each event sequence are as follows:

1. Read-TLC+Encode+Decode+Write-SLC→$q_1$=50 mW-62 mW=−12 mW
2. Read-TLC+Encode+Read-SLC→$q_2$=35 mW-29 mW=6 mW
3. Decode+Write-SLC+Decode+Write-SLC→$q_3$=90 mW-80 mW=10 mW

. . .

These scores indicate the cumulative deviation of the power estimations per events from the measured values. For sequence #1, the overall measured power is smaller in 12 mW than the cumulative estimated power of its included events. In a same manner, for sequence #2, the measured power is larger in 6 mW than the sum of estimated power of its events, etc.

To conformalize the scores (on the validation set) based on a threshold a defined by the system, means requiring that the measured power of, e.g., 95% of the sequences samples will be less than or equal to the cumulative power estimations of the events that compose the sequence. For that particular requirement, α is set equal to 0.05 (a 5% deviation). The conformalization is performed by calculating a histogram of the LS-conformity scores ($q_i$ values) over the validation set, then finding the value $Q_{1-\alpha}$ that contains on its left side 95% of the area under the histogram. The LS-conformity scores thus represent a plurality of conformity scores that are conformalized by this procedure.

Figure 28:
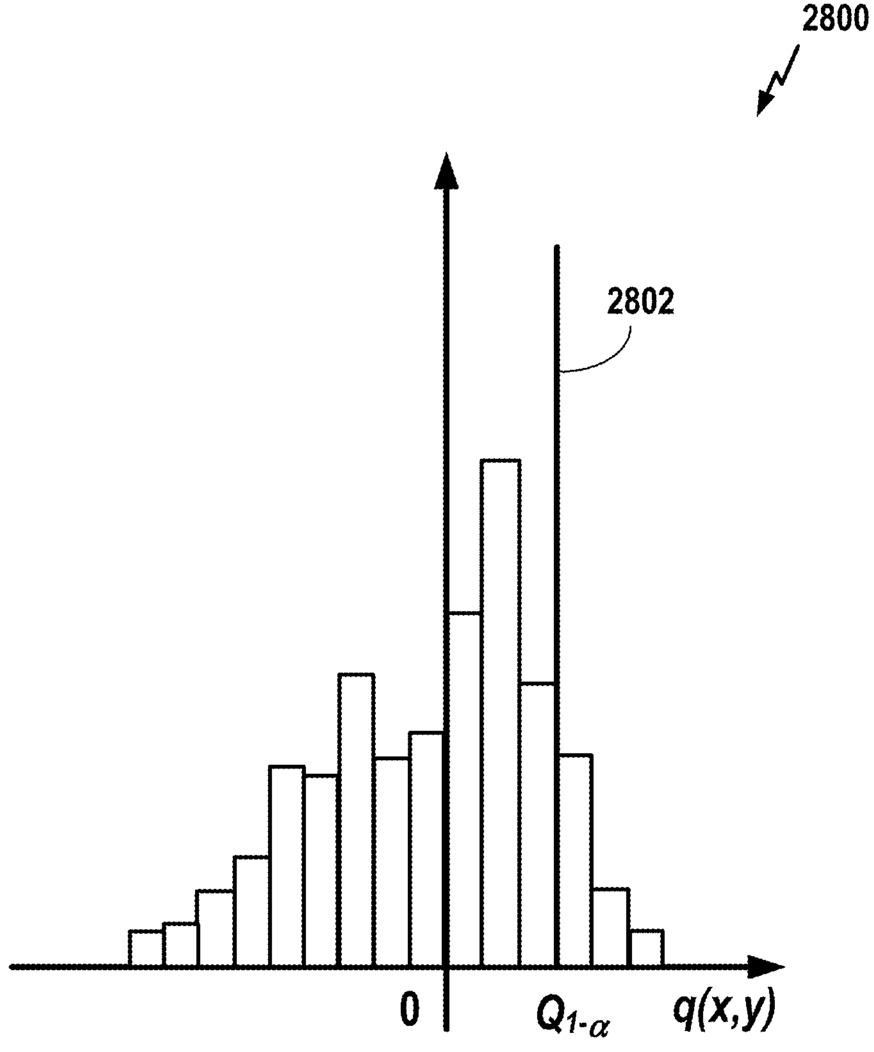
FIG. 28 illustrates an exemplary histogram that may be used in connection with the generation of least squares based-conformity scores for conformal predictions (CP) according to aspects of the present disclosure.

FIG. 28 illustrates an exemplary histogram 2800. that may be used in connection with the generation of LS-conformity scores. The threshold 2802 required for providing the required 95% of the population to be less than or equal to the measured power is marked at $Q_{1-\alpha}$. Note that $Q_{1-\alpha}$ is the required correction for the sequences power estimation to assure that for 95% of the population, the estimated power will not be above the measured power to validate not exceeding the actual power consumption. Since LS-based estimates are generated and $Q_{1-\alpha}$ is the overall required correction for an entire operation sequence, the procedure divides, for each sequence, the $Q_{1-\alpha}$ mWs between the different operations according to its relative occurrence over the whole the validation set. For example, consider that the required overall correction per power estimation of a typical sequence $Q_{1-\alpha}$ is 10 mW, and given that over all the validation set there are 50% Read-SLC operations, 30% Read-TLC operation, 10% Encode, and 20% Decode operations: the procedure adds 0.5*10 mW=5 mW to the Read-SLC power estimation, 0.3*10 mW=3 mW to the Read-TLC, 0.1*10 mW=1 mW to the Encode, and 0.2*10 mW=2 mW to the Decode operation. Alternatively, the division or distribution of the correction value among the different operations may be based on the ratio of their individual LS power estimations (or a combination of the LS power estimations and the frequency of these operations within the validation set).

Figure 29:
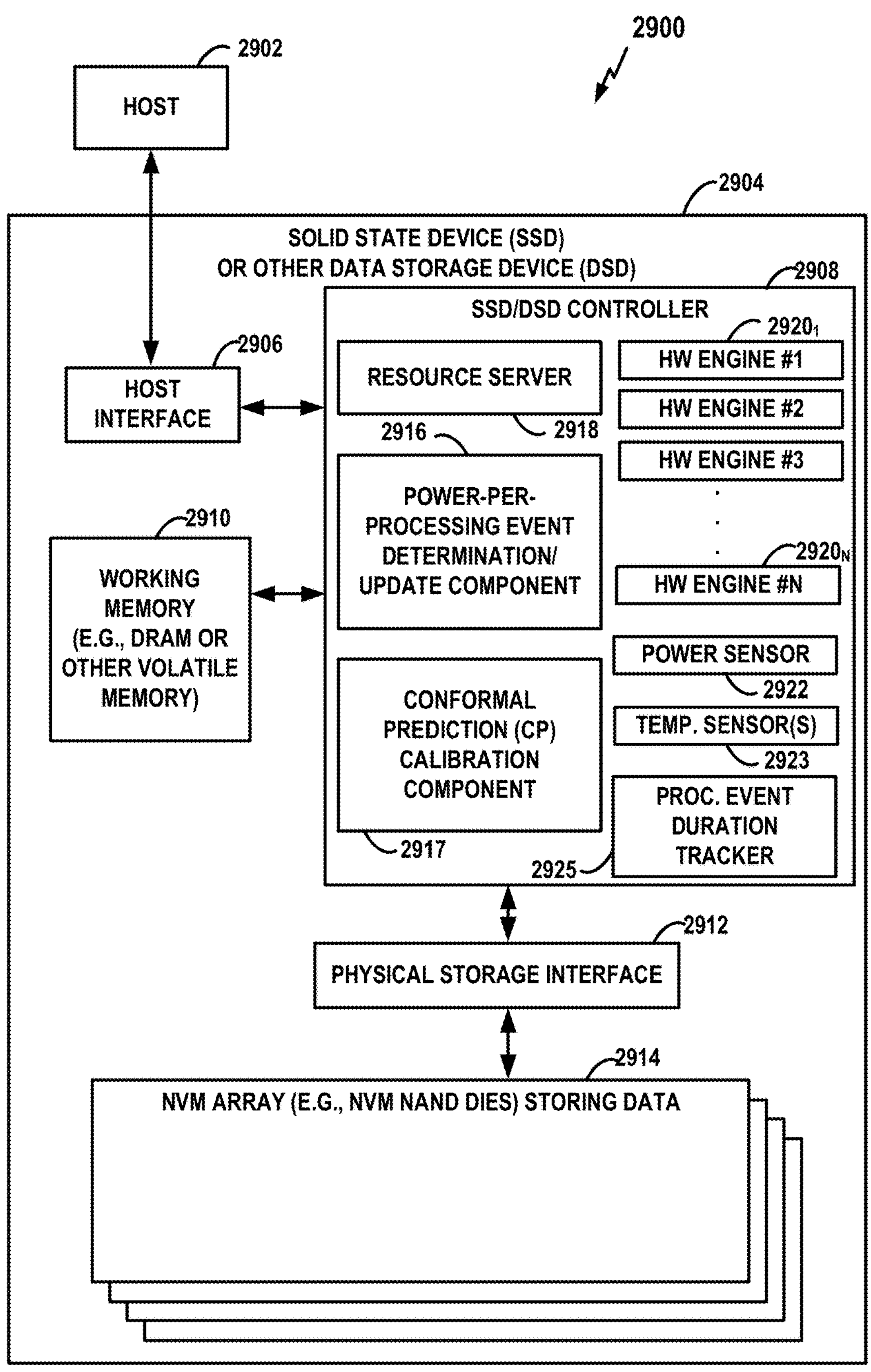
FIG. 29 is a schematic block diagram illustrating yet another exemplary DSD embodied as an SSD, including an SSD controller configured to calibrate power values using CP, in accordance with some aspects of the disclosure.

FIG. 29 is a schematic block diagram of a system 2900 that is similar to the system 100 of FIG. 1 but also includes a CP calibration component 2917. Components of the system 2900 of FIG. 29 that are the same or similar to those of FIG. 1 will be only briefly described. System 2900 includes a DSD embodied as an SSD 2904 including SSD controller 2908 configured with a P/PE determination/update component 2916, an CP calibration component 2917, and a HW resource server 2918, where the CP calibration component 2917 is configured to perform the above-described CP processing to, e.g., provide guaranteed power prediction intervals for use by the resource server 2918. The HW resource server 2918 controls the delivery of power to a set of processing devices (e.g., HW engines 2920$_1$-1520$_N$) based on the P/PE values and the power prediction intervals to optimize or otherwise regulate power usage.

In some examples, a processing event duration tracker 2925 may be provided to track the duration of processing events so that P/PE values may be converted to E/PE values by multiplying the P/PE values by corresponding PE durations, as described in co-pending application Ser. No. 18/941,513, filed Nov. 8, 2026, entitled "ENERGY-PER-PROCESSING EVENT ESTIMATES BASED ON TOTAL POWER CONSUMPTION MEASUREMENTS WITHIN A DATA STORAGE DEVICE", which is assigned to the Assignee of the present application and fully incorporated herein. The CP calibration component 2917 may be configured to apply CP to sequences of E/PE values to determine guaranteed energy prediction intervals so that the resource server 2918 may then control the delivery of energy based on the E/PE values and the guaranteed energy prediction intervals to optimize or otherwise regulate energy usage. In some examples, the processing event duration tracker 2925 may be part of the resource server 2918 but is shown separately for clarity and generality.

The system 2900 also includes a host 2902 with the SSD 2904 coupled to the host 2902. For example, the host 2902 may provide a write command to the SSD 2904 for writing data to the SSD 2904 (using a Write engine of the HW engines 2920$_1$ . . . 2920$_N$) or a read command to the SSD 2904 for reading data from the SSD 2904 (using a Read engine of the HW engines 2920$_1$ . . . 2920$_N$). The SSD 2904 also includes a host interface 2906, a working memory 2910 (e.g., volatile memory), a physical storage (PS) interface 2912 (e.g., FIM), and an NVM array 2914 having one or more dies storing data. In some aspects, the P/PE determination/update component 2916 and/or the CP calibration component 2917 may be separate components from SSD controller 2908 and may be implemented using any combination of hardware, software, and firmware (e.g., like the implementation options described above for SSD controller 108) that can perform the corresponding processing operations.

Figure 30:
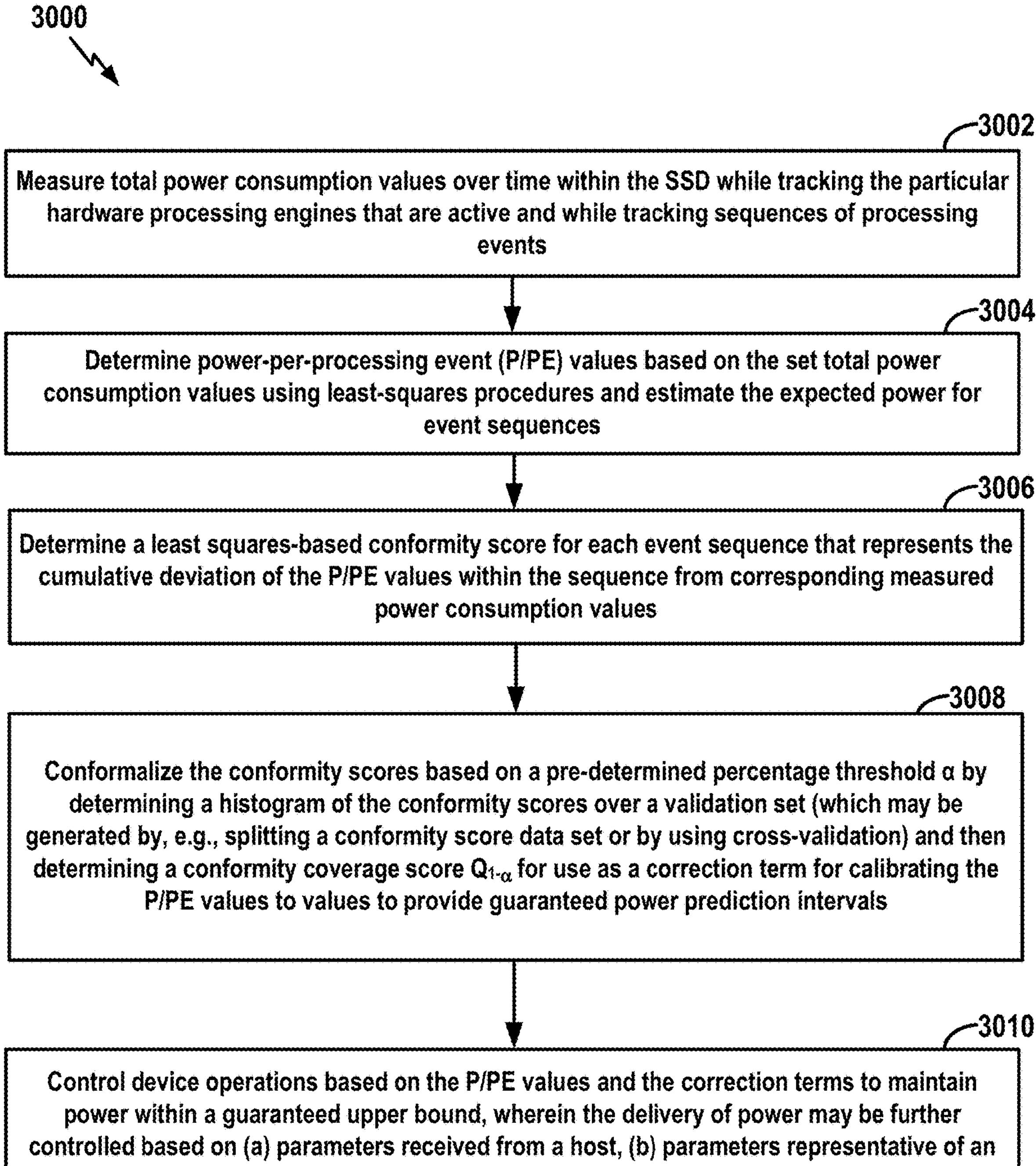
FIG. 30 is a flow diagram illustrating an exemplary method for calibrating power values using CP, in accordance with some aspects of the disclosure.

FIG. 30 is a flow diagram 3000 that summarizes an exemplary method for CP-based optimization and calibration.

At block 3002, a processor (e.g., the P/PE determination/update component 2916 of FIG. 29) measures total power usage values over time within the SSD while tracking the particular hardware processing engines that are active when power usage is measured and while tracking sequences of processing events. See, above, for examples of sequences. At block 3004, the processor determines the P/PE values from the power usage values and the hardware processing engines that were active when power was measured using the techniques described above. See, for example, the techniques described with reference to FIGS. 2-5. The procedures of FIGS. 2-5 operate to estimate the power used by the various processing engines while they operate. The computed values may be, for example, specified in Watts or milli-Watts.

At block 3006, a processor (e.g., the CP calibration component 2917 of FIG. 29) determines a least squares-based conformity score for each event sequence that represents the cumulative deviation of the P/PE values within the sequence from corresponding measured power consumption values. As discussed above, a LS-based conformity score per event sequence may be calculated as:

$$qi(Xi, Yi) = Yi - \sum_{i=1}^{ni} \hat{f}(Xi),$$

where Xi corresponds to the list of operations in a current sequence sample i, Yi is a measured overall power consumption of current sequence, ni is the number of events per sequence sample i, and $\hat{f}(Xi)$ is the power estimation per event at sequence sample i.

At block 3008, a processor (e.g., the CP calibration component 2917 of FIG. 29) conformalizes the conformity scores based on a pre-determined percentage threshold a by determining a histogram of the conformity scores over a validation set (which may be generated by, e.g., splitting a conformity score data set or by using cross-validation) and then determining a conformity coverage score $Q_{1-\alpha}$ for use as a correction term for adjusting the P/PE values to provide guaranteed power prediction intervals. Herein, a correction term is a value used to adjust other values, e.g., to adjust P/PE values. For a P/PE value, the correction term may be a power value expressed, e.g., in milli-watts. In other examples, the correction term might be a percentage value, e.g., a value indicating that a P/PE value should be increased by some percentage, such as 1%. The application of the correction term to adjust the P/PE values is what is referred to herein as "calibrating" the P/PE values. See, the conformalization procedures described above.

At block 3010, a processor (e.g., the resource server 2918 of FIG. 29) controls device operations based on the P/PE values and the correction terms to maintain power within a guaranteed upper bound. The delivery of power may be further controlled based on (a) control parameters received from a host, (b) parameters representative of an operating status of the SSD (e.g., plugged into electricity source, Low Battery operation, High Battery operation, a current power mode, overall device temperature, processing pipeline status or limitations, etc.), (c) parameters representative of a priority level (representative of importance or urgency) of the processing events, and (e) parameters representative of a current processing (e.g., pipeline) workload of the SSD. Note also that such values as the required confidence interval may be specified by the host. Other relevant parameters may include, for example: device age, number of write-erase cycles or program-erase cycles (PEC) of the device, time elapsed since the data was written (which may be related to a "TimePool" value often used in NAND memory management). The device temperature could be further specified in terms of the device temperature at program, device temp at read, and the difference between these values (i.e., "Cross-Temp" or "Xtemp".)

Although described with respect to P/PE values, the procedures of FIG. 30 may also be performed using E/PE values (with the E/PE values derived from P/PE values by tracking PE durations and then multiplying the P/PE values by their corresponding PE durations). (The duration, which may also be referred to as a duration value or a latency value, represents the time it takes to perform an operation and may be represented, e.g., in milliseconds.)

Figure 31:
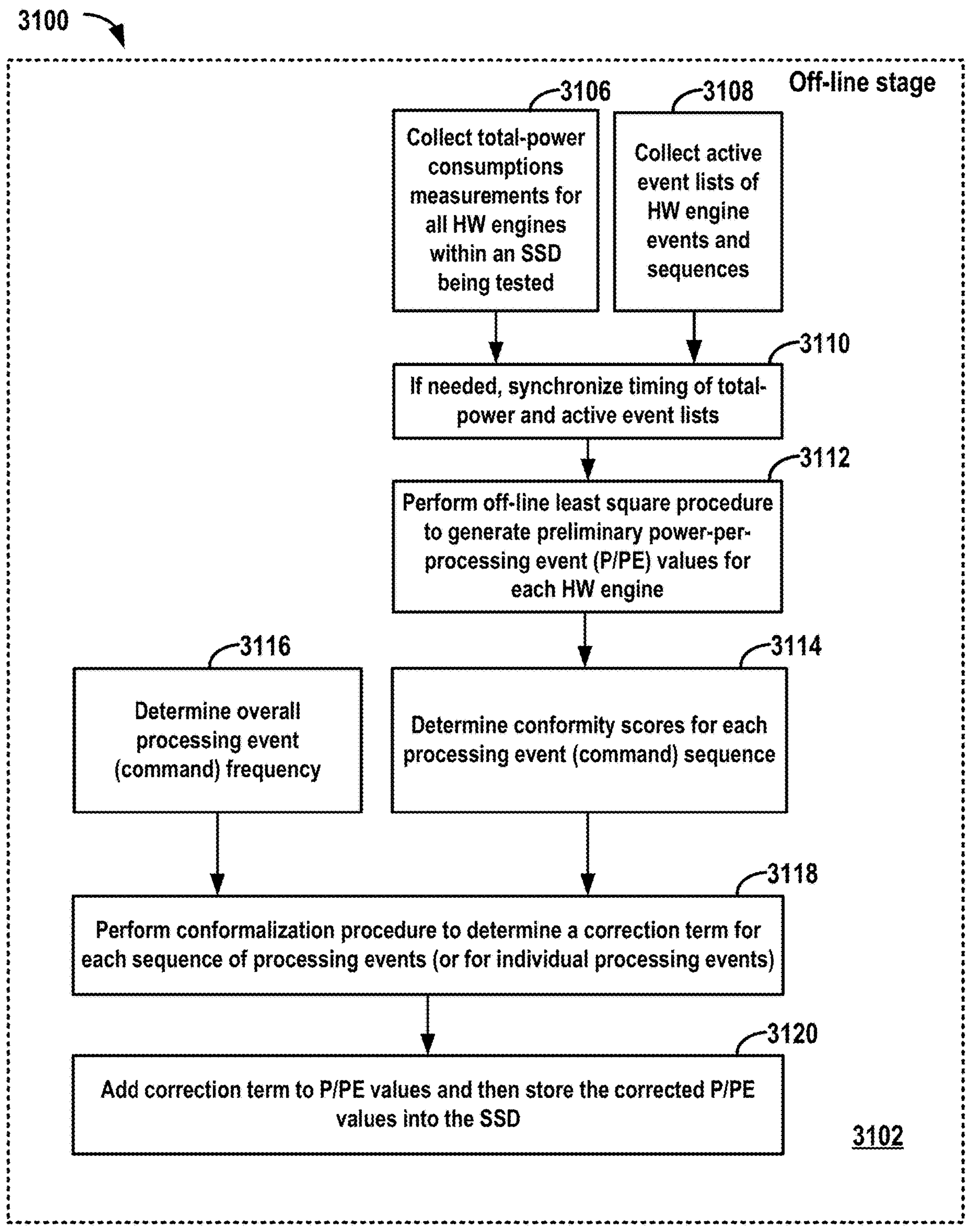
FIG. 31 is a flowchart summarizes an off-line procedure for generating power correction values using CP, in accordance with some aspects of the disclosure.
Figure 32:
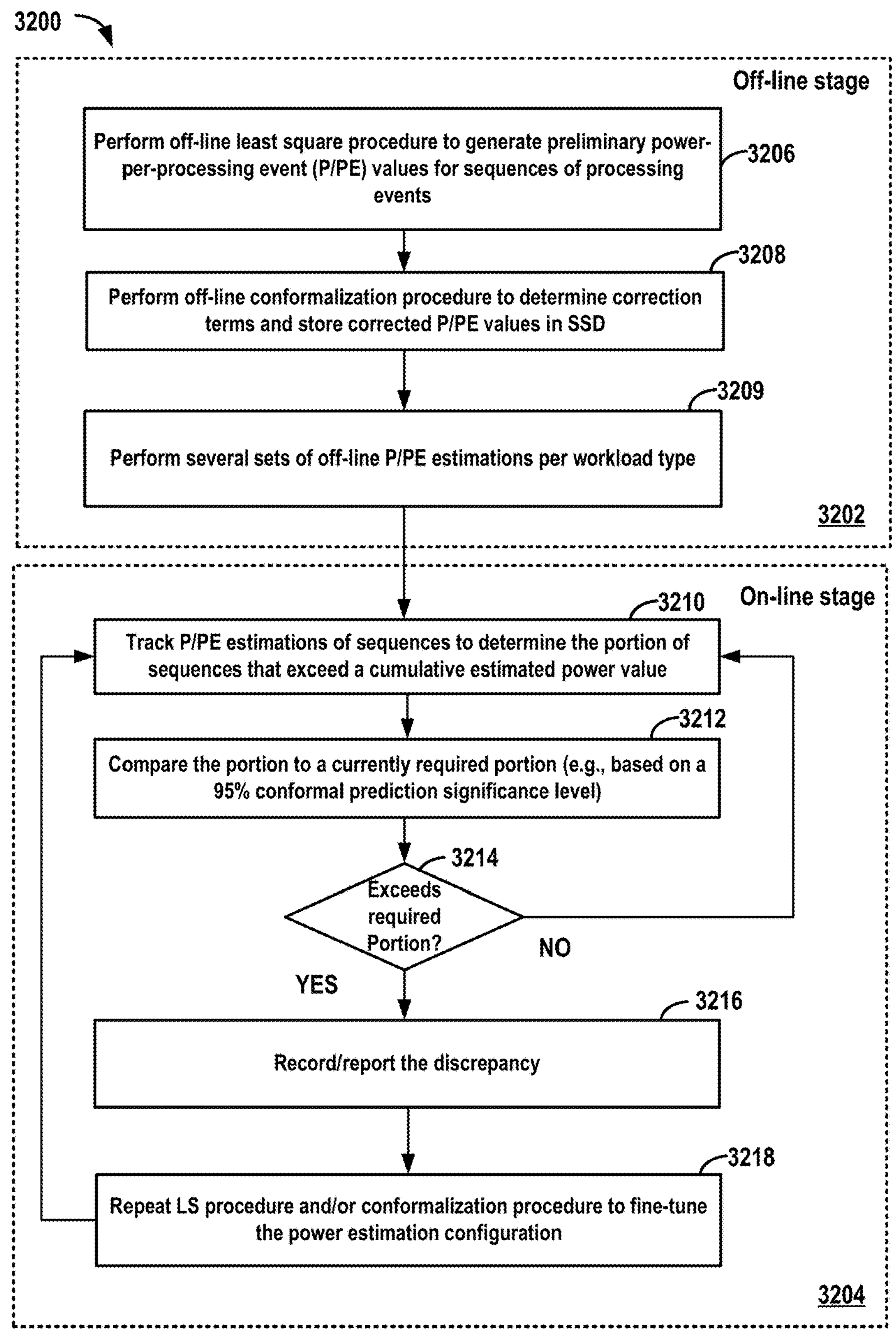
FIG. 32 is a flowchart summarizing an overall procedure with both off-line and on-line stages for generating and using CP-based power correction values, in accordance with some aspects of the disclosure.

In some aspects, the above-described conformalization procedures are performed off-line during SSD characterization. The resulting data (e.g., corrected PE/E values or corrected E/PE values) are programmed into the SSD for use by the SSD to control power. In other aspects, the SSD is configured to perform an on-line procedure to update the correction terms, either for P/PE values or E/PE values (or both). The off-line procedure is illustrated in FIG. 31. The off-line and on-line procedures are illustrated in FIG. 32.

FIG. 31 summarizes an off-line procedure 3100 for determining P/PE values using least squares and the determining correction terms for the P/PE values using CP. Some of the features are similar to those of FIG. 7 and will not be described in detail again. Beginning at block 3106, a test device (such as a test device in a device characterization lab) collects a large number of total power consumption measurements. An on-board power sensor (as in FIG. 29) may be used to sense the power for output to the test device. Concurrently, at block 3108, the test device collects a large number of corresponding active events, i.e., processing events or operations performed by the HW processing engines of the SSD while the power measurements are obtained, and also tracks sequences of such events.

Note that, in some examples, the test device may perform operations (at block 3110) to synchronize the timing of the total power measurements and the active events. This may be done, e.g., by recording a time stamp along with each power measurement and recording a time stamp along with each active events list. The test device then synchronizes the power measurements with the active event lists using the time stamp information or other information.

At block 3112, the test device performs an off-line least-squares procedure to generate an initial estimate of the P/PE values. For example, the test device may store the power measurements in a vector Pt and corresponding active event lists in a row of a matrix E (where each row in the matrix includes an initial 1 to represent baseline power, as discussed above), and then determine Pe from E·Pe=Pt. The resulting Pe values may be then stored in the SSD, which is deployed to a user. As noted above, the E refers to engines, not energy.

At block 3114, the test device determines (or calculates) conformity scores for each processing event (command) sequence, such as the sequence Read-TLC+Encode+Decode+Write-SLC. As discussed above, this this can be done by finding a threshold value that contains the required portion of the population of sequences in a data set, i.e., within required error bounds. Concurrently, at block 3116, the test device also determines the overall processing event (command) frequencies, as also described above. At block 3118, the test device performs the conformalization procedure to determine a correction term for each sequence of processing (or for individual processing events). At block 3120, the test device adds the correction term to the P/PE values and then stores the corrected P/PE values in the SSD for subsequent use by the SSD. Although described with respect to P/PE values, the procedures of FIG. 31 may also be performed using E/PE values (with the E/PE values derived from P/PE values by tracking PE durations and then multiplying the P/PE values by their corresponding PE durations).

Note that the prediction interval requirements used in the procedures described herein can be provided using one or more of the following:

- Host directions (e.g. according to the application importance/priority).
- SSD, according to pipeline requirements and limitations.
- Indications about the power supply status of the SSD (e.g., either plugged into electricity, low battery operation, or high battery operation).
- According to the current power mode of the device.

FIG. 32 summarizes procedures 3200 for performing CP initially during an off-line device characterization stage 3202 and then for fine-tuning the correction terms during a subsequent on-line stage 3204. That is, the above-described LS-based CP power estimations calculation can be applied on-line during the device lifetime so that the power estimations are adapted to the current device and/or user characteristics. The calculations can be applied on-line, e.g., by FW and/or by a dedicated internal HW. In This case, the histogram, as shown in FIG. 28 is generated online by the SSD by collecting previous total power estimations samples, together with the list of operations that were active in each sampling window. The histogram is then used online by the SSD to calculate a fine-tuned $Q_{1-\alpha}$ value that is then used to determine fine-tuned P/PE ranges for future operations of the resource server of the SSD. The process of fine tuning $Q_{1-\alpha}$ may be triggered periodically or based on detection of a drift between the predicted LS power estimations and the actual measured power values.

Beginning at block 3206, a test device (such as an SSD in a device characterization lab) performs the off-line LS procedure to generate preliminary P/PE values for sequences of processing events. At 3208, the test device performs the off-line conformalization procedure to determine correction terms and stores corrected P/PE values in the memory of the SSD. At 3209, the test device may perform several sets of off-line P/PE estimations for each of various types of workloads to generate data for populating the LS procedure vectors/matrices of the SSD (as described above, see, e.g., FIG. 7).

At block 3210, during the subsequent on-line stage while the SSD is operating (e.g., under the control of an end user), the SSD tracks P/PE estimations of sequences to determine the portion of sequences that exceed a cumulative estimated power value, as discussed above. For example, at block 3210, the actual power consumed by various sequences of commands is measured and compared with the estimated power for those sequences. At block 3212, the SSD compares the portion to a currently specified (e.g., required or requested) portion, e.g., if the portion exceeding the cumulative estimated power value is 97% and the specified (required) significance level was 95%, then the specified (required) amount is exceeded. At decision block 3214, a determination is made whether the determined portion based on actual measured power exceeds the previously set required portion, and, if so, the discrepancy can be recorded and/or reported, e.g., to FW or to a host device. Then, at block 3218, the SSD repeats or re-performs the LS procedure and/or the conformalization procedure to fine-tune the current power estimation configuration (e.g., to determine new correction values for P/PE). Processing then returns to block 3210 for further tracking of P/PE estimations and the actual power consumed. Although described with respect to P/PE values, the procedures of FIG. 32 may also be performed using E/PE values (with the E/PE values derived from P/PE values by tracking PE durations and then multiplying the P/PE values by their corresponding PE durations).

Figure 33:
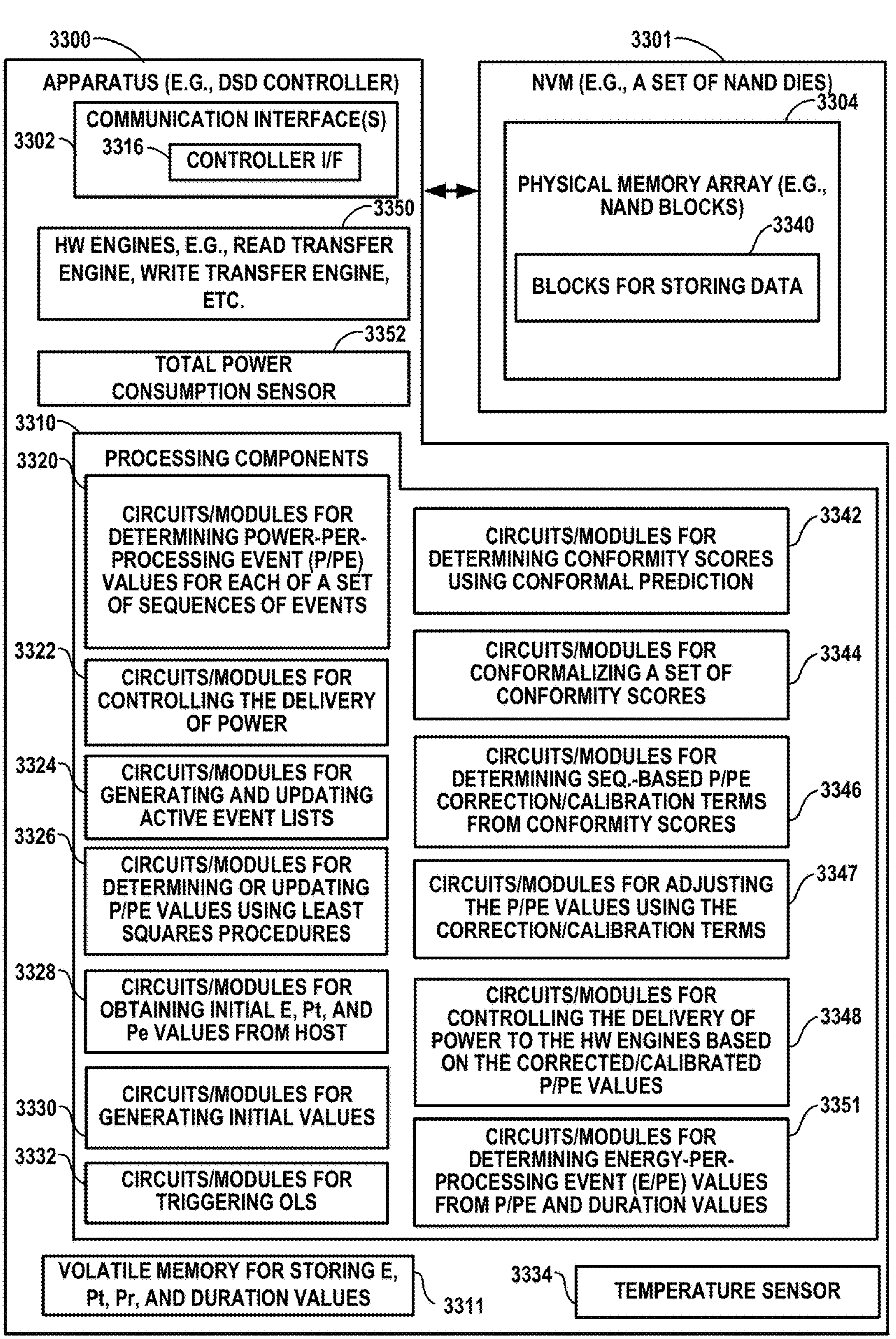
FIG. 33 is a schematic block diagram of an exemplary apparatus configured in accordance with some aspects of the disclosure, which includes components configured for generating and using CP-based power correction values.

FIG. 33 illustrates an embodiment of an exemplary data storage device or apparatus 3300 configured according to one or more aspects of the disclosure. The apparatus 3300 includes many features that are the same or similar to those described above in connection with FIGS. 13 and 23. Hence, those features will only be summarized below. Apparatus 3300 includes a communication interface 3302 and is coupled to an NVM 3301 (e.g., a set of NAND dies). The NVM 3301 includes a physical memory array 3304. The physical memory array 3304 may include one or more NAND blocks 3340. The physical memory array 3304 may be accessed by the processing components 3310. In one aspect, the apparatus 3300 may also include volatile memory 3311 such as a DDR for storing instructions and other information to support the operation of the processing components 3310 including information for performing OLS procedures, such as the E, Pt, Pr, and duration values, conformity values, active event lists, etc. The apparatus 3300 may include a set of HW engines or devices 3350 and a total power consumption sensor 3352 for measuring the total power of the set of HW engines 3350.

The apparatus 3300 includes various processing components 3310 arranged or configured to obtain, process and/or send data, control data access and storage, issue or respond to commands, and control other desired operations. For example, the processing components 3310 may be configured to perform any of the steps, functions, and/or processes described with respect to FIGS. 1-32 or FIGS. 34-35, discussed below. The processing components 3310 serve as an example of a means for processing. In various implementations, the processing components 3310 may provide and/or incorporate, at least in part, functionality described above for the components of controller 108 of FIG. 1, processor 612 of FIG. 6, controller 818 of FIG. 8, controller 1508 of FIG. 15, and controller 2908 of FIG. 29.

According to at least one example of the apparatus 3300, the processing components 3310 may include one or more of: circuit/modules 3320 configured for determining power-per-processing event values for each of a set of sequences of processing events using the OLS procedure; circuit/modules 3322 configured for controlling the delivery of power to the HW engines 3350 based on P/PE values or adjusted P/PE values; circuits/modules 3324 configured for generating and updating active event lists representative of particular HW engines active at any given time; circuits/modules 3326 configured for determining (estimating) or updating P/PE values using the least-squares procedures described above to initially determine the values or using the iterative/recursive least-squares procedure described above for updating the values; circuits/modules 3328 configured for obtaining initial E, Pt, and Pe values from host; circuits/modules 3330 for generating initial values (e.g., for E, Pt, and Pe) by assigning randomly generated values or by using unique indicator values; and circuits/modules 3332 for triggering the OLS procedure (or the iterative/recursive OLS procedure) based, e.g., on a change in device temperature (measured by a temperature sensor 3334) or other factors. The physical memory array 3304 may include blocks 3340 for storing data, such as user data.

Additionally, the processing components 3310 may include one or more of: circuit/modules 3342 configured for determining conformity scores using conformal prediction as described above; circuit/modules 3344 configured for conformalizing a set of conformity scores; circuit/modules 3346 configured for determining sequence-based P/PE correction/calibration terms from the conformity scores as described above; circuit/modules 3347 configured for adjusting the P/PE event values using the sequence-based correction/calibration terms as described above; circuit/modules 3348 configured for controlling the delivery of power to the HW engines based on the corrected/calibrated P/PE values; and circuit/modules 3351 configured for determining energy-per-processing event (E/PE) values based on P/PE and duration values for E/PE conformalization (so that energy usage may be controlled as well).

Still further, although not shown in FIG. 33, circuits/modules similar to those of circuits/modules 2342-2356 may also be provided within the apparatus of FIG. 33 and adapted either for use with P/PE estimates or E/PE estimates. For example, in some aspects, the apparatus of FIG. 33 may be configured to compute the actual power used in a just concluded time window to determine if a predicted power budget was accurate. This information then may be used by the DSD to predict the amount of power to be used during a next time window. In some aspects, the various systems and procedures of FIGS. 15-26 may be adapted for use with energy estimates instead of power estimates.

In at least some examples, means may be provided for performing the functions illustrated in FIG. 33 and/or other functions illustrated or described herein. For example, the means may include one or more of: means, such as circuits/modules 3342, for determining conformity scores using conformal prediction; means, such as circuits/modules 3344, for conformalizing a set of conformity scores; means, such as circuit/modules 3346, for determining sequence-based correction/calibration terms from conformity scores; means, such as circuit/modules 3347, for adjusting the P/PE values using the sequence-based correction terms; means, such as circuit/modules 3348, for controlling the delivery of power to the HW engines based on the corrected/calibrated P/PE values; and means, such as circuit/modules 3351, for determining energy-per-processing event (E/PE) values based on P/PE and duration values. Means corresponding to each of circuit/modules 3320-3332 may be provided.

Figure 34:
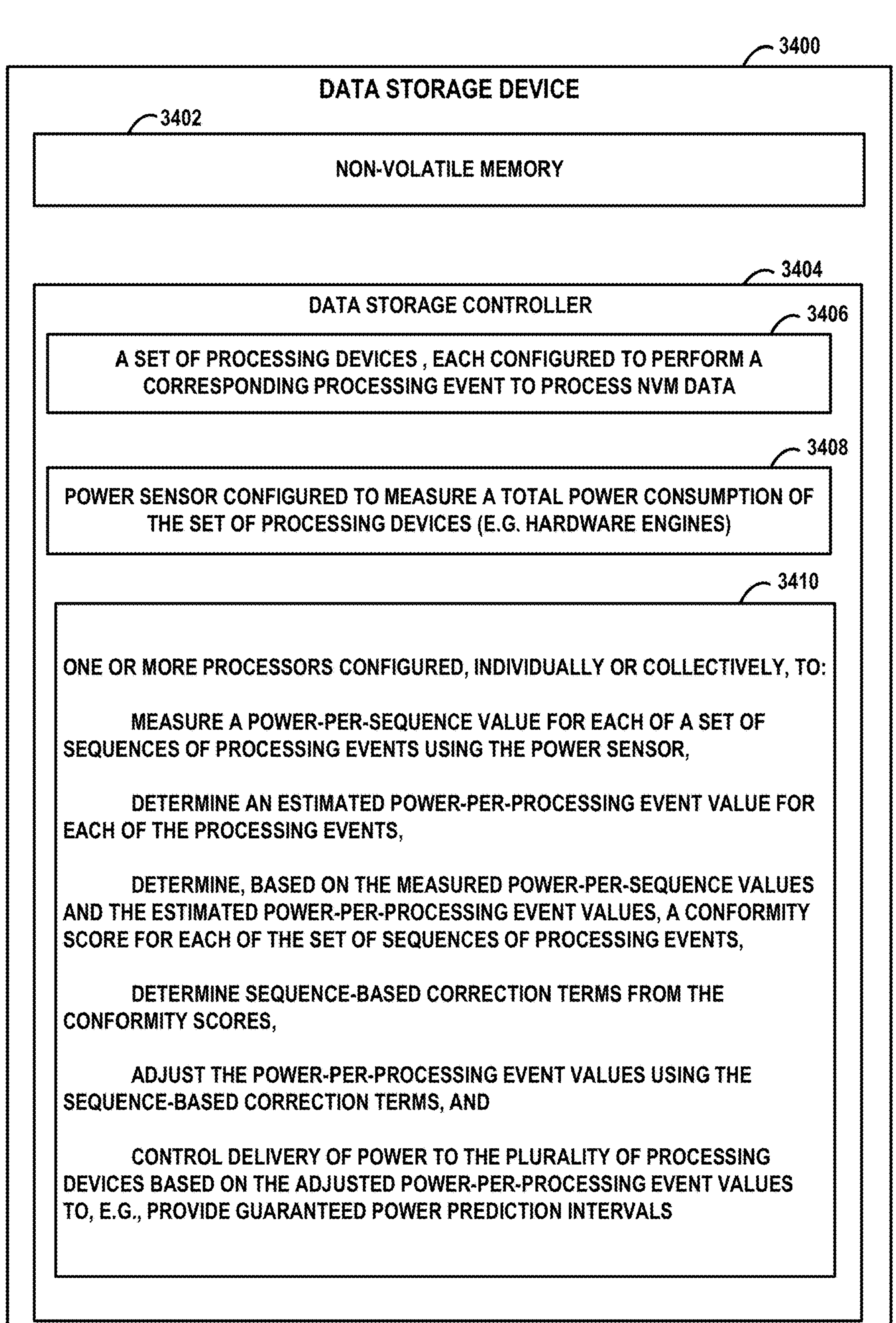
FIG. 34 is a schematic block diagram illustrating an exemplary data storage device configured in accordance with some aspects of the disclosure for generating and using CP-based power correction values.

FIG. 34 broadly illustrates a data storage device 3400 configured according to one or more aspects of the disclosure. The data storage device 3400 includes an NVM 3402. In some aspects, the NVM 3402 stores data, such as user data obtained from a host. The NVM 3402 may include a set or plurality of dies. The data storage device 3400 also includes a data storage controller 3404. The data storage controller 3404 includes a set or plurality of processing devices or engines 3406, each configured to perform a corresponding processing event to process NVM data. As noted above, NVM data refers to data for storage within an NVM, including data to be stored (programmed) on an NVM array or data that has been read from the NVM array.

In some aspects, the processing devices 3406 are configured to perform different operations on data to be stored in, or read from, the NVM 3402, where each processing operation is a processing event or command. The set of processing devices 3406 may include, e.g., one or more of a Read transfer engine, a Write transfer engine, etc. (See above for a more complete list of exemplary devices or engines.)

The data storage controller 3404 also includes a power sensor 3408 configured to measure the total power consumption of the set or plurality of processing devices 3406. The data storage controller 3404 further includes a processor or processing circuit 3410 (or one or more processors configured, individually or collectively, to perform various operations). The processor 3410 is configured to measure a power-per-sequence value for each of a set or plurality of sequences of processing events using the power sensor. The processor 3410 is also configured to determine an estimated power-per-processing event value for each of the processing events. See, e.g., the on-line OLS procedures described above. In some examples, the P/PE values correspond to one or more of a power-per-read transfer event, a power-per-write transfer event, etc. The processor 3410 is also configured to determine, based on the measured power-per-sequence values and the estimated power-per-processing event values, a conformity score for each of the set of sequences of processing events. For example, a least squares-based conformity score per event sequence is calculated as:

$$qi(Xi, Yi) = Yi - \sum_{i=1}^{ni} \hat{f}(Xi),$$

where Xi corresponds to the list of operations in a current sequence sample i, Yi is a measured overall power consumption of current sequence, ni is the number of events per sequence sample i, and $\hat{f}(Xi)$ is the power estimation per event at sequence sample i.

The processor 3410 is further configured to determine sequence-based correction terms from the conformity scores. This may be done by conformalizing the scores as described above, where $Q_{1-\alpha}$ is the required correction for the sequences power estimation so as to assure that, for example, for 95% of the population, the estimated power will not be above the measured power. The processor 3410 is also configured to adjust the power-per-processing event values using the sequence-based correction terms. For example, as described above, since LS-based optimization is used and $Q_{1-\alpha}$ is the overall required correction for a whole operations sequence, the device divides the $Q_{1-\alpha}$ mWs between the different operations of a sequence according to its relative occurrence over the whole the validation set.

The processor 3410 is still further configured to control the delivery of power to the set of processing devices based on the adjusted P/PE values to, for example, provide guaranteed power prediction intervals to maintain power within a power budget. As explained above, the delivery of power may be further controlled based on (a) control parameters received from a host, (b) parameters representative of an operating status of the SSD (e.g., plugged into electricity source, Low Battery operation, High Battery operation, a current power mode, device temperature, processing pipeline status or limitations, etc.), (c) parameters representative of a priority (e.g., importance or urgency) level of the processing events, and (c) parameters representative of a current processing workload of the SSD.

In some aspects, some or all of the processing devices/engines 3406 and the processor 3410 are components of an integrated circuit, such as an ASIC. For example, the various processing devices/engines 3406 may be different circuits or modules within the integrated circuit and the processor 3410 may be another circuit or module within the same integrated circuit. See, for example, the circuits/modules of FIG. 31. In other aspects, some or all of the processing devices/engines 3406 may be separate components formed on separate chips, such as separate ASICs, IPs, etc.

In some aspects, separate circuits/modules may be provided within processor 3410 to provide: means for measuring a power-per-sequence value for each of a plurality of sequences of processing events using the power sensor; means for estimating a power-per-processing event value for each of the processing events; means for determining, based on the measured power-per-sequence values and the estimated power-per-processing event values, a conformity score for each of the plurality of sequences of processing events; means for determining sequence-based correction terms from the conformity scores; means for adjusting the power-per-processing event values using the sequence-based correction terms; and means for controlling delivery of power to the plurality of processing devices based on the adjusted power-per-processing event values.

Although described with respect to P/PE values, the components of FIG. 34 may also be configured for use with E/PE values (with the E/PE values derived from P/PE values by tracking PE durations and then multiplying the P/PE values by their corresponding PE durations).

Figure 35:
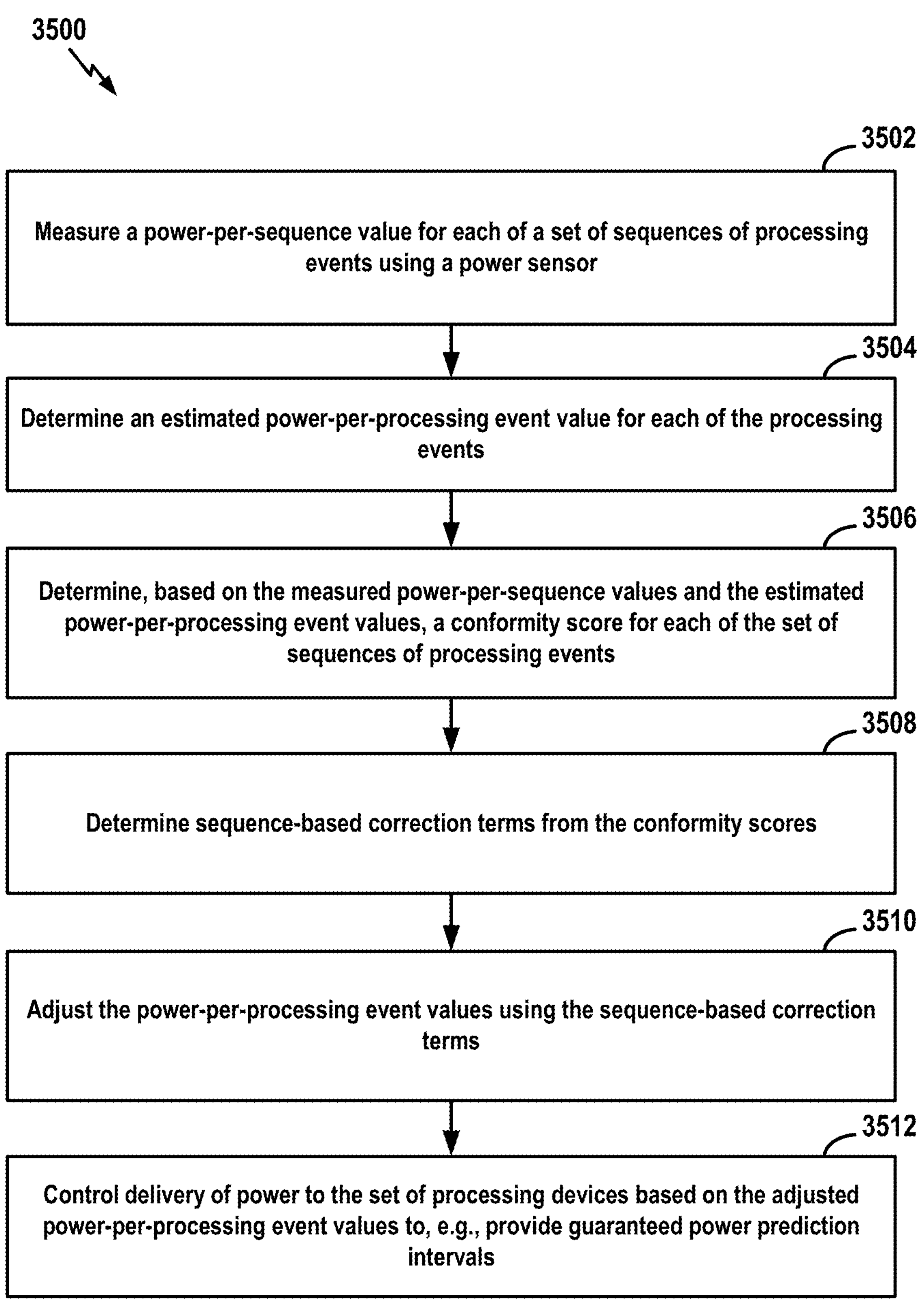
FIG. 35 is a flow chart of an exemplary method according to aspects of the present disclosure for generating and using CP-based power correction values.

FIG. 35 illustrates a method or process 3500 in accordance with some other aspects of the disclosure for predicting energy usage. The process 3500 may take place within any suitable data storage device or apparatus capable of performing the operations. See, for example, the devices of FIGS. 29 and 33.

At block 3502, the data storage device measures a power-per-sequence value for each of a set or plurality of sequences of processing events using the power sensor. In one example, as described above, the measured power consumptions of event sequences are:

4. Read-TLC+Encode+Decode+Write-SLC→$y_1$=50 mW
5. Read-TLC+Encode+Read-SLC→$y_2$=35 mW
6. Decode+Write-SLC+Decode+Write-SLC→$y_3$=90 mW

. . .

At block 3504, the data storage device determines an estimated power-per-processing event value for each of the processing events. In one example, as described above, LS-based estimations of P/PE values are applied generate the following estimations for P/PE:

Read-TLC→10 mW
Encode→12 mW
Decode→25 mW.
Write-SLC→15 mW.
Read-SLC→7 mW

At block 3506, the data storage device determines, based on the measured power-per-sequence values and the estimated power-per-processing event values, a conformity score for each of the plurality of sequences of processing events. For example, a least squares-based conformity score per event sequence is calculated as:

$$qi(Xi, Yi) = Yi - \sum_{i=1}^{ni} \hat{f}(Xi),$$

where Xi corresponds to the list of operations in a current sequence sample i, Yi is a measured overall power consumption of current sequence, ni is the number of events per sequence sample i, and $\hat{f}(Xi)$ is the power estimation per event at sequence sample i. In one example, as described above, exemplary LS-based conformity scores for each event sequence are as follows:

4. Read-TLC+Encode+Decode+Write-SLC→$q_1$=50 mW-62 mW=−12 mW
5. Read-TLC+Encode+Read-SLC→$q_2$=35 mW-29 mW=6 mW
6. Decode+Write-SLC+Decode+Write-SLC→$q_3$=90 mW-80 mW=10 mW

. . .

At block 3508, the data storage device determines sequence-based correction terms from the conformity scores. This may be done by conformalizing the scores as described above, where $Q_{1-\alpha}$ is the required correction for the sequences power estimation so as to assure that, for example, for 95% of the population, the estimated power will not be above the measured power.

At block 3510, the data storage device adjusts the power-per-processing event values using the sequence-based correction terms. For example, as described above, since LS-based optimization is used and $Q_{1-\alpha}$ is the overall required correction for a whole operations sequence, the for each such sequence the device divides the $Q_{1-\alpha}$ mWs between the different operations according to its relative occurrence over the whole the validation set. At block 3512, the data storage device controls delivery of power to the plurality of processing devices based on the power-per-processing event values and the corresponding correction terms to, e.g., provide guaranteed power prediction intervals to maintain power within a power budget.

Although described with respect to P/PE values, the procedures of FIG. 35 may also be performed using E/PE values (with the E/PE values derived from P/PE values by tracking PE durations and then multiplying the P/PE values by their corresponding PE durations).

ADDITIONAL ASPECTS

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general-purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a negative-OR (NOR) configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two-dimensional memory structure or a three-dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," "in one aspect," or similar language means that a particular feature, structure, or characteristic described in connection with the embodiment is included in at least one embodiment of the present disclosure. Thus, appearances of the phrases "in one embodiment," "in an embodiment," "in one aspect," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" or "one or more of A, B, or C" is intended to cover A, B, C, A-B, A-C, B-C, and A-B-C, as well as multiples of the same members (e.g., any lists that include AA, BB, or CC). Likewise, "at least one of: A, B, and C" or "one or more of A, B, or C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database, datastore, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device, comprising:

a non-volatile memory (NVM);

a plurality of processing devices, each configured to perform a corresponding processing event to process data stored in the NVM;

a power sensor configured to measure a total power consumption of the plurality of processing devices; and one or more processors configured, individually or collectively, to:

measure a power-per-sequence value for each of a plurality of sequences of processing events using the power sensor;

determine an estimated power-per-processing event value for each of the processing events;

determine, based on the measured power-per-sequence values and the estimated power-per-processing event values, a conformity score for each of the plurality of sequences of processing events;

determine sequence-based correction terms from the conformity scores;

adjust the power-per-processing event values using the sequence-based correction terms; and control delivery of power to the plurality of processing devices based on the adjusted power-per-processing event values.

2. The data storage device of claim 1, wherein the one or more processors are further configured, individually or collectively, to determine the conformity scores using conformal prediction (CP).

3. The data storage device of claim 1, wherein the one or more processors are further configured, individually or collectively, to determine the estimated power-per-processing event value for each of the processing events by being further configured, individually or collectively, to perform a least squares procedure on a plurality of measured total power consumption values.

4. The data storage device of claim 3, wherein the one or more processors are further configured, individually or collectively, to determine the conformity score by being further configured, individually or collectively, to determine a value that represents a cumulative deviation of the estimated power-per-processing event values from the measured power consumption value for each of the sequences of processing events.

5. The data storage device of claim 1, wherein the one or more processors are further configured, individually or collectively, to determine the sequence-based correction terms from the conformity scores by being further configured, individually or collectively, to conformalize a plurality of the conformity scores.

6. The data storage device of claim 5, wherein the one or more processors are further configured, individually or collectively, to:

conformalize the plurality of the conformity scores by being further configured, individually or collectively, to determine a histogram of the plurality of the conformity scores; and determine the sequence-based correction terms from the histogram.

7. The data storage device of claim 1, wherein the one or more processors are further configured, individually or collectively, to adjust the power-per-processing event values by being further configured, individually or collectively, to multiply each of the power-per-processing event values by a portion of a corresponding sequence-based correction term.

8. The data storage device of claim 1, wherein the one or more processors are further configured, individually or collectively, to control the delivery of power using parameters comprising one or more of: control parameters received from a host, parameters representative of an operating status of the data storage device, parameters representative of a priority level associated with the processing events, and parameters representative of a current processing workload of the data storage device.

9. The data storage device of claim 8, wherein the parameters representative of the operating status of the data storage device comprise one or more of: a power supply status, a power mode status, a device age, a total number of write-erase cycles performed, a time elapsed since data write, an overall device temperature, a device temperature at program, a device temperature at read, and a difference between the device temperature at program and the device temperature at read.

10. The data storage device of claim 1, wherein the one or more processors are further configured, individually or collectively, to determine the power-per-processing event value for each of the plurality of sequences of processing events by being further configured, individually or collectively, to determine a least-squares fit of measured total power consumption values to a matrix product of the power-per-processing event values and a list of corresponding active processing devices.

11. The data storage device of claim 1, wherein the one or more processors are further configured, individually or collectively, to:

determine corresponding duration values for each of the processing events;

determine, based on the adjusted power-per-processing event values and the corresponding duration values, an energy-per-processing event value for each of the processing events; and control delivery of energy to the plurality of processing devices based on the energy-per-processing event values.

12. A method for use by a data storage device comprising a non-volatile memory (NVM) and a plurality of processing devices configured to process data stored in the NVM, the method comprising:

measuring a power-per-sequence value for each of a plurality of sequences of processing events using a power sensor;

determining an estimated power-per-processing event value for each of the processing events;

determining, based on the measured power-per-sequence values and the estimated power-per-processing event values, a conformity score for each of the plurality of sequences of processing events;

determining sequence-based correction terms from the conformity scores;

adjusting the power-per-processing event values using the sequence-based correction terms; and controlling delivery of power to the plurality of processing devices based on the adjusted power-per-processing event values.

13. The method of claim 12, wherein the conformity scores are determined using conformal prediction (CP).

14. The method of claim 12, wherein estimating the power-per-processing event values for each of the processing events comprises performing a least squares procedure on a plurality of measured total power consumption values.

15. The method of claim 14, wherein determining the conformity score comprises determining a value that represents a cumulative deviation of the estimated power-per-processing event values from the measured power consumption value for each of the sequences of processing events.

16. The method of claim 12, wherein determining the sequence-based correction terms from the conformity scores comprises conformalizing a plurality of the conformity scores.

17. The method of claim 16, wherein conformalizing the plurality of the conformity scores comprises determining a histogram of the plurality of the conformity scores; and the sequence-based correction terms are determined from the histogram.

18. The method of claim 12, wherein adjusting the power-per-processing event values comprises multiplying each of the power-per-processing event values by a portion of a corresponding sequence-based correction term.

19. The method of claim 12, wherein the delivery of power is controlled using parameters comprising one or more of: control parameters received from a host, parameters representative of an operating status of the data storage device, parameters representative of a priority level associated with the processing events, and parameters representative of a current processing workload of the data storage device.

20. An apparatus for use in a data storage device, the apparatus comprising:

a non-volatile memory (NVM);

a plurality of processing devices configured to process data stored in the NVM;

means for measuring a power-per-sequence value for each of a plurality of sequences of processing events using a power sensor;

means for determining an estimated power-per-processing event value for each of the processing events;

means for determining, based on the measured power-per-sequence values and the estimated power-per-processing event values, a conformity score for each of the plurality of sequences of processing events;

means for determining sequence-based correction terms from the conformity scores;

means for adjusting the power-per-processing event values using the sequence-based correction terms; and means for controlling delivery of power to the plurality of processing devices based on the adjusted power-per-processing event values.

* * * * *